US006842877B2

(12) United States Patent
Robarts et al.

(10) Patent No.: US 6,842,877 B2
(45) Date of Patent: Jan. 11, 2005

(54) CONTEXTUAL RESPONSES BASED ON AUTOMATED LEARNING TECHNIQUES

(75) Inventors: James O. Robarts, Redmond, WA (US); Eric L. Matteson, Bellevue, WA (US)

(73) Assignee: Tangis Corporation, Seattle, WA (US)

( * ) Notice: Subject to any disclaimer, the term of this patent is extended or adjusted under 35 U.S.C. 154(b) by 406 days.

(21) Appl. No.: 09/825,152

(22) Filed: Apr. 2, 2001

(65) Prior Publication Data

US 2002/0083025 A1 Jun. 27, 2002

Related U.S. Application Data

(63) Continuation-in-part of application No. 09/216,193, filed on Dec. 18, 1998, now Pat. No. 6,466,232, and a continuation-in-part of application No. 09/464,659, filed on Dec. 15, 1999, now Pat. No. 6,513,046, and a continuation-in-part of application No. 09/724,902, filed on Nov. 28, 2000.

(60) Provisional application No. 60/194,006, filed on Apr. 2, 2000, provisional application No. 60/193,999, filed on Apr. 2, 2000, and provisional application No. 60/194,123, filed on Apr. 2, 2000.

(51) Int. Cl.⁷ .................................................. G09G 5/00
(52) U.S. Cl. ...................... 715/708; 715/740; 715/734; 715/744; 700/65; 700/66
(58) Field of Search ................................ 345/744–747, 345/740, 734, 705, 714, 751, 765, 708; 700/65, 66

(56) References Cited

U.S. PATENT DOCUMENTS

| 4,916,441 A | 4/1990 | Gombrich |
| 5,032,083 A | 7/1991 | Friedman |
| 5,201,034 A | 4/1993 | Matsuura et al. |

(List continued on next page.)

FOREIGN PATENT DOCUMENTS

| EP | 0823 813 A2 | 2/1998 |
| JP | 05260188 | 10/1993 |
| JP | 09091112 | 4/1997 |
| WO | WO 90/08361 | 7/1990 |
| WO | WO 97/03434 | 1/1997 |

OTHER PUBLICATIONS

International Search Report, Application No. PCT/US01/10599, Nov. 28, 2002, 3 pages.

U.S. Appl. No. 09/724,777, Abbott et al., filed Nov. 28, 2000.

U.S. Appl. No. 09/724,799, Abbott et al., filed Nov. 28, 2000.

(List continued on next page.)

Primary Examiner—Raymond J. Bayerl
Assistant Examiner—Tadessa Hailu
(74) Attorney, Agent, or Firm—Seed IP Law Group PLLC

(57) ABSTRACT

Techniques are disclosed for using a combination of explicit and implicit user context modeling techniques to identify and provide appropriate computer actions based on a current context, and to continuously improve the providing of such computer actions. The appropriate computer actions include presentation of appropriate content and functionality. Feedback paths can be used to assist automated machine learning in detecting patterns and generating inferred rules, and improvements from the generated rules can be implemented with or without direct user control. The techniques can be used to enhance software and device functionality, including self-customizing of a model of the user's current context or situation, customizing received themes, predicting appropriate content for presentation or retrieval, self-customizing of software user interfaces, simplifying repetitive tasks or situations, and mentoring of the user to promote desired change.

49 Claims, 48 Drawing Sheets

U.S. PATENT DOCUMENTS

| | | | |
|---|---|---|---|
| 5,208,449 A | 5/1993 | Eastman et al. | |
| 5,214,757 A | 5/1993 | Mauney et al. | |
| 5,227,614 A | 7/1993 | Danielson et al. | |
| 5,335,276 A | 8/1994 | Thompson et al. | |
| 5,416,730 A | 5/1995 | Lookofsky | |
| 5,470,233 A | 11/1995 | Fruchterman et al. | |
| 5,493,692 A | 2/1996 | Theimer et al. | |
| 5,535,323 A * | 7/1996 | Miller et al. | 345/707 |
| 5,544,321 A | 8/1996 | Theimer et al. | |
| 5,555,376 A | 9/1996 | Theimer et al. | |
| 5,559,520 A | 9/1996 | Barzegar et al. | |
| 5,568,645 A | 10/1996 | Morris et al. | |
| 5,601,435 A | 2/1997 | Quy | |
| 5,603,054 A | 2/1997 | Theimer et al. | |
| 5,611,050 A | 3/1997 | Theimer et al. | |
| 5,642,303 A | 6/1997 | Small et al. | |
| 5,646,629 A | 7/1997 | Loomis et al. | |
| 5,719,744 A | 2/1998 | Jenkins et al. | |
| 5,726,660 A | 3/1998 | Purdy et al. | |
| 5,751,260 A | 5/1998 | Nappi et al. | |
| 5,781,913 A | 7/1998 | Felsenstein et al. | |
| 5,790,974 A | 8/1998 | Tognazzini | |
| 5,798,733 A | 8/1998 | Ethridge | |
| 5,812,865 A | 9/1998 | Theimer et al. | |
| 5,852,814 A | 12/1998 | Allen | |
| 5,873,070 A | 2/1999 | Bunte et al. | |
| 5,878,274 A | 3/1999 | Kono et al. | |
| 5,902,347 A | 5/1999 | Backman et al. | |
| 5,910,799 A | 6/1999 | Carpenter et al. | |
| 5,938,721 A | 8/1999 | Dussell et al. | |
| 5,948,041 A | 9/1999 | Abo et al. | |
| 5,959,611 A | 9/1999 | Smailagic et al. | |
| 5,991,687 A | 11/1999 | Hale et al. | |
| 5,995,956 A | 11/1999 | Nguyen | |
| 6,023,729 A * | 2/2000 | Samuel et al. | 709/228 |
| 6,047,301 A | 4/2000 | Bjorklund et al. | |
| 6,064,943 A | 5/2000 | Clark, Jr. et al. | |
| 6,108,197 A | 8/2000 | Janik | |
| 6,127,990 A | 10/2000 | Zwern | |

OTHER PUBLICATIONS

U.S. Appl. No. 09/724,892, Abbott et al., filed Nov. 28, 2000.

U.S. Appl. No. 09/724,893, Abbott et al., filed Nov. 28, 2000.

U.S. Appl. No. 09/724,894, Abbott et al., filed Nov. 28, 2000.

U.S. Appl. No. 09/724,932, Abbott et al., filed Nov. 28, 2000.

U.S. Appl. No. 09/724,949, Abbott et al., filed Nov. 28, 2000.

"'Affective Understanding:' Modeling and Responding to User Affect," http://www.media.mit.edu/affect/AC_research/understanding.html, pp. 1–3 [Accessed Oct. 2, 1998].

"Alps GlidePoint," http://www.alps.com/p17.html, p. 1 [Accessed Oct. 2, 1998].

"GyroPoint Technology," http://www.gyration.com/html/gyropoint.html, pp. 1–3 [Accessed Oct. 2, 1998].

"Haptics," http://www.ai.mit.edu/projects/handarm–haptics/haptics.html, pp. 1–2 [Accessed Oct. 2, 1998].

"Research Areas in Affective Computing," http://www.media.mit.edu/affect/, p. 1 [Accessed Oct. 2, 1998].

"Research on Affective Pattern Recognition and Modeling," http://www.media.mit.edu/affect/AC_research/recognizing.html, pp. 1–4 [Accessed Oct. 2, 1998].

"Research on Sensing Human Affect," http://www.media.mit.edu/affect/AC_research/sensing.html, pp. 1–5 [Accessed Oct. 2, 1998].

"Smart Rooms," http://vismod.www.media.mit.edu/vismod/demos/smartroom/, pp. 1–3 [Accessed Oct. 2, 1998].

"SmartDesk Home Page," http://vismod.www.media.mit.edu/vismod/demos/smartdesk/, pp. 1–4 [Accessed Oct. 2, 1998].

"The MIT Wearable Computing Web Page," http://wearables.www.media.mit.edu/projects/wearables/, pp. 1–3 [Accessed Oct. 2, 1998].

"Wearable Computer Systems for Affective Computing," http://www.media.mit.edu/affect/AC_research/wearables.html, pp. 1–5 [Accessed Oct. 2, 1998].

Aoki, Hisashi et al., "Realtime Personal Positioning System for a Wearable Computer," $3^{rd}$ International Symposium on Wearable Computers, San Francisco, California, Oct. 18–19, 1999.

Bauer et al., "A Collaborative Wearable System with Remote Sensing," University of Oregon, Feb. 1996.

Billinghurst, Mark and Thad Starner, "New Ways to Manage Information," *IEEE*, pp. 57–64, Jan. 1999.

Bowskill, J. et al., "Wearable Location Mediated Telecommunications; A First Step Towards Contextual Communication," $3^{rd}$ International Symposium on Wearable Computers, San Francisco, California, Oct. 18–19, 1999.

Dey, Anind K. et al., "The Conference Assistant: Combining Context–Awareness with Wearable Computing," $3^{rd}$ International Symposium on Wearable Computers, San Francisco, California, Oct. 18–19, 1999.

Finger et al., "Rapid Design and Manufacture of Wearable Computers," Communication of the ACM, vol. 39, No. 2, Feb. 1996, pp. 63–68.

Golding, Andrew and Neal Lesh, "Indoor Navigation Using a Diverse Set of Cheap, Wearable Sensors," $3^{rd}$ International Symposium on Wearable Computers, San Francisco, California, Oct. 18–19, 1999.

Hull et al., "Towards Situated Computing," Hewlett–Packard Laboratories, HPL–97–66 (1997).

Kirsch, Dana, "The Sentic Mouse: A tool for measuring emotional valence," http://www.media.mit.edu/affect/AC_research/projects/sentic_mouse.html, pp. 1–2 [Accessed Oct. 2, 1998].

Kortuem et al., "Context–Aware, Adaptive Wearable Computers as Remote Interfaces to 'Intelligent' Environments," University of Oregon, Oct. 1998.

Kortuem, Gerd, "When Cyborgs Meet: Building Communities of Cooperating Wearable Agents," $3^{rd}$ International Symposium on Wearable Computers, San Francisco, California, Oct. 18–19, 1999.

Lashkari, Yezdi et al., "Collaborative Interface Agents," Proceedings of AAAI '94 Conference, Seattle, Washington, Aug. 1994.

Lehikoinen, Juha et al., "MEX: A Distributed Software Architecture for Wearable Computers," $3^{rd}$ International Symposium on Wearable Computers, San Francisco, California, Oct. 18–19, 1999.

Leonhardi, Alexander et al., Virtual Information Towers—A Metaphor for Intuitive, Location–Aware Information Access in a Mobile Environment, $3^{rd}$ International Symposium on Wearable Computers, San Francisco, California, Oct. 18–19, 1999.

Lunt, Teresa F. et al., "Knowledge–Based Intrusion Detection," Proceedings of the Annual Artificial Intelligence Systems in Government Conference, IEEE Comp. Soc. Press, vol. Conf. 4, 1989, pp. 102–107.

Maes, Pattie, "Agents That Reduce Work and Information Overload," Communications of the ACM, vol. 37, No. 7, Jul. 1994.

Mann, Steve, "'Smart Clothing': Wearable Multimedia Computing and 'Personal Imaging' to Restore the Technological Balance Between People and Their Environments", ACM Multimedia, Nov. 1996, pp. 163–174.

Metz, Cade, "MIT: Wearable PCs, Electronic Ink, and Smart Rooms," *PC Magazine*, pp. 192–193, Jun. 1998.

Oakes, Chris, "The Truman Show Realized?," http://www.wired.com/news/news/technology/story/15745,html, pp. 1–4 [Accessed Oct. 21, 1998].

Picard, R. W. and Healey, J., "Affective Wearables," Personal Technologies vol. 1: 231–240, MIT Media Laboratory (1997).

Rekimoto et al., "The World through the Computer: Computer Augmented Interaction with Real World Environments," ACM, Nov. 1995, pp. 29–36.

Rhodes, Bradley, "WIMP Interface Considered Fatal," http://rhodes.www.media.mit.edu/people/rhodes/Papers/no–wimp.html, pp. 1–3 [Accessed Oct. 2, 1998].

Rhodes, Bradley, J. "The Wearable Remembrance Agent: A System for Augmented Memory," Proceedings of the First International Symposium on Wearable Computers (ISWC '97), Cambridge, MA, Oct. 13–14, 1997.

Sato, J. et al., "Autonomous Behavior Control of Virtual Actors Based on the AIR Model," Proceedings Computer Animation, Jun. 5, 1997.

Schneider, Jay and Jim Suruda, "Modeling Wearable Negotiation in an Opportunistic Task Oriented Domain," $3^{rd}$ International Symposium on Wearable Computers, San Francisco, California, Oct. 18–19, 1999.

Smailagic et al., "Matching interface design with user task: Modalities of Interaction with CMU Wearable Computers," IEEE Personal Communications, Feb. 1996, pp. 14–25.

Smailagic, Asim et al., "MoCCA: A Mobile Communication and Computing Architecture," $3^{rd}$ International Symposium on Wearable Computers, San Francisco, California, Oct. 18–19, 1999.

Starner et al., "Visual Contextual Awareness in Wearable Computing," Media Lab, MIT, Oct. 1998.

Tan, Hong Z. and Alex Pentland, "Tactual Displays for Wearable Computing," *IEEE*, Massachusetts Institute of Technology Media Laboratory, pp. 84–88, 1997.

Yang, Jie et al., "Smart Sight: A Tourist Assistant System," $3^{rd}$ International Symposium on Wearable Computers, San Francisco, California, Oct. 18–19, 1999.

* cited by examiner

User.
    Desired_privacy_level
    Interruptibility
    Speed
    Direction
    Acceleration
    Availability.
        Cognitive_availability
        Tactile_availability
        Manual_availability
        Visual_availability
        Oral_availability
        Auditory_availability
    Proximity.<Item or place name>
    Mood.
        Happiness
        Sadness
        Anger
        Frustration
        Confusion
    Activity.
        Driving
        Eating
        Running
        Sleeping
        Talking
        Typing
        Walking
    Location.
        Place_name
        Latitude
        Longitude
        Altitude
        Room
        Floor
        Building
        Address
        Street
        City
        County
        State
        Country
        Postal_Code
    Destination. (same as User.Location.)
    Physiology.
        Pulse
        Body_temperature
        Blood_pressure
        Respiration
Person.<name or ID>. (same as User.)
Platform.
    UI.
        Oral_input_device_availability
        Manual_input_device_availability
        Tactile_output_device_availability
        Visual_output_device_availability
        Auditory_output_device_availability Platform. (continued)
    CPU.
        Load
        Speed
    Memory.
        Total_capacity
        Used
    Storage.
        Total_capacity
        Used
    Connectivity.
        Connection_status
        Connection_speed
        Connection_type/device
        Connection_activity
    Power.
        Power_source
        Power_level
Environment.
    People.
        Nearest
        Number_present
        Number_close
    Local.
        Time
        Date
        Temperature
        Pressure
        Wind_speed
        Wind_direction
        Absolute_humidity
        High_forecast_temperature
        Low_forecast_temperature
        People_present
        Ambient_noise_level
        Ambient_light_level
        Days.<previous or future>.
            High_temperature
            Low_temperature
            Precipitation_type
            Precipitation_amount
    Place.<place name>. (same as Environment.Local)
Application.
    Mail.
        Available
        New_messages_waiting
        Messages_waiting_to_be_sent
    Phone.
        Available
        In_use
        On/off
        Notification_mechanism
        Call_incoming
        Caller_ID
    Sound_recorder.
        Available
        Recording

User Setting
    Mental Context
        Meaning
        Cognition
            Divided User Attention
            Task Switching
            Background Awareness
        Solitude
        Privacy
            Desired Privacy
            Perceived Privacy
        Social Context
        Affect
    Physical Situation
        Body
            Biometrics
            Posture
            Motion
            Physical Encumberment
            Senses
                Eyes
                Ears
                Tactile
                Hands
                Nose
                Tongue
            Workload demands/effects
            Interaction with computer devices
            Interaction with people
            Physical Health
        Environment
            Time/Space
            Objects
            Persons
                Audience/Privacy Availability
                    Scope of Disclosure
                    Hardware affinity for privacy
                    Privacy Indicator for User
                    Privacy Indicator for Public
                    Watching Indicator
                    Being Observed Indicator
            Ambient Interference
                Visual
                Audio
                Tactile Computer
    Power
    Configuration
        User Input Systems
            Hand/Haptic
                Keyboard/Keystrokes
            Voice/Audio
            Eye Tracking
            Cursors
                Axis
                Resolution
                Selection
                Invocation
                Accelerators
        Output Systems
            Visual
                Resolution
            Audio
                Public/Private
            Haptic
        External Resources
            I/O devices
            Connectivity
    Data
        Quantity/State
        Urgency/Importance
            Use of Prominence
        Modality
        Sensitivity/Purpose
            Privacy Issues
            Use of Association
            Use of Safety
        Source/Ownership
            Types
                User generated
                Other computers or people
                Sensor
                PC State
            Use of Association Example Current Theme Selection

*Select A New Current Theme*

Example Current Theme Set Modification

*Current Theme Set*

Example Current Theme Layout Selection

*Select A New Current Theme Layout*

Starting The Day theme

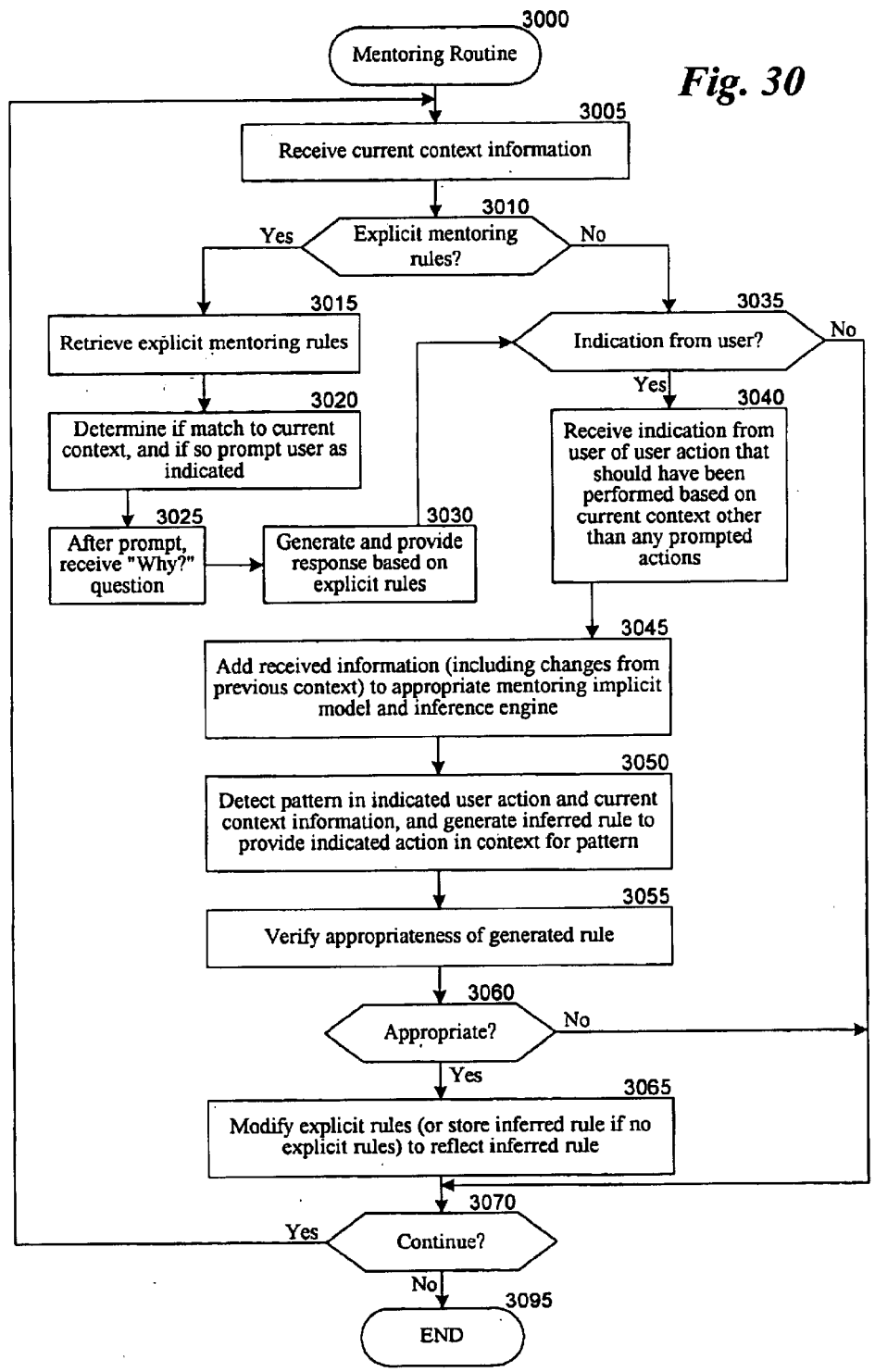

CONTEXTUAL RESPONSES BASED ON AUTOMATED LEARNING TECHNIQUES

CROSS-REFERENCE TO RELATED APPLICATIONS

This application is a continuation-in-part of U.S. patent application Ser. No. 09/216,193, filed Dec. 18, 1998 now U.S. Pat. No. 6,466,232 and entitled "Method and System for Controlling Presentation of Information to a User Based on the User's Condition"; of U.S. patent application Ser. No. 09/464,659, filed Dec. 15, 1999 now U.S. Pat. No. 6,513,046 and entitled "Storing and Recalling Information to Augment Human Memories"; and of U.S. patent application Ser. No. 09/724,902, filed Nov. 28, 2000 and entitled "Dynamically Exchanging Computer User's Context," which claims the benefit of provisional U.S. Patent Application Ser. No. 60/194,006 filed Apr. 2, 2000. Each of these applications are hereby incorporated by reference in their entirety.

This application also claims the benefit of provisional U.S. Patent Application Ser. No. 60/193,999, filed Apr. 2, 2000 and entitled "Obtaining And Using Contextual Data For Selected Tasks Or Scenarios, Such As For A Wearable Personal Computer," and of provisional U.S. Patent Application Ser. No. 60/194,123, filed Apr. 2, 2000 and entitled "Supplying And Consuming User Context Data," both of which are hereby incorporated by reference in their entirety.

TECHNICAL FIELD

The invention described below relates generally to using various information to allow a system to automatically enhance its responses to changing contextual information, such as information about a user and the user's surroundings.

BACKGROUND

Existing computer systems provide little appreciation of a user's overall condition or context, and as a result they can effectively respond to only a limited number of changes in parameters that they monitor. For example, with respect to the low-level physical status of the user, numerous devices exist for monitoring the physical parameters of the user, such as heart rate monitors that provide user pulse or heart rate data. While many of these devices simply provide information to the user regarding current values of a user's health condition, others (e.g., a defibrillator or a system with an alarm) are capable of providing a corresponding response if a monitored parameter exceeds (or falls below) a threshold value. However, since such devices lack important information about the specific context of the user (e.g., whether the user is currently exercising or is currently sick), any response will attempt to accommodate a wide range of user contexts and is thus unlikely to be optimal for the specific context of the user. For example, a defibrillator may provide too great or too small of a resuscitating charge simply because only one or a small number of parameters of a person are being monitored.

In a similar manner, existing computer systems have little appreciation for a user's current mental and emotional state, or for higher-level abstractions of a user's physical activity (e.g., going jogging or driving an automobile), and as a result are generally ineffective at anticipating tasks that a user is likely to perform or information that a user is likely to desire. In particular, since existing computer systems lack information about a user's current context, they cannot provide information appropriate to that context or anticipate likely changes in the context.

In addition, even if a computer system has information about default or standardized responses to a current situation, the responses are unlikely to be tailored the specific current needs of the current user of the computer system. Thus, any such responses are likely to be sub-optimal, such as by providing responses other than what the user would have desired.

BRIEF DESCRIPTION OF THE DRAWINGS

FIG. 8 is a hierarchical list of attributes.

FIG. 9 is an alternative hierarchical list of attributes.

FIG. 30 is a flow diagram of an embodiment of the Mentoring routine.

DETAILED DESCRIPTION

Figure 1:
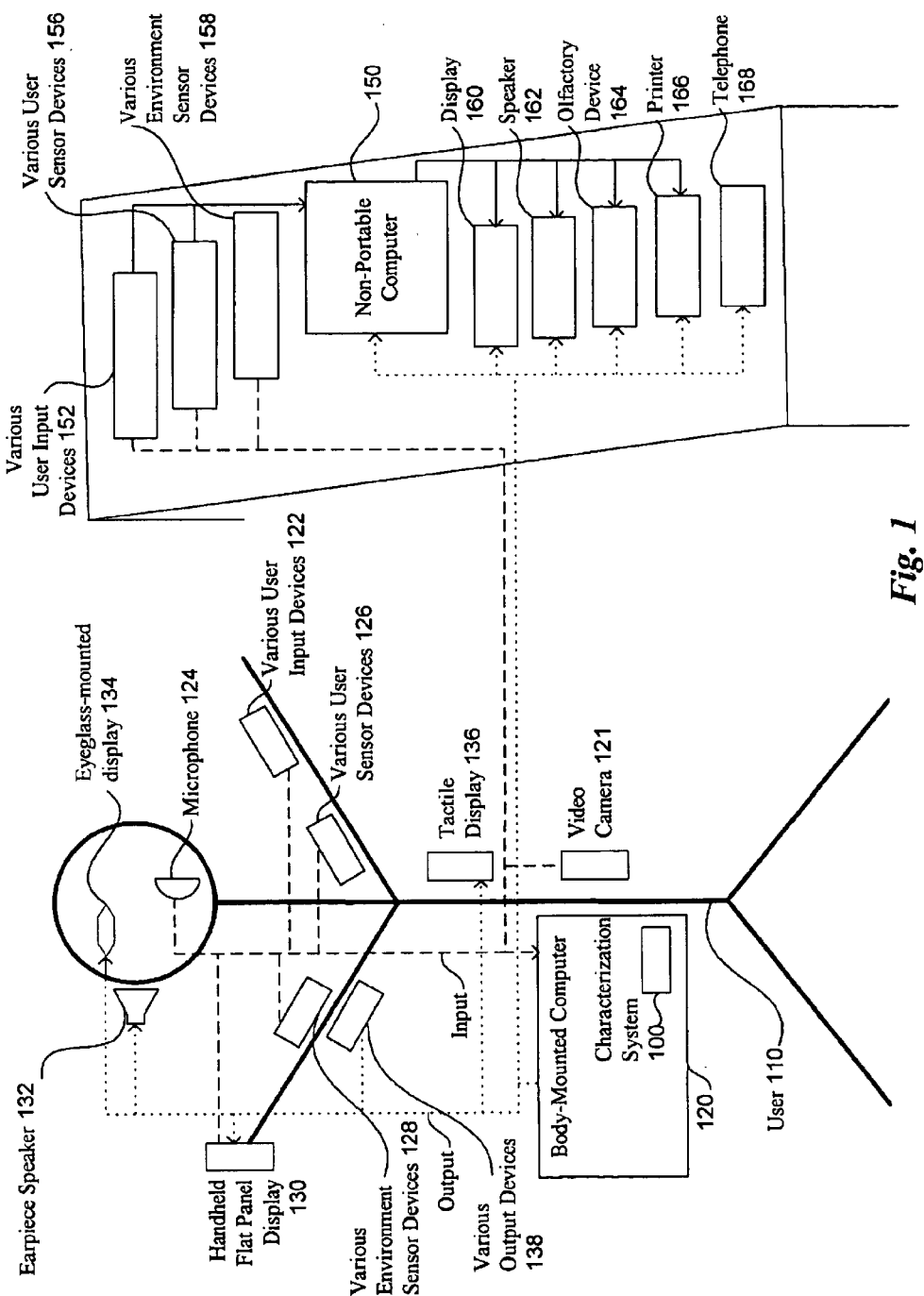
FIG. 1 illustrates a user with an embodiment of a specialized characterization system operating, at least in part, on a wearable computer platform.

The following description provides specific details for a thorough understanding of, and enabling description for, embodiments of the invention. However, one skilled in the relevant art will understand that the invention may be practiced without these details. In other instances, well known structures and functions have not been shown or described in detail to avoid unnecessarily obscuring embodiments of the invention.

Techniques are described for creating, modifying, analyzing, characterizing, distributing, modeling, and using themes that represent a context of a user. The themes each include related sets of attributes that reflect the context of the user, including: (1) the user's mental state, emotional state, and physical or health condition; (2) the user's setting, situation or physical environment (including factors external to the user that can be observed and/or manipulated by the user, such as the state of the user's wearable computer); and (3) the user's logical and data telecommunications environment (or "cyber-environment," including information such as email addresses, nearby telecommunications access such as cell sites, wireless computer ports, etc.).

Such themes may be employed by various computing devices, although much of the following description focuses on wearable computers as an example. Wearable computers find enhanced benefit over fixed location computers by often being more context aware or able to intelligently interpret attributes, thereby more filly utilizing the capabilities of the wearable computer. Many computing applications, including those running on wearable computers, act as context consumers or attribute clients in that they use such contextual attribute information to deliver context-aware functionality to end users. Many of these applications may use the same context information (i.e., the same attribute or sets of attributes).

Described below is a general framework related to using context themes. In some embodiments, a theme may consolidate one or more context sources and context consumers specific to the theme. Modules that provide attributes are generally referred to as context servers (CS), while modules that process attributes are generally referred to as context clients (CC). As described below, a characterization module (CM) acts as an attribute exchange mechanism for context information between such CS and CC applications or "code modules." The terms context server, context client and characterization module, and CS, CC and CM are generally used interchangeably herein.

Each of the context servers receive data signals from input devices or other sources and then process such signals to produce context information expressed within fundamental data structures called "attributes". Attributes represent measures of specific context elements such as ambient temperature, latitude, and current user task. Each attribute has a name and at least one value, and can additionally have other properties such as uncertainty, units and timestamp. As generally used herein, an "attribute" refers to a modeled aspect or element of the user's condition or context. The terms "attribute" and "condition variable" are generally used interchangeably herein. Further details on attributes are described below.

In the general framework described in greater detail below, context servers provide attribute values and/or themes to the CM, which in turn provides some or all of such information to the context clients. This general context framework encourages development of more abstract context information from simple data signals provided by input devices, because it provides a standard mechanism for the exchange of attribute values provided by context servers. For example, simple context information such as location signals provided by a global positioning system (GPS) receiver can be combined with other information such as ambient noise signals and video input cues to answer more abstract context questions such as "How busy am I?" or "What is my current activity?". In particular, GPS signals may indicate over time that a user is traveling at 30 m.p.h. and the wearable computer may recognize ambient noise as engine sounds, and thus recognize that the user is driving a car. Thus, such abstract context questions can be more intelligently answered using this contextual framework. Themes that include sets of multiple related attributes further enhance the contextual framework by permitting context clients or other code modules to provide a quantification or qualification of a useful context of the user that can not be directly measured from any attribute values in the set individually.

Simply providing a common exchange mechanism for useful information does not, in itself, promote interoperability. To fully realize separation of tasks and resulting interoperability, the context servers and context clients will preferably speak a common language, and thus a common naming convention is used for attributes. Importantly, by standardizing attributes, context clients may share attributes provided by context servers. Furthermore, themes provided by one or more context servers may be processed by context clients independently of other themes processed by other context clients. Thus, a wearable computer, for example, may simultaneously process multiple themes to answer numerous questions regarding a user's context and provide a robust environment for the user, as described below. In general, themes and their thematic sets of attributes are created based on determining some or all of the following: what types of context information are useful for a given application, how context information accuracy is characterized by attributes, how to determine the validity or usefulness of an attribute with a given associated time value or timestamp, how to choose between multiple providers of the same attribute, and what naming convention is to be applied to attributes.

The following discussion first introduces a suitable example wearable computer environment in which aspects of the invention can operate. A detailed example of a cardiac condition theme and its possible use is then provided. Thereafter, themes and their thematic attribute sets are discussed more generally, and then examples of using themes to present appropriate information to a user are illustrated.

Wearable Computer Example

Referring to FIG. 1, a context characterization system 100 is shown operating in a general-purpose body-mounted wearable computer 120 worn by the user 110. FIG. 1 and the following discussion provide a brief, general description of a suitable computing environment in which the invention can be implemented. Although not required, embodiments of the invention will be described in the general context of computer-executable instructions, such as routines executed by a general purpose computer. Those skilled in the relevant art will appreciate that aspects of the invention can be practiced with other computer system configurations, including Internet appliances, hand-held devices, cellular or mobile phones, multi-processor systems, microprocessor-based or programmable consumer electronics, network PCs, client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable computer and a fixed-location computer. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single wearable computer, among several wearable computers of several users, and between a wearable computer and a fixed-location computer. Data structures and transmission of data particular to aspects of the invention are also encompassed within the scope of the invention.

Many wearable computers (including the computer 120) travel with the user, such as by being strapped or attached to a user's body or clothing or by being mounted in a holster. The wearable computer 120 has a variety of user-worn user input devices including a microphone 124, a hand-held flat panel display 130 (e.g., with a touch sensitive portion and character recognition capabilities), and various other user input devices 122. Similarly, the computer has a variety of user-worn output devices that include the hand-held flat panel display 130, an earpiece speaker 132, an eyeglass-mounted display 134, a tactile output device 136, and various other user output devices 138. In addition to the various user-worn user input devices, the computer can also receive information from various user sensor input devices 126 and from environment sensor input devices 128, including a video camera 121. The characterization system 100, as well as various CCs and/or CSes (not shown), can receive and process the various input information received by the computer and can present information to the user on the various accessible output devices.

As shown in FIG. 1, the computer 120 is accessible to or communicates with a computer 150 (e.g., by being in line-of-sight wireless proximity or by being reachable via a long-distance communication device such as a cellular phone/modem) which also has a variety of input and output devices. In the illustrated embodiment, the computer 150 is non-portable, although the body-mounted computer of the user can similarly communicate with a variety of other types of computers, including portable computers and body-mounted computers of other users. The devices from which the non-portable computer can directly receive information include various user input devices 152 and various user sensor input devices 156. The non-portable computer can output information directly to a display 160, a speaker 162, an olfactory device 164, and a printer 166. In the illustrated embodiment, the body-mounted computer can communicate with the non-portable computer via a wireless transmission medium. In this manner, the characterization system 100 can receive information from the user input devices 152 and the user sensor devices 156 after the information has been transmitted to the non-portable computer and then to the body-mounted computer.

Alternately, the body-mounted computer may be able to directly communicate with the user input devices 152 and the user sensor devices 156, as well as with other various remote environment sensor input devices 158, without the intervention of the non-portable computer 150. Similarly, the body-mounted computer may be able to supply output information to the display 160, the speaker 162, the olfactory device 164, and the printer 166, either directly or via the non-portable computer, and directly to the telephone 168. As the user moves out of range of the remote input and output devices, the characterization system 100 will be updated to reflect that the remote devices are not currently available.

The computers 120 and 150 can employ any known bus structures or architectures for coupling the various blocks of such systems, including employing a memory bus with memory controller, a peripheral bus, and a local bus. Data storage devices (not shown) coupled to the computers 120 and 150 may include any type of computer-readable media that can store data accessible by a computer, such as magnetic hard and floppy disk drives, optical disk drives, magnetic cassettes, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet.

The various input devices allow the characterization system 100 or another system (not shown) executing on the computer 120 to monitor the user and the environment and to maintain a model (not shown) of the current conditions or context. Such a context model can include a variety of attributes that represent information about the user and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g., jogging or talking on a phone), emotional state (e.g., angry or puzzled), desired output behavior for different types of information (e.g., to present private family information so that it is perceivable only to the user and the user's family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, and locations. The model of the current context can additionally include information added explicitly from other sources (e.g., application programs), as well as user-specified or system-learned defaults and preference information. An illustrative example of a context model containing user and environment information is described in greater detail in U.S. patent application Ser. No. 09/216,193, filed Dec. 18, 1998 and entitled "Method and System for Controlling Presentation of Information to a User Based on the User's Condition."

Those skilled in the art will appreciate that computer systems 120 and 150, as well as their various input and output devices, are merely illustrative and are not intended to limit the scope of the invention. The computer systems may contain additional components or may lack some of the illustrated components. For example, it is possible that the characterization system 100 can be implemented on the non-portable computer 150, with the body-mounted computer 120 replaced by a thin client such as a transmitter/receiver for relaying information between the body-mounted input and output devices and the non-portable computer. Alternately, the user may not wear any devices or computers.

In addition, the body-mounted computer 120 may be connected to one or more networks of other devices through wired or wireless communication means. In general, as used herein, communications or data exchange between the devices or components described herein may be performed using any wired or wireless methods, (e.g., wireless RF, wireless satellite connections, a cellular phone or modem, infrared, physical cable or wiring of any variety, a docking station, physical context between two WPC users, etc.), either with or without support from other computers such as the computer 150. For example, when loaded with a "home" attribute set and corresponding CSes and CCs, the body-mounted computer of a user can make use of output devices in a smart room (e.g., a television and stereo when the user is at home), with the body-mounted computer transmitting information to those devices via a wireless medium or by way of a cabled or docking mechanism if available. Alternately, kiosks or other information devices can be installed at various locations (e.g., in airports, stores, a work place, or at tourist spots) to transmit relevant information to body-mounted computers within the range of the information device.

In general, as the body-mounted computer receives various input information, the information is forwarded to the characterization system 100. The characterization system 100 monitors the user and the user's environment in order to create a current user context model. In particular, the characterization system 100 receives a variety of types of information, and can use this information to determine the user's current context in a variety of ways. These types of information include explicit user input to the computer (via input devices 122, etc.), sensed user information (via user sensors 126, etc.), and sensed environment information (via environment sensors 128, etc.). The characterization system 100 can also receive date and time information from a CPU or from some other source, and can retrieve stored information (e.g., user preferences, definitions of various user-defined groups, or a default model of the user context) from a storage device (not shown in FIG. 1). It is also possible for one or more application programs to optionally supply application-specific information to the characterization system 100. This information can include any type of user context information to which the application program has access, such as user location or physiological state. In addition, the application programs can create new user context attributes, including those to be used only by that application program. All of the above items of information may be used to generate attribute values by context servers.

The various input information can provide context information in a variety of ways. For example, user input information alone can provide significant information about the user's context. If the user is currently supplying input to the computer via a full-sized keyboard, for instance, it is likely that the user is engaged in little other physical activity (e.g., walking), that the user is devoting a significant amount of attention to the computer system, and that the user would see information flashed on the display. If the user is instead generating user input audibly (e.g., through the head-mounted microphone 124), that fact may provide less user context information since the user can supply such audio information while engaged in a variety of types of physical activity. Those skilled in the art will appreciate that there are a wide variety of input devices with which a user can supply information to the computer system, including voice recognition devices, traditional qwerty keyboards, chording keyboards, half qwerty keyboards, dual forearm keyboards, chest mounted keyboards, handwriting recognition and digital ink devices, mice, track pad, digital stylus, finger or glove devices to capture user movement, pupil tracking devices, gyropoints, trackballs, joysticks, game pads, scanners (including optical character recognition (OCR) scanners and barcode scanners and other automated data collection readers), radio-frequency identification (RFID) readers, voice grid devices, video cameras (still and motion), etc.

In addition to the information received via user input, the characterization system 100 also uses sensed information about the user (from, e.g., the user sensors 126). For example, a variety of sensors can provide information about the current physiological state of the user, geographical and spatial information (e.g., location and altitude), and current user activities. Some devices, such as the microphone 124, can provide multiple types of information. For example, if the microphone 124 is available, the microphone can provide sensed information related to the user (e.g., detecting that the user is talking, snoring, or typing) when not actively being used for user input. Other user-worn body sensors can provide a variety of types of information, including that from thermometers, sphygmometers, heart rate sensors, shiver response sensors, skin galvanometry sensors, eyelid blink sensors, pupil dilation detection sensors, EEG and EKG sensors, sensors to detect brow furrowing, blood sugar monitors, etc. In addition, sensors elsewhere in the near environment can provide information about the user, such as motion detector sensors (e.g., whether the user is present and is moving), badge readers, video cameras (including low light, infra-red, and x-ray), remote microphones, etc. These sensors can be both passive (i.e., detecting information generated external to the sensor, such as a heart beat) or active (i.e., generating a signal to obtain information, such as sonar or x-rays). All of the above items of information may be used to generate attribute values by context servers.

Stored background information about the user can also be supplied to the characterization system 100. Such information typically includes information about the user that changes at most infrequently, although it is possible to frequently update the stored background information to reflect changing conditions. For example, background information about the user can include demographic information (e.g., race, gender, age, religion, birthday, etc.) if it can affect when and how context information is created and used. User preferences, either explicitly supplied or learned by the system, can also be stored as background information. Information about the user's physical or mental condition which affects the type of information which the user can perceive and remember, such as blindness, deafness, paralysis, or mental incapacitation, is also important background information that allows systems with access to this information to adapt to the user's capabilities and to create and use appropriate context information.

In addition to information related directly to the user, the characterization system 100 also receives and uses information related to the environment surrounding the user. For example, devices such as microphones or motion sensors may be able to detect whether there are other people near the user and whether the user is interacting with those people. Sensors can also detect environmental conditions which may affect the user, such as air thermometers, Geiger counters, chemical sensors (e.g., carbon monoxide sensors), etc. Sensors, either body-mounted or remote, can also provide information related to a wide variety of user and environment factors including location, orientation, speed, direction, distance, and proximity to other locations (e.g., GPS and differential GPS devices, orientation tracking devices, gyroscopes, altimeters, accelerometers, anemometers, pedometers, compasses, laser or optical range finders, depth gauges, sonar, etc.). Identity and informational sensors (e.g., bar code readers, biometric scanners, laser scanners, OCR, badge readers, etc.) and remote sensors (e.g., home or car alarm systems, remote camera, national weather service web page, a baby monitor, traffic sensors, etc.) can also provide relevant environment information. All of the above items of information may be used to generate attribute values by context servers. Information regarding storing and retrieving environmental information may be found in U.S. patent application Ser. No. 09/464,659, filed Dec. 15, 1999 and entitled "Storing and Recalling Information to Augment Human Memories."

In addition to receiving information directly from low-level sensors, the characterization system 100 can also receive information from modules which aggregate low-level information or attributes into higher-level attributes (e.g., face recognizer modules, gesture recognition modules, affective/emotion recognizer modules, etc.). As explained below, a combined context server and context client module may receive attribute values from low-level sensors and produce higher-level attribute values which are then fed back into the characterization module (CM) for use by other context clients.

A user can also explicitly supply information about their current context (e.g., "I have a high cognitive load and do not want to be disturbed" or "I am distracted and will need greater assistance than normal in recalling current state information"). The characterization system 100 can also receive current date and time information in order to both track changes over time and to utilize information such as the user's stored schedule. Previously-created models of the user's context can also be retrieved and used as a default or to detect changing conditions. Information from the computer indicating the types of output currently being presented to the user can also provide information about the user's current context, such as current activities and cognitive load.

After the characterization system 100 receives one or more of these types of information, it processes the information and creates a current model of the user context based on multiple attributes (with current values for some or all of the variables). Once the model of the user context has been created and then later updated, older versions of the model will be made available to the characterization system 100 to assist in the characterization of the user, such as with changes over time.

The model of the current user context can represent a variety of types of information. The characterization system 100 may merely store the attribute values it receives (even when they are at a low-level of abstraction) and then allow other modules to directly use the stored attributes when making decisions related to the current state. The characterization system 100 may also use received low-level attributes to itself generate attributes for higher-level representations of the user's observable activities (e.g., walking, watching a movie in a movie theater, talking to co-workers at the office, etc.).

In yet another embodiment, the characterization system 100 further characterizes the user's context with respect to attributes that are not directly observable. Such attributes include the current cognitive load of the user (indicating amount of attention required for the user's current activities and thus the ability of the user to devote attention to the computer), the current degree of interruptibility for the user (indicating ability to safely interrupt the user), the current degree of intrusiveness of output on the environment (indicating impact of output on the surrounding environment), the user's desired scope of audience for information being output (indicating how many people should be able to perceive the information), the user's desired level of privacy for information being output (indicating the group of people who are allowed to perceive the information), and the user's desired level of solitude (indicating the user's current desire to avoid intrusions).

User attributes can also represent abstract principles about the user and the surrounding environment, such as the user's relationship to other objects, people, or locations (e.g., being at their desk, being in their office, being near a drug store, talking to a particular person, etc.). In some embodiments, modules in the characterization system 100 can create and supply information about user context attributes to other modules, and those other modules can add the information to their model of their user context if appropriate (e.g., ambient air temperature, or an emotional state of a module's user that is sensed by another module), as noted below.

EXAMPLE

Cardiac Condition Context Client and Associated Context Servers and Attributes

Figure 2:
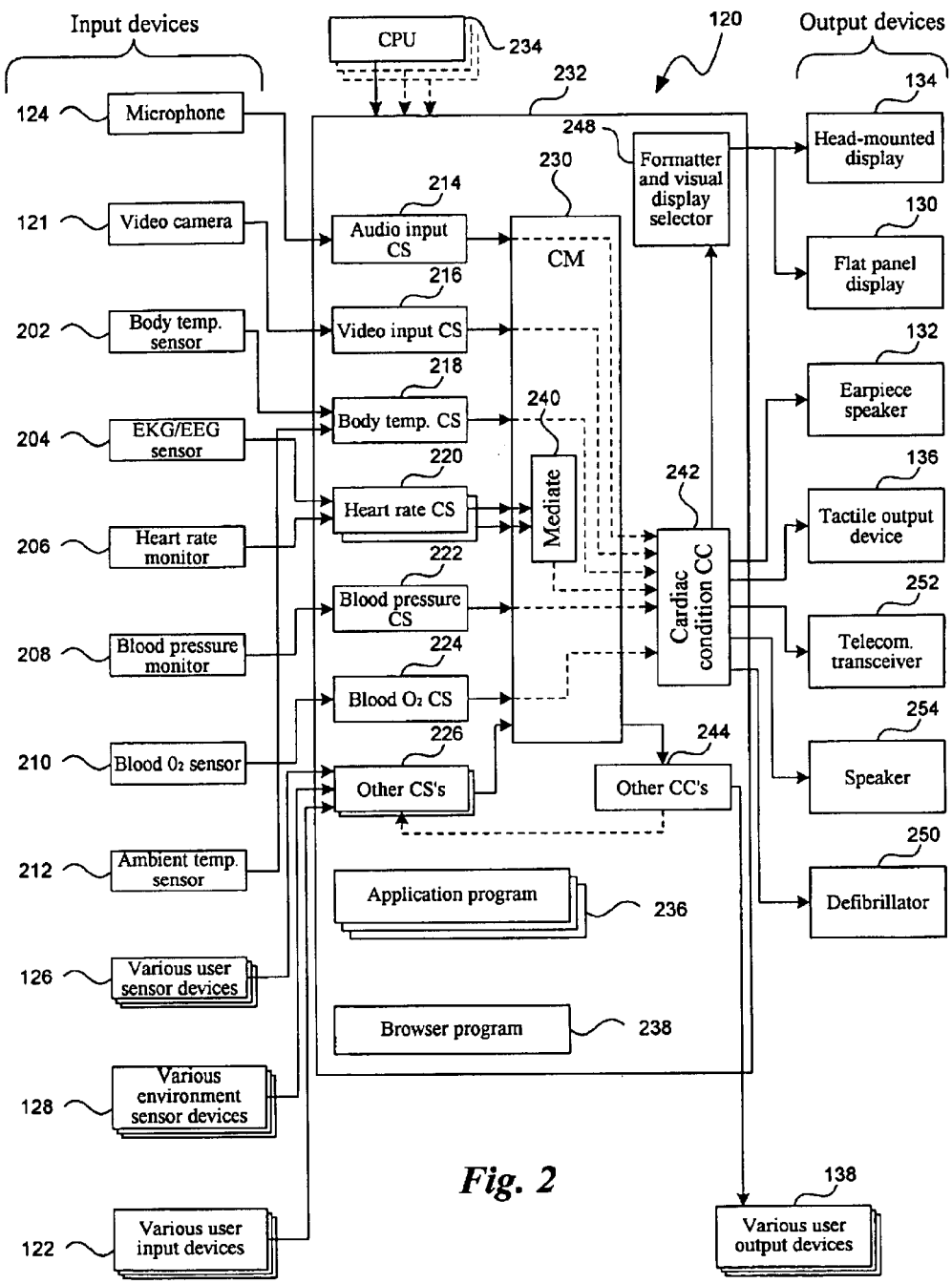
FIG. 2 is a block diagram of the specialized characterization system of FIG. 1 having specialized context servers and clients.

Referring to FIG. 2, a more detailed block diagram of an embodiment of the computer 120 and of the characterization system 100 is shown. In particular, FIG. 2 shows an example of a set of input devices, context servers, and associated attributes that employ a cardiac condition thematic attribute set to characterize the user's cardiac condition. The theme of the attribute set employed under the example of FIG. 2 is thus the cardiac condition of the user. A cardiac condition client then employs the cardiac condition attribute set to model a current cardiac condition of the user, where such a condition could not be directly measured from any of the attributes individually.

In the illustrated embodiment, the computer 120 receives input from not only the microphone 124 and video camera 121, but also from a body temperature sensor 202, EKG/EEG sensor 204, heart rate monitor 206, blood pressure monitor 208, blood oxygen sensor 210, and ambient temperature sensor 212. Of course, other input devices related to determining a user's cardiac condition may also be used, such as a skin galvanometer. The input devices each provide one or more data signals to corresponding context servers (CSes) 214–224, which receive such signals and convert them into attributes for use by context consumers or clients (CCs). For example, an audio input CS 214 receives an audio data signal from the microphone 124, and then parses, amplifies/attenuates, filters, packages or otherwise processes such a signal to produce a sound attribute.

If the microphone 124 is for receiving speech commands, then the audio input CS 214 can continually monitor audio data signals produced by the microphone 124 until a data signal is received that exceeds a predetermined threshold, which may indicate that the user is speaking. Such a signal is then parsed into appropriate packets such as phonemes, words or phrases to produce audio command attributes. Conversely, if the microphone 124 is instead positioned for receiving ambient sounds, then the audio input CS 214 may be modeled to simply take samples at regular intervals of the ambient audio data and convert such signals into an audio environment attribute. Of course, two or more microphones may be provided for receiving both spoken commands and ambient sounds, or one microphone may pick up both types of audio data. As explained below, such an audio environment attribute may be used by a CC to determine information about the user's context, such as whether the user is exercising at a health club or sleeping.

Other CSes shown in FIG. 2 provide similar processing of data signals provided by input devices. For example, a video input CS 216 may periodically sample and process frames of video data provided by the video camera 121. A body temperature CS 218 receives input signals from both the body temperature sensor 202 and the ambient temperature sensor 212, and then compares the signals to provide a close estimate of a user's core body temperature and to produce a corresponding body temperature attribute value.

Two heart rate CSes 220 are shown in FIG. 2 such that one heart rate CS receives an input signal from the EKG sensor 204 while the other receives an input data signal from the heart rate monitor 206. The first heart rate CS 220 may provide a more accurate heart rate attribute based on the EKG input data signal, while the second heart rate CS may provide an alternate heart rate attribute, with either or both of the heart rate attributes being used by a CC.

In a manner similar to that described above, a blood pressure CS 222 receives an input data signal from the blood pressure monitor to create and provide a blood pressure attribute value, while a blood oxygen CS 224 receives a blood oxygen input signal and provides a blood oxygen attribute value in response. Other CSes 226 are also shown which can receive input data signals from the various user sensor devices 126, environmental sensor devices 128, and user input devices 122, and can provide corresponding attribute values.

The various CSes 214 through 226 provide attribute values to a characterization module (CM) 230 that acts as an exchange mechanism for attribute values from CSes to CCs. The CM 230, CSes 214 through 226, and CCs reside in a memory 232 that forms part of the computer 120. Also running or resident in the memory 232 are one or more application programs 236 (e.g., word processing and spreadsheet applications), and a browser program 238 such as for accessing the World Wide Web portion of the Internet. The memory 232 may be random access memory (RAM), electronically erasable read only memory (EEPROM), data storage devices such as floppy and fixed magnetic disks, optical disks, or any other data storage devices, and any combination of such memory.

The computer 120 also includes one or more central processing units (CPUs) 234. The term "CPU," as generally used herein, refers to any logic processing unit, such as one or more microprocessors, digital signal processors (DSPs), application-specific integrated circuits (ASIC), programmed logic arrays and the like. While the CPU is shown as a block separate from other blocks, such as the memory, some or all of these blocks may be monolithically integrated onto a single chip.

Figure 3:
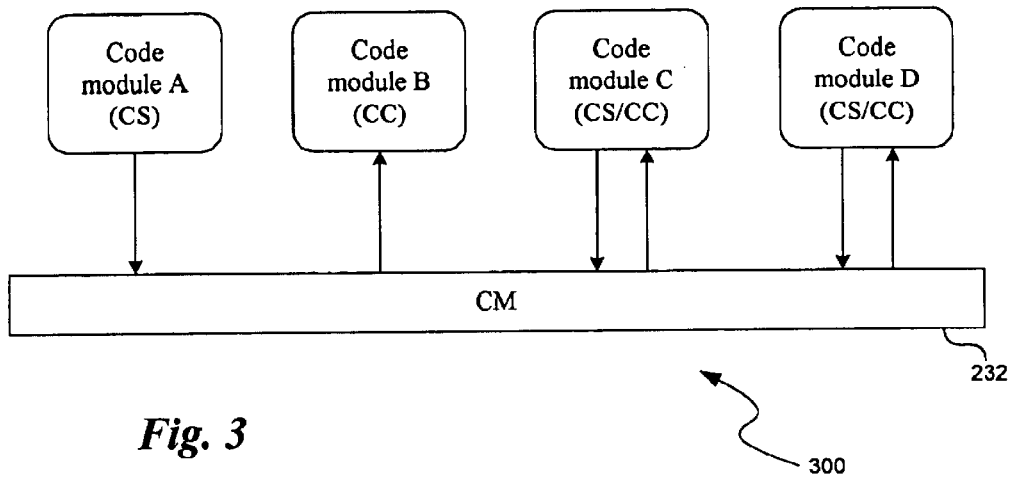
FIG. 3 is a block diagram illustrating code modules, such as context servers and clients, acting in conjunction with a characterization module (CM).

A general discussion of the interrelationship between context servers, context clients and the characterization module 230 will now be described. The CM 230 provides a mechanism for attribute exchange between code modules such as applications, dynamic link libraries (DLL's) and drivers. As shown in FIG. 3, a basic architecture 300 includes the CM 232 and code modules A through D. As noted above, a module that provides attributes to the CM is referred to as a server of attributes, while a consumer of attributes is referred to as a client. In FIG. 3, code module A is a server (CS) while code module B is a client (CC). Clients and servers differ only in the direction in which attributes flow. Modules may act as both clients and servers if they both provide and consume attributes (e.g., code modules C and D).

Context clients may look at or employ as many attribute values as they wish, regardless of the source or server of such attributes. Under an alternative embodiment, the CM may include mechanisms that restrict access to certain attributes, both for clients and servers, such as for security reasons or to prevent circular references.

Context clients and servers inform the CM of their intent to communicate attributes through a registration process. This registration process provides the CM with a way to monitor attribute dependencies, to notify participating modules of specific events, and to establish precedents. Further details on interaction between context clients, servers and the CM may be found in U.S. patent application Ser. No. 09/541,328, entitled "Interface for Exchanging Context Data" and filed Apr. 2, 2000. Once context clients have registered their intent to examine or receive attributes, such clients may create event handlers so that they receive notification from the CM when attributes change in specific ways, such as exceeding a predetermined threshold. Further details on event and condition-driven attribute creation/supply may be found in U.S. patent application Ser. No. 09/724,892, filed Nov. 28, 2000 and entitled "Automated Response To Computer User's Context." Further details on the CM supplying attributes for user context data, and employing such data may be found in U.S. patent application Ser. Nos. 09/724,902, 09/724,893, 09/724,777, 09/724,894, 09/724,949, and 09/724,799, and entitled "Dynamically Exchanging Computer User's Context," "Supplying Enhanced Computer User's Context Data," "Requesting Computer User's Context Data," "Managing Interactions Between Computer Users' Context Models," "Supplying Notifications Related To Supply And Consumption Of User Context Data," and "Generating And Supplying User Context Data" respectively, and all filed Nov. 28, 2000.

A context client may request an attribute that more than one context server provides. Each contributing context server is said to provide an instance of an attribute. The context client may either specify the preferred server/instance, or it may ask the CM to mediate the multiple attribute instances. The mediation process involves implementing one of several defined strategies for evaluating the instances and sending a resulting aggregate or representative instance of an attribute to the requesting client. These strategies are referred to as attribute mediators. As shown in FIG. 2, the CM 230 includes a mediate process 240 which receives heart rate attributes from the two heart rate CSes 220. The mediate process 240 may select between such two heart rate attributes, such as to select the most accurate (e.g., the one produced from the EKG sensor 204) or the newest, or may average between such attributes. Further details on such a mediation process may be found in U.S. patent application Ser. No. 09/724,932, entitled "Mediating Conflicts In Computer User's Context Data" and filed Nov. 28, 2000.

The CM makes no distinction between directly measured attributes and derived attributes. For instance, while it is simple to both quantify and measure a user's pulse or heart rate, the user's level of physical activity and cardiac condition may require inference from multiple measurable quantities such as pulse, velocity (as measured from GPS data), skin galvanometry (as measured from a skin galvanometer) and the like, as explained in greater detail below. The context clients receive such attributes from the CM to characterize a current state of the user, and in some cases, to provide output (e.g., by displaying information) to the user.

Figure 4:
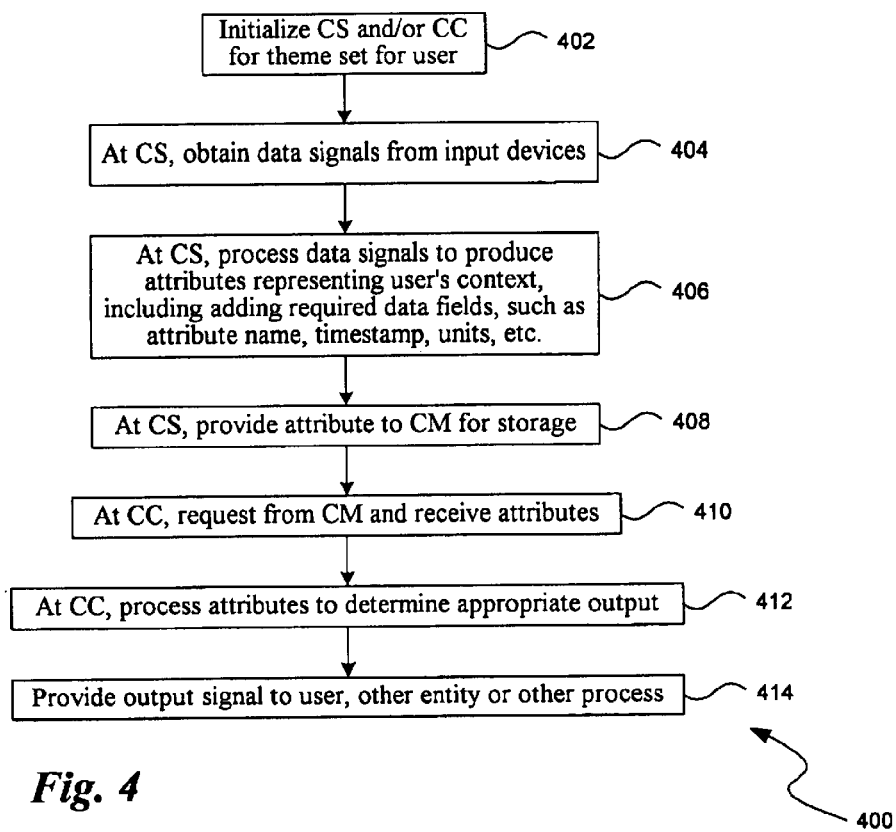
FIG. 4 is a flow diagram illustrating basic steps for generating attributes and providing output to a user based on the system of FIG. 3.

Referring to FIG. 4, a simple linear routine 400 summarizes how one or more context servers obtain input signals and provide such signals to context clients via the CM in order to provide an output to the user, particularly with respect to a thematic data set to represent or characterize the user's context (e.g., cardiac condition). Under step 402, one or more context servers and context clients are initialized for a thematic data set for the user. Such initialization may include registration of the CS and CC modules with the CM.

In step 404, the CS obtains data signals from input devices. In step 406, the CS processes the input data signals to produce attributes representing the user's context, including adding required data fields such as attribute name, timestamp, units, uncertainty and the like.

In step 408, the CS provides such processed attributes to the CM for storage. Under step 410, the CC requests from the CM to receive the stored attributes. Under step 412, the CC processes the received attributes to determine and model the user's context and to determine any appropriate output. Under step 414, the CC, in conjunction with any appropriate drivers, formatting modules and output devices, provides an output signal to the user or other entity. Alternatively, the CC may provide such context information or processed attributes to another module or process.

Applying the routine 400 of FIG. 4 to the illustrated embodiment of FIG. 2, the input devices provide data signals to the CSes 214 through 226, which in turn produce attributes for storage by the CM 230 (under steps 402 through 408). A cardiac condition CC 242 requests and receives from the CM the set of various cardiac condition attributes, including an ambient audio attribute, current video attribute, body temperature attribute, mediated heart rate attribute, blood pressure attribute, and blood oxygen level attribute, as well as other attributes not shown under step 410. Other relevant attributes may include the user's mood and the user's speech patterns to determine whether an urgent cardiac condition exists or not. (Of course, other CCs 244 may also request and receive these and other attributes.) Indeed, the heart rate, blood pressure, blood oxygen level and body temperature attributes, as well as other attributes, represent a cardiac condition data set or "thematic attribute set". The cardiac condition CC 242 processes the cardiac condition attribute set to model a characteristic of the current state of the user's cardiac condition. For reasons of economy and clarity, the cardiac condition CC 242 is described below as a single context client providing numerous functions; those skilled in the relevant art will recognize that the cardiac condition CC may well employ numerous modules or subroutines, or other CCs, to provide the functionality described below.

The cardiac condition CC analyzes all received attributes in the cardiac condition attribute set to determine a best estimate of the user's current cardiac condition or state, and to determine a best output or response to that state. For example, the heart rate, blood pressure, and blood oxygen level attributes may show elevated heart levels, high blood pressure and low oxygen levels respectively, which may indicate that the user is undergoing cardiac stress. However, the cardiac condition CC may also analyze the ambient audio attribute, visual elements within a frame of video data or other video input attributes, and the body temperature attribute. The ambient audio attribute may reflect heavy breathing of the user, the body temperature attribute may reflect an elevated surface body temperature, and the video data may include visual clues reflecting athletic equipment. Thus, the cardiac condition CC can determine that the user is exercising at the health club. Further, the cardiac condition CC may retrieve the user's electronic calendar or schedule (not shown) stored in the memory 232, which may indicate that, based upon the current time, the user is scheduled to be exercising. Thus, the cardiac condition CC decides to provide an output to the user indicating the user's current level of physical activity. The cardiac condition CC outputs a signal to a formatter and visual display selector 248 that provides an appropriate signal to the head-mounted display 134 to visually indicate the user's activity level (e.g., a "tachometer"-type display having a needle representing a numerical value on the tachometer corresponding to the user's activity level).

If, however, the heart rate, blood pressure and blood oxygen level attributes indicate a possibly dangerous cardiac condition, and other attributes in the cardiac condition attribute set don't attenuate this indication but instead further support a possible serious condition, then the cardiac CC provides warnings or possible emergency output to the user. For example, if the cardiac condition CC 242 determines that the user is about to have a heart attack, the CC provides both a visual output signal to the head-mounted display 134 to provide a warning to the user and an audible warning signal to the earpiece speaker 132. If in fact the user is having a heart attack, then the cardiac condition CC 242 may provide an output signal to a defibrillator 250. The measured attributes or cardiac condition data set allow the cardiac condition CC to determine an appropriate charge for the defibrillator 250 to apply to the user. Indeed, the cardiac condition data set is generally more robust than individual attributes, and thus the cardiac condition CC can provide a much more accurate charge determination for the defibrillator 250 than prior art defibrillators.

The cardiac condition CC 242 may also call for help if the user is suffering from a serious cardiac condition. Under this example, the cardiac condition CC 242 must first determine a current state of the user's logical data and telecommunications environment. For example, one of the various sensor devices 128 may include a cell phone signal transceiver to determine whether a cell phone site is within range of the user, and possibly to register the user with the cell site. One of the other CSes 226 then creates a proximate telecommunications access attribute. The cardiac condition CC 242 receives such an attribute to determine if the cardiac condition CC may provide an output signal to a telecommunications transceiver 252, and if so dials an emergency number or 911 and automatically provides audio notification with a current location of the user (e.g., using GPS location). If the user is not within a cell site (as determined by the proximate telecommunications attribute), the cardiac condition CC may then cause the telecommunications transceiver 252 to employ alternative telecommunications devices, such as paging a doctor or a hospital via a paging network. Other attributes reflecting a state of the user's logical data and telecommunications environment include the above-noted electronic calendar for the user. The cardiac condition CC 242 may also retrieve important phone numbers stored in a contacts database for the user so that the cardiac condition CC may place a call or page to a particular doctor or other health care provider.

Based on attributes reflecting a state of the user's physical surroundings, the cardiac condition CC may provide additional output. For example, the cardiac condition CC 242 may analyze the ambient audio input attribute to determine whether voices or sounds of nearby people are present. If so, the cardiac condition CC may provide an output signal to a speaker 254 that will broadcast prerecorded messages such as "I'm having a heart attack! Please call for help!" to thereby allow the wearable computer to call for help from nearby people when the user may be incapacitated.

To summarize, the cardiac condition CC 242 employs and analyzes a thematic set of attributes reflecting three distinct states of the user: (1) the state of the user (biometric, mood, etc.), (2) the state of the user's physical surroundings, and (3) the state of the user's logical or telecommunications environment, to thereby produce an appropriate response. In other words, the cardiac condition thematic attribute set includes not only attributes reflecting the state of the user (e.g., heart rate, blood pressure, body temperature and blood oxygen level attributes), but also attributes regarding the state of the user's physical surroundings (e.g., the ambient audio input attribute) and the user's logical or telecommunications environment (e.g., whether the computer 120 may initiate a cellular telephone call using a proximate telecommunications access attribute). Of course, the cardiac condition thematic set for use with the cardiac condition CC may include other attributes not discussed.

More generally, a user's logical or telecommunications environment represents data connectivity or a data environment indicating how the user's computer may have access to or connect with other computers or data sources. The user's logical environment also provides information regarding existing data stored elsewhere, such as emails, voice mails, phone calls, facsimiles, commonly used databases, and the like. For example, as noted above, attributes reflecting a state of the user's logical and telecommunications environment include an electronic calendar and contacts database, such as that provided by Microsoft Corporation under the trademark Outlook. Other attributes reflecting a state of the user's logical or telecommunications environment include favorite Internet links or web pages, phone numbers or other telecommunications access addresses ("resource locators") identifying a telecommunications node, including web pages, databases, documents, facilities, resources, and other data and processes accessible to the user via the user's computer 120.

As explained below, numerous thematic data or attribute sets characterizing the user's context are possible, all of which are generally based on these three classes of user context (i.e., the user's state, physical surroundings, and logical data and telecommunications environment). Attributes based on these three context classes provide rich context information for context clients to model characteristics of the current state of the user and to produce a response that accurately reflects the user's context in specialized scenarios or for specialized tasks. Prior art devices and processes that receive only a single signal or a small set of input data signals can produce only limited responses, and thus fail to fully characterize the user's context.

Thematic Attribute Sets, and Generation and Use of Such Sets

Initially presented below is a discussion of how attribute values are requested by the CM, created by context servers and provided to the context clients, as well as an overview of a structure for attributes. Two examples are then provided. Thereafter, properties of attributes, their uses and thematic sets of such attributes are discussed.

Under one embodiment, the characterization module requests attributes from each context server by sending a message to an appropriate request handler running within each context server. The request includes the name of the attribute being requested and a timeout period. The context server is expected to provide an attribute within the timeout period, where such attribute includes the following: value or quantity of the attribute; an uncertainty value that represents a range of values around the attribute value that the attribute is likely to have, with the type of the uncertainty value depending upon the type of information embodied in the attribute value; a timestamp that represents the effective age of the attribute value; and an indication of the measurement units in which the value and uncertainty are expressed. The timestamp reflects a point in time when the attribute value is most accurate, and it is the responsibility of the context server to determine how to timestamp its attributes most effectively. Attributes may also include a format version, as well as various flags. The timestamp may be determined from the clock residing on the computer 120 to facilitate consistency and easy comparison between context clients.

CSes may create attribute values at any time. An attribute value creation request from the CM includes the following: a CS name, attribute name, data type, format version, request handler and startup behavior. The CS name is a name for the requesting CS that is unique among other CSes. The name should be the same for all attributes that the CS creates. The attribute name corresponds to a predetermined name for the attribute. The data type represents the manner in which the attribute's value and uncertainty are expressed, such as floating point or text string data types. The format version represents the number of the format version in which the value is expressed. The request handler is a reference to a CS function that processes attribute requests and other messages from the CM. A single request handler may also be used for multiple attributes. The startup behavior specifies whether or not the CS should be loaded automatically at startup. This parameter is optional, and if included it supersedes any previous setting for the requesting CS. Overall, sets or groups of attributes generated by one or more CSes related to a common theme are provided and stored in the CM for use by one or more CCs.

A CC may request from the CM a value of an attribute within a thematic set. Such a request includes the following: a name, source, attribute mediator, age and timeout. The name represents a string that identifies the attribute. The source is the name of the CS that is to provide the attribute value. If no source is specified, then the CM assumes the attribute value may come from any source, and if necessary it uses an attribute mediator in the CM to select one. As noted above, the attribute mediator is the name of the selection method that the CC would like the CM to use when selecting one of multiple attribute instances. If no attribute mediator is provided, a default method is used. The age is an expression of the maximum age of the attribute value. If the request is made for a specific attribute instance through specification of a source, then only that instance is checked, and if that attribute value is too old it is freshened by a request from the CM to the CS for a new attribute instance value. If multiple instances are present and a source is not specified, the CM applies an attribute mediator to those attributes whose values satisfy the age requirement. If no values satisfy the age requirement, all instances of the attribute are freshened prior to the application of the attribute mediator. The timeout is a period within which the CM shall return the attribute. Attributes may also be requested periodically; further details may be found in U.S. patent application Ser. No. 09/541,326, entitled "Logging and Analyzing Computer User's Context Data" and filed Apr. 2, 2000.

In response to the above attribute requests, the CM provides the CC with the following for each attribute: the attribute's name, value, uncertainty, timestamp, units, source, and attribute mediator. It may also include format version and flags. The name, value, uncertainty, timestamp, units and attribute mediator are described above. The source information refers to the object that created and owns the instance of the attribute, typically a CS. If the attribute is derived from an event, the source is the name of that event. Other attributes have the CM as their source. Further details on functionality for CSes, CCs and the CM, including attribute creation and use, are discussed in the above-referenced U.S. patent applications.

Additional functionality for CCs and CSes is also possible. For example, CCs may obtain listings of attributes, and register with the CM to receive notification when attributes that they request become available. CSes may also be provided with notification when clients register for attributes whose values they provide, thereby allowing such CSes to load into memory and execute only when necessary. The CM may also in some situations convert attribute values from one measurement unit to another. CCs may also be notified that data cannot be newer than a certain preset period of time (attribute instance minimum delay communication). In addition, certain CSes may have exclusivity in providing values for certain attributes, or may push attribute values to the CM (e.g., for frequently updated attributes). CSes may also have the ability to provide constant attributes whose values do not change, and thus that do not require repeated requests from the CM for the current attribute value. Further, CSes may in some situations be required as a security precaution to be certified, and in other situations attribute names may be reserved so that CSes cannot use those names.

In general, CSes may create low-level, intermediate-level and higher-level attributes within the framework noted above. For example, referring to FIG. 5A, a latitude, longitude and altitude context server module or routine 500 is shown. The CS module 500 provides a thematic set of three attributes related to location, those being latitude, longitude and altitude. Beginning in step 502, the module launches. Because the CS module functions independently of any particular context client, this context server module launches at system startup. Additionally, under step 502, the module 500 initiates a latitude/longitude/altitude attribute request handler and registers the module and the attributes with the CM. In step 504, the CS module 500 periodically receives a GPS data stream from a GPS receiver that represents a most recent location of the user (assuming that the GPS receiver forms part of the wearable computer). In step 506, the module parses and stores the received GPS data.

In step 508, the CS module 500 determines whether it has received a request from the CM for a latitude, longitude or altitude attribute, or any combination of these attributes. If not, then the module loops back to step 504. If yes, then the module provides the requested attribute values to the CM together with timestamp, uncertainty, units and other fields or portions of the attribute. Referring to FIG. 5B, an example of the latitude attribute is shown as a data structure 520. The latitude attribute includes a latitude name 521 (e.g., "Latitude"), a latitude value 522, an uncertainty value 524, a timestamp 526, units 528 and a format version, flags or other data 530, all of which are discussed above. Data structures for the longitude and altitude attributes in this location attribute set are substantially similar.

Context servers may also produce intermediate-level attributes which are calculated from lower-level attributes for a thematic attribute set. For example, a speed attribute, representing the speed of the user, can be calculated directly by a sensor such as a pedometer (thus being a lower-level attribute), or can be calculated indirectly via information over time from the latitude, longitude and altitude attributes (via the GPS sensor). Other calculated attributes include an indication that the user is located in his or her office, is near his or her desk, and that there are no other people physically nearby. Thus, a thematic attribute set reflecting whether other people are present may include a motion detection attribute based on a signal provided by a motion sensor device located on the desk of the user that determines whether other individuals are in the user's office, and an ambient sound attribute to determine whether other voices may be heard within the user's office.

Higher-level condition variables or attributes can also be calculated and be included within thematic attribute sets, such as the user's current physical activities, the current user cognitive load, the desired level of privacy, and the desired scope of audience. Information from a microphone or directly from a cellular phone can indicate that the user is currently talking on their cellular phone, and the speed and motion sensor data can indicate that the user is walking. Since the user remains near his desk even though he is walking, the system can deduce that the user is pacing about his office or is walking on a treadmill. Such a user activity attribute demonstrates that variables can have multiple values, and that information such as a degree of belief or certainty in the value for a variable can be added and used by the system.

Figure 5A:
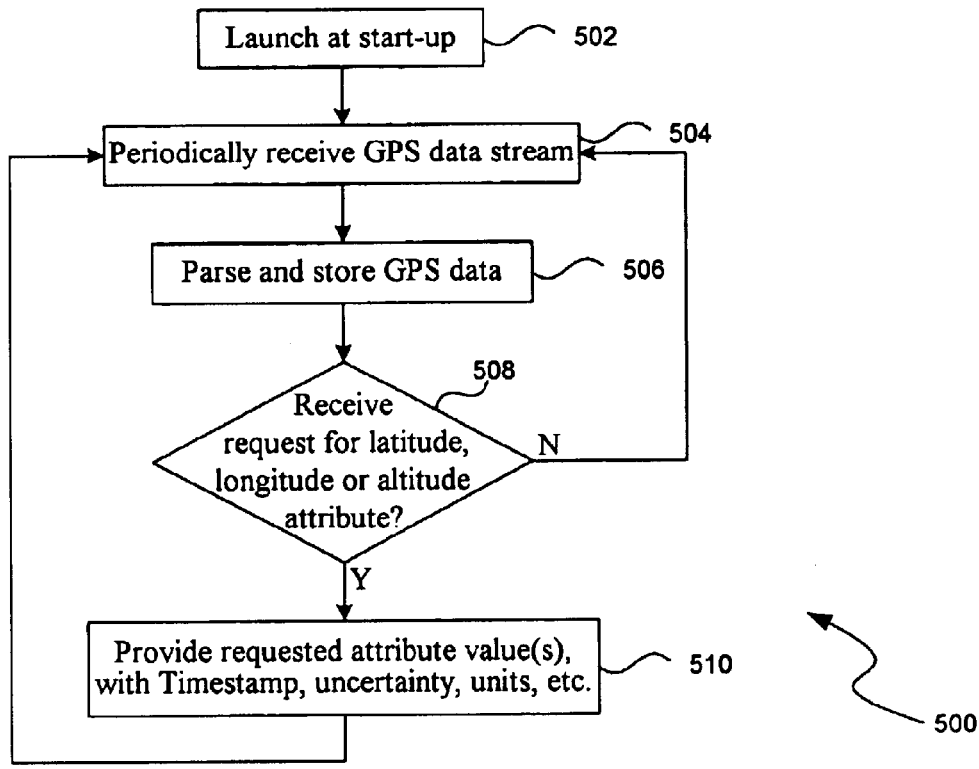
FIG. 5A is a flow diagram illustrating a context server for generating latitude, longitude and altitude attributes.
Figure 5B:
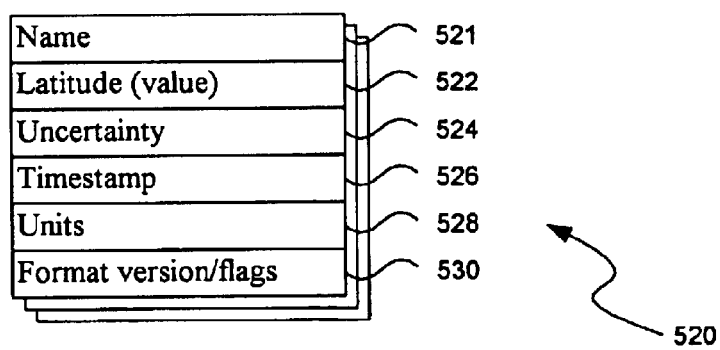
FIG. 5B is a data structure diagram illustrating fields or portions of a latitude attribute.
Figure 6:
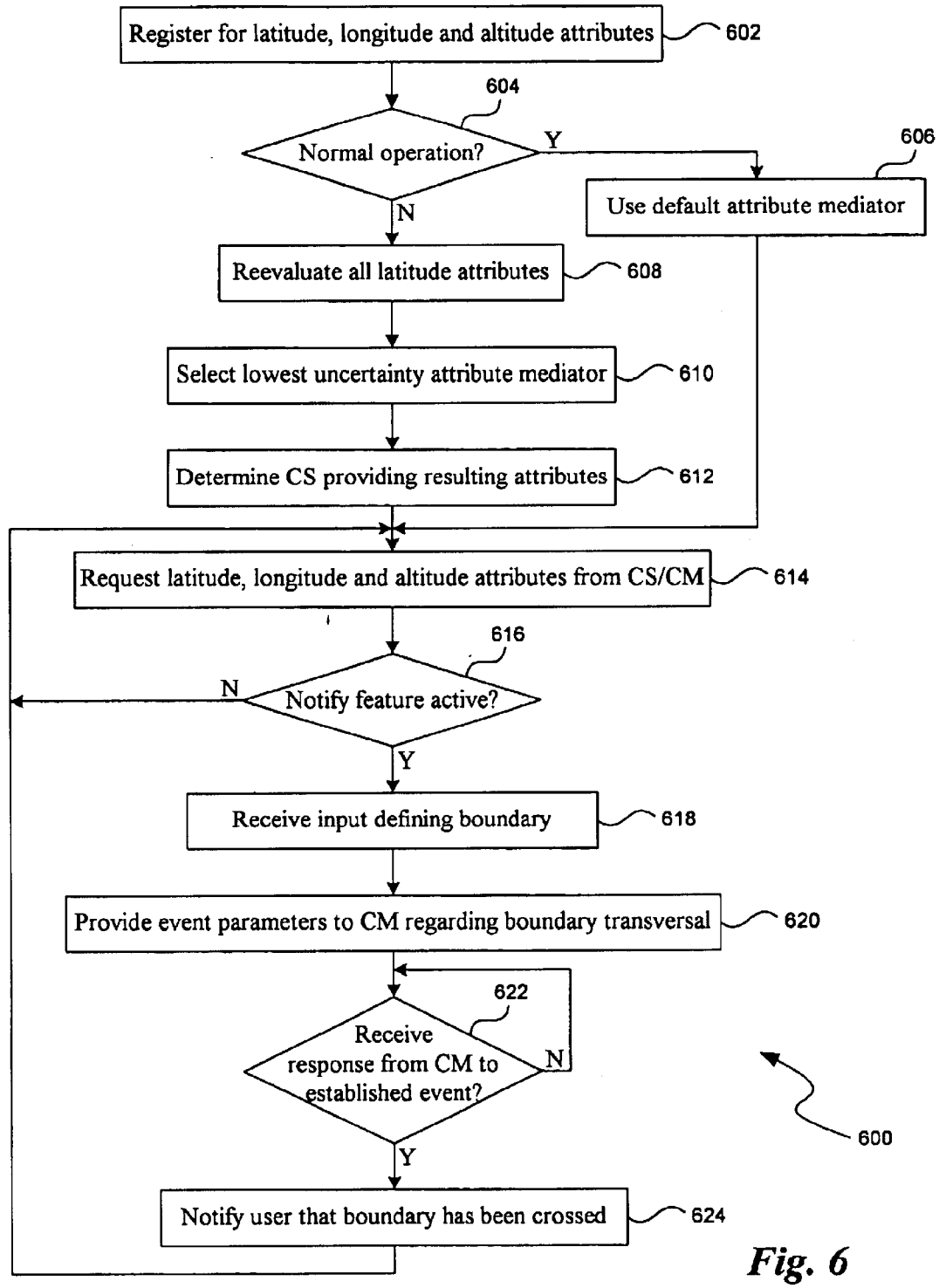
FIG. 6 is a flow diagram illustrating a context client for using latitude, i longitude and altitude attributes.

Referring to FIG. 6, an example of a context client (CC) is shown for using the low-level location attribute set provided by the module 500 of FIG. 5A. Beginning in step 602, a message handler in a location module 600 registers with the CM as having an interest in values of the latitude, longitude and altitude attributes. In step 604, the CC module 600 determines whether to operate under normal operation. If so, then the module accepts the default attribute mediator in the CM for providing the latitude, longitude and altitude attributes. If not, such as when the user desires a more accurate latitude attribute value, the module 600 in step 608 requests the CM to reevaluate all latitude attribute values from all CSes providing such data. Other types of CS modules able to produce latitude, longitude and altitude coordinates include location finding methods using cell sites, card readers or access entry points (particularly within a building or building complex), LORAN devices and the like. In step 610, the module 600 requests that the CM provide the latitude attribute whose value has the lowest uncertainty by specifying an attribute mediator that selects the attribute having the lowest uncertainty value. In step 612, the module 600 receives the lowest uncertainty latitude values and determines which CS provided the value.

In step 614, the module 600 requests values for the latitude, longitude and altitude attributes from the CM under default mode and determines whether it has received such attribute values. Alternatively, under a high accuracy mode, the module could request latitude, longitude and altitude attributes from the specific CS that provided the highest accuracy latitude attribute above (assuming that the specific CS provides values for all three of the attributes), and receive such attribute values in this step. The module 600 may also provide the set of location attributes it receives under step 614 to another module or process if appropriate, such as for indicating a current position of the user on a map image displayed on the head-mounted display 134 or flat panel display 130.

In step 616, the module 600 determines whether a notification feature of the module is active. Such a feature could be used to indicate whether the user has entered or exited a predefined area or boundary line. If such a feature is active, then in step 618 the module 600 receives user input defining boundary conditions, such as latitude and longitude coordinates defining a rectilinear area or simply coordinates identifying a single street or boundary line. For each such boundary, the module 600 creates corresponding conditions in the CM on the latitude and longitude attributes. While the module could instead periodically request and compare received attribute values to the boundaries defined under step 618, the use of CM conditions allows the module to offload this processing to the CM who can periodically check (e.g., every two seconds) to see if conditions have changed and the boundary has been crossed. Therefore, the module 600 in step 622 employs a message handler that simply determines whether a response is received from the CM based on the previously established condition. If so, then in step 624 the module notifies the user that the boundary was crossed, such as by providing an audio output to the earpiece speaker 132 or an unobtrusive visual display on the head-mounted displayed 134. If the module 600 employed a map attribute, then the location thematic attribute set could be expanded beyond, latitude, longitude and altitude attributes, to include map attributes (as well as other attributes that the module may employ).

The CS module 500 and CC module 600 are examples of simple context sources and clients; those skilled in the relevant art will readily recognize that more detailed modules with enhanced functionality can be created based on the teachings provided by such examples. For example, the CC module 600 could further include route-finding capabilities based on a specified destination. In particular, the CC 600 could present a list of predefined named places to the user via the head-mounted display 134, and allow the user to select a desired destination. The CC 600 could then identify the user's current location via attributes provided by the CS 500. The current location and destination point could then be sent via wireless Internet connectivity to a website that provides route-finding services. A map display CS could use the generated route to provide a map attribute having an appropriate map image value to the CC, which could then display the map via the head-mounted display 134. Alternatively, the route-finding service may provide step-by-step text data listing directions to the destination, which when received by the CC could similarly be displayed to the user. The CS and CC could also be configured to update directions as the user moves from the current location to the destination, or to provide a new set of directions if the user desires a new course (e.g., such as due to traffic, time constraints to reach an intermediate destination and the like). Under this example, the CC module 600 employs not only the location attribute set (including latitude, longitude and altitude attributes), but also a set of place name attributes, map display or route-finding service attributes (e.g., Internet links or resource locators), and the like—all of which form a thematic attribute set where the theme represents "route finding."

The CC module could also continually monitor the user's location and determine what named places are near. If the user has tasks associated with locations, the CC can notify the user when the user is approaching a place with an associated task, such as via the head-mounted display 134 or earpiece speaker 132. Tasks can also has associated priorities, and the notification could be conditional based on the task's priority level. In this manner, lower-priority tasks could be ignored or provide only minimal output on the head-mounted display 134, whereas higher priority tasks could provide greater visual display on the head-mounted display and/or an audible notification on the earpiece speaker 132. As an example, the user creates a new task entitled "Grocery List," together with information about the task such as all grocery items needed. The user than specifies that the task belongs to a given category, such as "Groceries." The category "Groceries" then has a place predefined, such as a favorite grocery store or a grocery store identified along a regular route (e.g., the route traveled from work to home). The CC then monitors the user's current location via latitude and longitude coordinates provided by the CM, and calculates corresponding distance to the grocery story. When the distance falls below a threshold value, the CC identifies tasks for the given category, such as the grocery list, and provides a notification to the user. Thus, under this example, the CC module employs a thematic data set including not only the location attribute set noted above, but also task attributes (representing links or resource locators for the user's stored list of tasks, including the grocery list)—which together represent a thematic data set where the theme is "tasks."

The CC module 600 or other context client/server modules may also be distributed to users on computer-readable media, such as optically or magnetically readable disks. The context client modules may be provided together with one or more context server modules, such as the CS module 500, or each module may be supplied separately. CC and CS modules could also be provided electronically (e.g., downloaded via a wired or wireless connection from the Internet) to users when they desire added functionality for their computers. Furthermore, the context server modules may not only be supplied separately, but also together with appropriate input devices, such as the CS module 500 being distributed together with a GPS receiver that a user may connect to his or her wearable computer 120. Thus, a CS module may be provided to a user to provide appropriate sets of attributes to the user, either alone or with appropriate input devices that may be required to generate the attributes under the CS. As another example, a self-contained biometric sensor, (e.g., a sensor sold under the brand name "LifeShirt" by VivoMetrics, Inc.), may be distributed with the cardiac condition CC 242, and/or with body temperature, heart rate, blood pressure and blood oxygen level context servers as noted above.

As yet another example, the user of the wearable computer 120 may wish to take up a new hobby such as scuba diving. As a result, the user may purchase or receive a thematic set of attributes related to the theme "scuba diving," as well as associated input devices. The user purchases, together as a package, a depth sensor, oxygen supply sensor, water current direction/velocity sensor, as well as additional input devices to replace existing devices (e.g., a video input device capable of being used under water). In addition, associated context servers can be purchased together with such input devices or separately, such as a water depth context server for producing a water depth attribute, an oxygen level context server for producing an oxygen level attribute, a water direction/velocity context server for producing a water current/velocity attribute, and the like. The thematic set of attributes associated with this underwater attribute set then includes the water depth, oxygen level, water direction/velocity and other attributes.

In addition to themes related to bodily activities (e.g., scuba diving and task performance) and to physical condition (e.g., location or cardiac condition), themes can also represent a mental or emotional state of a user, including a user's intentions or desires. For example, a cognitive load theme can include an attribute set whose individual attributes reflect context information such as whether the user is talking (and the volume of the speech), whether the user is talking on the phone, physical movement such as walking or driving, whether the user is stationary, whether the user is seated and stationary, ambient light and sound, stress and hunger levels, a level of rest (e.g., a low level due to a recent lack of sleep), current bodily activity such as reading e-mail or riding a bull, historical data (e.g., the user has a low threshold for cognitive load while watching baseball games), a physical or mental disability, location (e.g., at home or therapist's office), the presence and frequency of user input such as keyboard or mouse activity, the presentation of output information to the user, emotional state, explicit indications from the user, etc. Indeed, the cognitive load attribute thematic set can contain numerous individual attributes which when aggregated provide a rich model of a user's cognitive load.

Another thematic attribute set employing numerous attributes to derive a higher-level concept is a desired level of privacy theme or desired scope of audience theme. The desired level of privacy/desired scope of audience themes may include individual attributes representing context information such as the identity of others near the user, the proximity of others to the user, explicit tagging of activities or information (e.g., email in my personal account is private for only me, while email in my family account is private for family members), the nature of work being performed (e.g., balancing a checkbook, playing a computer game, or revising a business spreadsheet), location, historical data, explicit indications from user, and other attributes.

Figure 7:
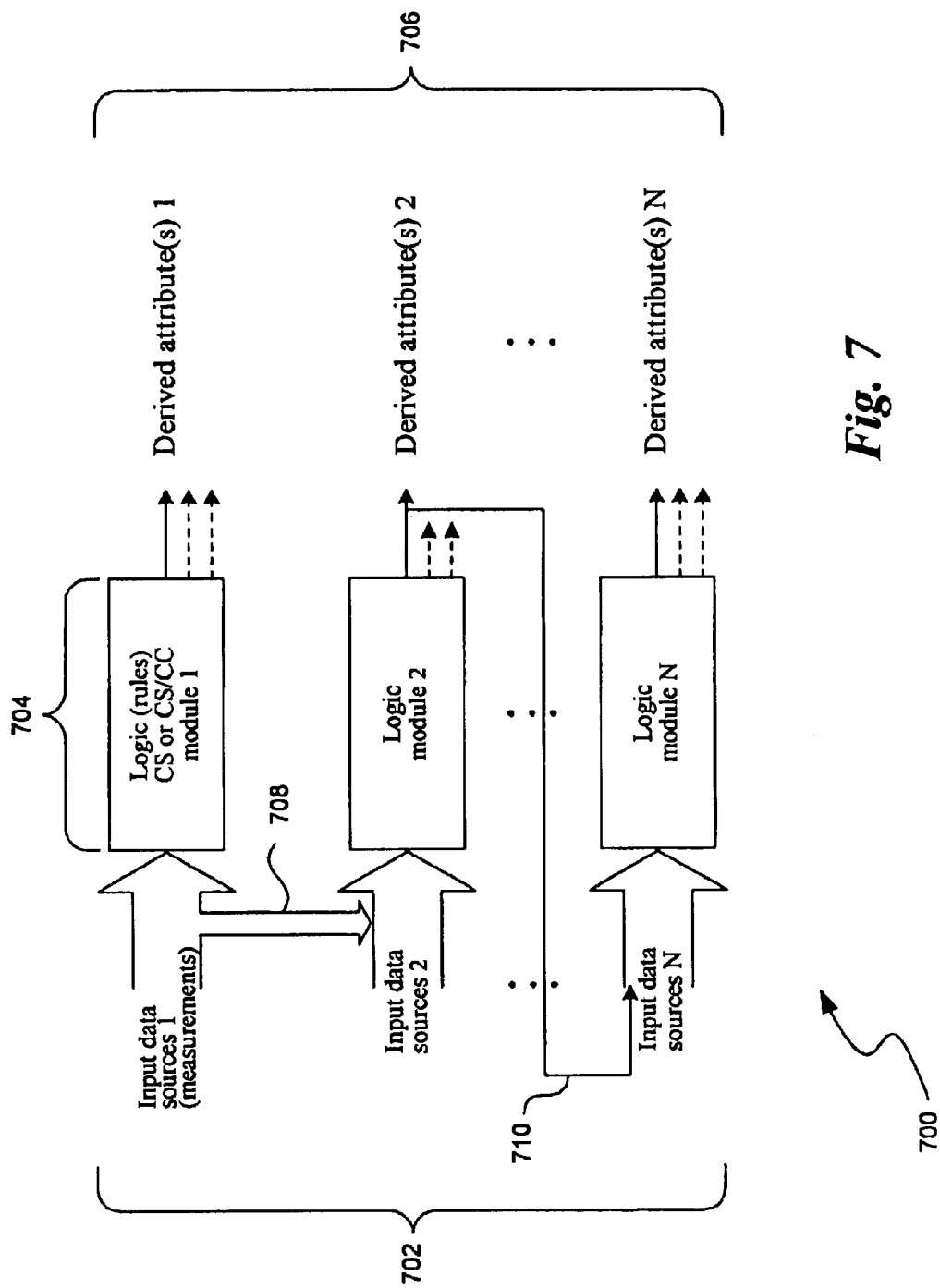
FIG. 7 is a schematic diagram illustrating how attributes are derived based on input data sources.

As can be appreciated from the above examples, individual attributes in a thematic set of attributes are generated or derived in any number of ways. Those skilled in the relevant art will appreciate that the values for the attributes can be stored in a variety of ways (e.g., a number on a scale of 1–100 or 0–255, a probability distribution, a value from a delimited set of possibilities, a fuzzy logic value, etc.). In addition, the above described detailed description of aspects of the invention may be abstracted to a more general model, such as that shown in FIG. 7. A representation of generating a thematic set of derived attributes based on input data sources, where such derived attributes may be used to model characteristics of a user, is shown schematically as a system 700. Numerous input data sources 702 (1, 2, . . . N) are fed into several logic modules 704 (1, 2, . . . N), which in turn produce respective derived attributes 706 (1, 2, . . . N). For example, Input Data Sources 1, representing measurements or signals from input devices, are fed into a Logic Module 1 that includes rules for producing Derived Attribute(s) 1. The Logic Module 1 may represent a CS or combined CS/CC. Likewise, a Logic Module 2 receives Input Data Sources 2 to produce Derived Attribute(s) 2. As shown by an arrow 708, the Input Data Sources 2 also include input data from Input Data Sources 1. Thus, logic modules may share input data sources. As shown by an arrow 710, logic modules may also provide feedback to one another, such as a Derived Attribute 2 being fed back as an input data source to the Logic Module N.

The logic modules 704 in the illustrated embodiment each process the input data signals to produce derived attributes that could not be directly measured from the input data signals. Thus, such logic modules may provide intermediate or high-level attributes for modeling a characteristic of a current state of the user. In other words, the logic modules aggregate, interpret and provide attribute values that in turn may be used to determine other characteristics of a user's situation or context. A thematic set of attributes based on a predetermined theme may be those derived attributes from each of the logic modules 1, 2, . . . N. Moreover, a larger thematic set of attributes could include all of the derived attributes from all of the logic modules, (i.e., Derived Attribute 1, Derived Attribute 2, . . . Derived Attribute N).

Importantly, each logic module may operate independently. For example, Logic Modules 1 and 2 produce at least Derived Attributes 1 and 2, and have no need for coordinating with each other. Logic Module N, however, is dependent upon an input data source that is a derived attribute from the Logic Module 2. Thus, Logic Module N produces Derived Attributes N that cannot be independently measured or derived without the Derived Attributes 2. For example, the Derived Attribute 2 may reflect the user's cardiac condition, whereby the Derived Attribute N may characterize a user's mood based in part on his or her cardiac condition.

Sets of attributes related to a common theme can be generated by one or more of the logic modules 704. For example, one logic module may produce a thematic set of attributes closely related to a given theme. The Logic Module 1, for example, may produce the location attribute set noted above by performing the steps of module 400 of FIG. 4. Likewise, two or more of the logic modules may together produce attributes related to a common theme. Thus, the logic modules include various specialized sets of rules that are used to model particular aspects, environments or personas of the user and to produce corresponding sets of attributes. For example, sets of rules and corresponding sets of derived attributes may be specialized based on occupation (e.g., a nurse, a secretary, a field technician, or a firefighter), gender (e.g., a woman's rules may understand physiological symptoms related to pregnancy or other female-specific conditions), age, or any of a variety of other specialization types.

A large number of themes can exist simultaneously or be used alternately. In general, each thematic set of attributes shares a common theme that characterizes or models a predetermined context of the user. What follows are examples of specialized themes for modeling characteristics of a user's current state.

Work—Attributes related to a work theme may include a location of the user's office, logical and telecommunications links for the user's e-mail, voicemail, and telecommunications connections, links to relevant employee handbook materials, office guidelines, policies, access codes for accessing elevators, rooms, floors, and the like. The work attribute set could be supplied to each new employee by the employer (including procedures, forms, access keys, etc. that are particular to the employer).

Entertainment—Entertainment attribute sets may include attributes related to a user's favorite web sites, television channels, music preferences, and the like. Attributes may be based on whether the user is participating or viewing, such as whether the user is participating in a sport or just viewing the sport. If viewing, for example, then a set of attributes may include relevant statistics, biographies on players, location of a sporting event, location of adjacent parking locations and restaurants, and the like.

Errands—such as the grocery store example above.

Health—such as the cardiac condition attribute set above; attributes may also include emergency services and reflect ways in which a user's wearable PC may help the user provide or receive emergency services.

Safety—attributes may include OSHA regulations, escape routes, cautionary warnings (e.g., based on whether the computer detects hazards) and so forth to protect workers in a hostile environment.

Home—including automatically adjusting environmental controls, selecting music and art, and so forth. A home attribute set may include attributes related to a desired ambient temperature, music volume, music selection, art genres to be displayed on high definition wall-mounted display devices, automatic door opening and unlocking features, access to hands-free telephone services such as voice mail and routing of incoming telephone calls, and the like.

Children—for example, employing the location attribute set above to identify whether a child can be authorized to be at a given location at a given time.

Place—such as the location CS and CCs explained above.

Law Enforcement—for example, employing the location attribute set above to apply parole requirements and ensure a person is at the right location at the right time.

Medical Personnel—A medical personnel attribute set would include numerous biometric attributes, particularly ones to be received from biometric sensors not related to a wearable computer worn by a medical service provider. Other attributes include attributes related to a patient's name, age, relevant insurance data, medical history, drug reactions, and the like. A medical personnel attribute set would be useful in distributed environments where wearable computers communicate with one another; for example, an EMT with a computer approaching a person may receive data wirelessly from the person's wearable computer, or a surgeon approaching an EMT may allow the EMT to communicate information about the person to the surgeon's wearable computer.

Routing—common couriers and retailers may use specialized sets of attributes to facilitate package/product routing.

Military—Attributes for a soldier or group of soldiers may include relevant biometric attributes, location attributes, output from a video input device, output from an audio input device or microphone, attributes regarding nearby soldiers, attributes regarding the soldier's mood, and the like. These place, health, and other attributes of a soldier may then be provided to regional headquarters, and ultimately to the Pentagon under a large hierarchical structure.

Astronaut/Scuba Pack—As noted above, specific attributes for a space or underwater environment include depth/altitude, pressure, oxygen levels, and the like.

Drivers/Pilots—Drivers or pilots of a car or plane or heavy equipment would expose certain attributes to the CM to allow a user to more effectively pilot or operate such equipment.

Mood—As noted above, attributes related to mood may include biometric information, such as the user's body temperature, galvanometric response, eye dilation attributes, brow furrowing sensor attributes, and the like. Additional attributes reflecting a mood attribute set include information reflecting a user's current activity (e.g., driving), speech patterns and tone, whether additional people are present and who such people are (e.g., ex-wife), and so forth.

Hostile Environment—Attributes related to a hostile environment include many attribute sets noted above, including those for the astronauts/scuba pack, safety and location. Other attributes may include attributes related to olfactory or chemical sensors that may detect the presence of harmful chemicals in the air, a motion sensor attribute to determine whether the user is being shaken, temperature sensors to detect ambient temperature, and the like.

Occupations—Attribute sets may differ for every human occupation. A computer programmer occupation attribute set may include numerous attributes related to logical data and telecommunications environment of the user, attributes related to database and numerous computer platforms with which the user may interact, and the like. Likewise, a patent attorney occupation attribute set may include attributes related to a smaller but different set of logical data and telecommunications links, including links to technical databases, previously drafted documents, patent office access attributes, as well as calendaring, contacts, docketing, word processing, and legal reference attributes.

A user's thematic set of attributes may well change as the user switches roles or context. For example, the computer 120 can load and employ the user's home attribute set when the user rises and prepares for work. In transit, the computer 120 may employ a commuting attribute set, which may include links to previously identified news information links or data feeds, together with cognitive load and user availability attributes. The commuting attribute set would then provide news information that the user wishes to read or hear when the computer determines that the user's cognitive load and availability are suitable. Once the user arrives at work, the user's role changes, and the computer loads and employs the user's appropriate work or occupational attribute set. Context servers that supply attributes not relevant to the occupational attribute set can be terminated. Of course, some attributes from the home and commuter attribute sets may still be relevant, and thus these context servers remain running (e.g., cognitive load or location attributes).

Under the above example, the computer 120 may switch themes from home to commuter and from commuter to work based on user specifications. Alternatively, the computer may automatically switch between themes based on other information, such as a time attribute. Thus, from 6:00 am to 8:00 am, the computer employs the home theme, but from 8:00 to 9:00 and 9:00 to 6:00, the computer employs the commuter and occupational themes respectively. Under another embodiment, the computer may employ another thematic set of attributes to determine which theme to employ. For example, the computer may employ information from the location theme when using the following rules: when located at home, employ the user's home theme; when moving rapidly (e.g., above 5 mph), employ the commuter theme; and when located at work, employ the work theme. When the computer is unsure as to which theme to employ, the computer may ask the user for input to select the desired attribute set. Of course, the user may override an automatically selected attribute set if desired.

In addition to switching between thematic sets of attributes (and corresponding context servers), the computer 120 may load and employ new thematic attributes while existing attribute sets remain active. For example, the user may travel to Guatemala to go scuba diving. Since the user does not know how Spanish and is unfamiliar with the area, the user may load a Guatemalan travel attribute set. The attribute set may include context servers (which produce corresponding attributes) for the following: translating Spanish language audio and text into corresponding English audio and text attributes, providing Guatemala etiquette attributes, hostile situation prediction attributes (if political tensions are high or the State Department has issued traveler warnings), and the like. Additionally, context servers may be required to be modified in light of the location, such as context servers for providing attributes based on the user's logical data and telecommunications state where access to telecommunications differ from those in the user's home location. These new thematic attribute sets may be loaded and employed with existing attribute sets, such as the scuba diving attribute set when the user is engaged in scuba diving in Guatemala.

The thematic attribute sets allow the user's wearable computer 120 to characterize the user's context and react accordingly. In other embodiments, such context characterization may be performed elsewhere. For example, lower-level attribute and context characterization may be performed by remote sensors, with such attribute sets provided to the user's computer 120 that can in turn be provided or presented to the CM and context clients. This may be one way in which users may optimize their wearable computers. Other ways involve business or situation-specific occasions where the wearable computer responds to and changes the computer itself or the context characterizations that are presented to the user. As an example, a previously created thematic attribute set with respect to a particular occupation (e.g., law enforcement) can be loaded by the computer to readily provide more accurate contextual information to the user without human intervention. While a simpler context characterization system may ultimately correctly determine the user's context in a law enforcement environment, providing a specialized thematic attribute set for law enforcement significantly shortcuts the computer's learning process.

Each thematic attribute set may also include relationships between attributes (e.g., inter-attribute logic) based on the theme. In one embodiment, attributes may be selected from sets of predefined attributes available for all context servers and clients. Such predefined sets of attributes allow a common meaning to be shared between context clients and context servers for those attributes and their associated values, and can also allow a context client to request a pre-defined attribute without having to determine whether the attribute has been created by a context server.

In one embodiment a plain-language, hierarchical, taxonometric attribute nomenclature is used to name attributes, such as the example attribute nomenclature illustrated in FIG. 8. The names within the nomenclature are preferably specific so that there is no ambiguity as to what they represent, and the ability to extend the nomenclature by adding new attribute names that conform to the hierarchical taxonomy of the nomenclature is preferably supported. The nomenclature preferably has attribute names relating to a variety of aspects of the user. For example, as is illustrated in FIG. 8, the nomenclature preferably has attribute names relating to the user's location, such as user.location.latitude, user.location.building, and user.location.street; the user's movement, such as user.speed and user.direction; various user moods, such as user.mood.happiness, user.mood.anger, and user.mood.confusion; user activities, such as user.activity.driving, user.activity.eating, and user.activity.sleeping; user physiology values, such as user.physiology.body_temperature and user.physiology.blood_pressure; similar attributes of people other than the user, such as person.John_Smith.mood.happiness; attribute names for aspects of the computer system (or "platform") and its user interface (or "UI") capabilities, such as platform.UI.oral_input_device_availability and platform.UI.visual_output_device_availability; attribute names for attributes relating to the central processing unit (or "CPU") of the platform, such as platform.cpu.load and platform.cpu.speed; attribute names for aspects of the local environment, such as environment.local.temperature and environment.local.ambient_noise_level; attribute names for remote environments, such as environment.place.chicago.time and environment.place.san_diego.temperature; and attribute names relating to specific applications (e.g., aspects of an email application), such as application.mail.available, application.mail.new_messages_waiting, and application.mail.messages_waiting_to_be_sent. In this manner, the attribute nomenclature provides effective names for attributes relating to the user, the computer system, and the environment. Additional attributes are illustrated in FIG. 8, while FIG. 9 illustrates an alternate hierarchical taxonomy related to context, such that various attributes could be added for each of the illustrated categories. Those skilled in the art will appreciate that for both FIG. 8 and FIG. 9, other categories and attributes could be added and existing categories and attributes could be removed or could have alternate names.

Based on the above, those skilled in the relevant art can appreciate that separate thematic attribute sets may be created by selecting individual attributes from the hierarchy presented in FIG. 8 or in FIG. 9. For example, an occupational set of attributes may include: User.Location, User.Destination, and User.Proximity (selected from the User attributes of FIG. 8), [Secretary].Location, [Secretary].Activity and [Secretary].Availability (selected from the Person attributes), Environment.Local.Time and Environment.Local.Date (selected from the Environment attributes) and Application.Mail and Application.Phone (selected from the Application attributes).

Furthermore, under another embodiment, thematic sets of attributes fall into any of the following general classes:

1. Attributes related to the user's body and senses, including visual, auditory, health and physiology;
2. Attributes related to the user's feeling, including mood and general temperament;
3. Attributes related to the user's place and movement with respect to places, including transportation, vehicles, physical environment, home, office, and the like;
4. Attributes relating to measurement and shape including size, form, texture and the like;
5. Attributes relating to living things and natural phenomenon, such as plants, animals, weather and the like;
6. Attributes relating to the user's behavior and will, including veracity, motivation, impairment, skill and the like;
7. Attributes relating to language, including means of communication, language, diction, meaning and the like;

8. Attributes relating to society and institutions, including family, school, friendship, management and the like;
9. Attributes relating to values and ideals, including right/wrong, justice/injustice, religion, ethics and the like;
10. Attributes relating to arts, including literature, motion pictures, architecture and the like;
11. Attributes relating to occupation and crafts, including financial matters, user's vocation and avocations, and the like;
12. Attributes related to sports and amusements, such as baseball, skiing, card playing and the like; and
13. Attributes related to science and technology, including the user's computer, logical and telecommunications connectivity and environment, physical qualities of materials, pure and applied sciences and the like.

Many of the above classes of attributes reflect three states of a user's context: a state of the user, a state of the user's physical surroundings, and a state of the user's logical data and telecommunications environment. The state of the user includes not only the user's physical and health condition, but also the user's mood, predisposition, preferences, memory and the like. The user's physical surroundings include the state of the user's computer, the user's physical location, the user's home, office, and common surroundings, and the status of those surroundings. The user's logical data and telecommunications environment ("virtual environment" or "cyber surroundings") reflect connectivity between the user's PC and external computing devices and/or data stored external to the user's wearable computer. For example, the user's logical data and telecommunications environment may represent IP addresses or ports to which the user's computer may couple or interface to exchange data with the external world, as well as to access the user's data such as from databases.

In a broad sense, aspects of the invention are directed to any data processing system for use by a user. The data processing system includes at least first and second data sources, at least one data output receiver, and at least one processing unit with associated memory. The data sources provide respective first and second data signals, where the first and second data signals each reflect the state of the user, a state of the user's physical surroundings, or a state of the user's logical data and telecommunications environment. The first and second data signals together represent a thematic data set characterizing the user's context. The processing unit receives the first and second data signals and executes at least one processing routine that receives the first and second data signals and provides an output signal to the data output receiver, with the output signal representing a characteristic of a current state of the user that cannot be directly measured from the first and second data signals. The processing unit may also execute another processing routine that employs the first and second or other data signals to represent another characteristic of a current state of the user, with the two processes operating independently.

Those skilled in the relevant art will also appreciate that specialized versions of the body-mounted computer 120, characterization system 100, context servers and context client can be created for a variety of purposes. For example, embodiments of the system can be customized for particular professions to better enable the system to automatically create context models for members of those professions—in some such situations, the computer 120 may include a particular set of input devices and associated context servers for producing attributes for a particular profession. Alternately, embodiments of the characterization system can be customized for users' health problems, such as for people with Alzheimer's disease, cardiac disease or pulmonary concerns. Those skilled in the relevant art will appreciate that a variety of such physiological conditions can be monitored, and that other specialized versions of the system can similarly be implemented.

Thus, as discussed above, themes can be used to represent a wide variety of types of contextual aspects or situations, and often reflect high-level concepts of activities or states that may not be captured with individual attributes. In addition, information from and about current themes can be used by a computing device (e.g., a wearable computer) to provide appropriate responses as the current context changes. In particular, in some embodiments information about one or more current themes is used (e.g., by one or more executing CCs) to present appropriate information and provide appropriate functionality to a user of the device.

In order to use information about a current theme to present appropriate information and functionality, it is first necessary to identify a theme that matches the current context. In an illustrative embodiment discussed below, each theme specifies a set of multiple attributes, and includes for each of the specified attributes one or more possible values for the attribute. Such a theme will match the current modeled context only if all the specified attributes have current values in the modeled context that are one of their possible values. In some embodiments, moreover, each specified attribute also includes an indication of whether it is required for the theme, and in such embodiments the theme can still match the current context even if the current values for non-required attributes do not match the specified possible values. Those skilled in the art will appreciate that in some embodiments all specified attributes may be treated as being required, while in other embodiments attribute relevance can be specified in other ways (e.g., as optional, preferred, disfavored, with a numerical ranking, etc.). In addition to specified attributes, each theme can also specify inter-attribute logic. Such logic can provide various functionality, including allowing for more sophisticated determination of whether a theme matches the current context by concurrently analyzing multiple attributes in the specified set, such as by using boolean logic (e.g., (Attribute1[value]="High" OR Attribute2[value]>10) AND NOT Attribute1[Uncertainty]="High") or other types of processing.

Those skilled in the art will appreciate that any changes in the modeled context can cause the current theme to no longer match the current context and/or cause another theme that did not match the previous modeled context to now match the current context. As such, the theme that is identified as the current theme can rapidly change based on the changing context. If a change in the modeled context causes the previous current theme to no longer match the current context and no other themes match the current context, various techniques can be used to continue to provide appropriate responses to the user. In some embodiments the previous current theme will continue to be treated as the current theme until another theme matches the current modeled context. In other embodiments the user could be prompted, or other logic or information (e.g., default or preference information) could be used, to select a non-matching theme as a temporary current theme. In yet other embodiments, additional themes may be loaded or retrieved in an attempt to make available a theme that matches the current modeled context. Alternately, no theme may be identified as the current theme until changes in the modeled context (or in one of the available themes) causes one of the available themes to match the context.

In the illustrative embodiment in which theme information is used to present appropriate information and provide appropriate functionality, each theme has at least one associated theme layout that indicates information and functionality appropriate to that theme. These theme layouts assist in presenting appropriate information and functionality controls to a user. In particular, each theme layout can indicate specific content or types of content appropriate for that theme, data logic (e.g., an executable script) for processing content before presentation (e.g., to manipulate COM objects to retrieve data or to establish a connection to an external database to allow retrieval of data), presentation logic (e.g., instructions or preferences) to determine how the content should be presented to the user in a manner consistent with the theme, and functionality controls consistent with the theme that allow interaction by the user with presented (and non-presented) content. When a theme is selected as the current theme, one of the theme layouts associated with that theme can then be used to provide to the user information and functionality appropriate to the current theme.

In some embodiments, multiple themes can simultaneously match the current context, and these matching themes are referred to as the current theme set. For example, a user may both be "At Work" and "In A Meeting," or "At Work" and "Talking On The Telephone." Even though a user may simultaneously be involved with or part of multiple matching themes, each of the themes may have different types of appropriate information and functionality. For example, if the "At Work" theme is the only current theme, the user may desire to see their work to-do list and indications of other co-workers who are nearby, while if the user is talking on the telephone the user may prefer to have access to information about the other people that are part of the conversation as well as a functionality for taking notes. Thus, in order to determine what information and functionality is to be presented to the user at any time, a mechanism is needed for selecting one or more appropriate theme layouts for presentation. In the illustrated embodiment, only a single theme layout is presented at a time, and therefore the selection mechanism first identifies one of the themes in the current theme set as being the current theme. After the current theme is identified, one of the theme layouts associated with that theme can then be selected as the current theme layout for presentation to the user.

Those skilled in the art will appreciate that in other embodiments multiple theme layouts (whether they are associated with a single current theme or with multiple themes, such as the multiple themes in the current theme set) could simultaneously be used to provide appropriate information and functionality to a user, such as in different windows on a display device, by using multiple output devices, by synthesizing some or all of the multiple theme layouts together into a single presentation, etc. Those skilled in the art will also appreciate that even though one of the themes in the current theme set may be identified as the current theme for purposes of determining what theme layout to use, other types of processing may concurrently be occurring (e.g., in the background) for other themes in the current theme set. For example, a safety theme could execute in the background while a user is driving a car, and if a safety theme rule or other logic is triggered (e.g., by a road-traction attribute having its value change to "slippery") the safety theme could take appropriate action (e.g., modify the value of a context attribute, override the current theme layout and present a warning message, notify an executing software module to log detailed context information, etc.).

The selection of a current theme from multiple matching themes in the current theme set can be performed in a variety of ways. At a conceptual level, the user will typically desire to receive the information and functionality for whatever theme the user subjectively considers to be the most important at that time (e.g., the primary focus of their attention or interest, or the most theme conveying the most urgent or critical information), and thus it is preferable to select that theme as the current theme. In some situations the various themes may contain information to facilitate the selection, such as a priority. If so, the highest priority theme in the current theme set could be selected as the current theme. In other situations, user-specific information could be used to select the current theme, such as by using user-specific preference information (e.g., that is Predefined by the user) or by allowing the user to explicitly select one of the themes in the current theme set (or to override the current theme set and select a theme that does not match the current modeled context). Alternately, in some embodiments the themes in the current theme set could have an associated degree of match (e.g., by using the presence or absence of non-required attributes for the theme), and the theme with the highest degree of match could be selected. In yet other embodiments, themes could be grouped or associated with each other in various manners, and such groupings could be used to select the current theme. For example, a theme such as the "At Work" theme may be a relatively high-level general theme that has more-specific sub-themes (e.g., "Attending A Meeting" or "Writing A Memo")—if so, the most-specific (or least-specific) matching theme could be selected as the current theme. Similarly, a general "Talking To Another Person" theme could have one or more more-specific sub-themes such as "Talking To Spouse" theme—those skilled in the art will appreciate that the types of information of interest may differ based on the people, objects or places that are of current relevance. Alternately, themes could be categorized in various ways (e.g., entertainment, convenience, productivity, and safety), and the current theme could be selected on the basis of belonging to a category of current highest importance or interest. Those skilled in the art will appreciate that a current theme could be selected in a variety of other similar ways.

In a similar manner, the selection of a current theme layout for the current theme can be performed in a variety of ways. In some embodiments, each theme will have only one associated theme layout, and if so the single theme layout associated with the current theme is selected. In other embodiments different theme layouts for the same theme could be specialized for different situations (e.g., optimized for different types of output devices, different times of the day, week, month or year, different geographical locations, etc.), and if so the most appropriate theme layout for the current situation could be selected. In yet other situations one of the theme layouts associated with the current theme is a default theme layout, and if so it will be initially selected as the current theme layout. Alternately, the user could be prompted to indicate which theme layout to be used for the current theme layout, either before or after any of the theme layouts for the theme have been presented. If user preference information is available (e.g., predefined information), such information could also be used in place of an explicit user indication.

Those skilled in the art will also appreciate that even if a single theme layout is associated with the current theme, that theme layout could include logic or other information that allows it to optimized or modified in various ways depending on the context at the time it is presented. For example, the single theme layout could include information to optimize the output for different output device types, or to change the information and/or functionality available based on information about the user (e.g., the user's demographic information, current occupation, a characterization of the user as a novice or an expert with respect to the current theme, a current role in which the user is acting such as a system administrator rather than an ordinary user, a current mode of the user such as work or a social environment, etc.).

Figure 10:
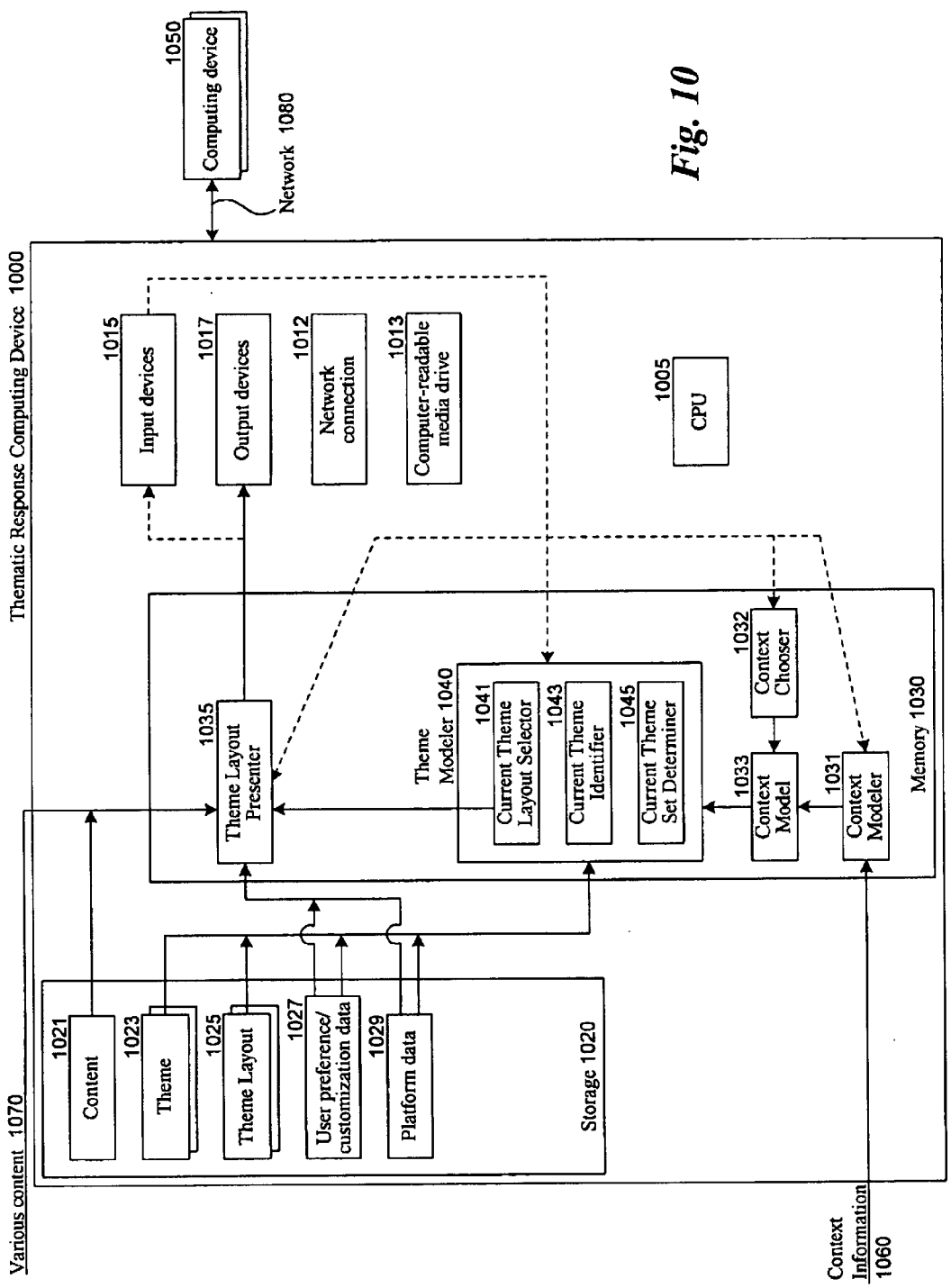
FIG. 10 is a block diagram illustrating an embodiment of a computing device suitable for using theme and theme layout information to present appropriate information and functionality to a user based on the current context.

FIG. 10 is a block diagram illustrating an embodiment of a computing device suitable for using theme and theme layout information to present appropriate information and functionality to a user based on the current context. In particular, a Thematic Response computing device 1000 is illustrated that can combine various context, content, theme, and user information in order to provide appropriate responses to the user based on the current theme. In some embodiments, the Thematic Response computing device may be a wearable personable computer that stores and executes each of the illustrated modules and data structures, while in other embodiments other computing device configurations are possible.

The computing device includes a CPU 1005, a storage 1020, memory 1030, and various I/O devices that include a network connection 1012, a computer-readable media drive 1013, various input devices 1015 and various output devices 1017. The storage includes various data specific to the computing device and the device user (not shown), including stored content 1021 for presentation, multiple user-specific themes 1023 (e.g., themes that have been previously created by the user and/or downloaded to the device and customized by the user), multiple theme layouts 1025 that are associated with the themes, various user preference and customization data 1027, and various platform data 1029 related to the computing device. In other embodiments that focus on using theme-related information to provide appropriate responses to the user other than the presentation of appropriate information, the theme layouts may be replaced by or supplemented with other types of theme response indicators that are associated with the various themes.

Various modules are executing in the memory, and they use various data (including the stored data) to provide appropriate information and functionality to a user of the computing device. In particular, a Context Modeler component 1031 is executing in memory in order to create and maintain a context model 1033 that describes the current context of the computing device and the device user. As previously discussed, the Context Modeler component can receive various context information 1060 that is already in the form of context attributes, or it can instead process received context information in order to convert it to context attribute form, and then stores current values (and other associated information) for the context attributes in the context model as previously discussed. In some embodiments, the Context Modeler component could be a collection of one or more CSes, or could instead be a CM receiving such information from other CSes that are not shown. Those skilled in the art will appreciate that in other embodiments the Context Modeler component could be executing on another device and/or the context model could be stored on another if the computing device has access to that other device.

A Context Chooser component 1032 is also executing in memory. The Context Chooser component allows the user to explicitly set or modify various types of context information, and makes corresponding changes to the context model 1033. In so doing, the Context Chooser component can present appropriate information (e.g., current values for specified types of context information and interaction controls to allow value modification) to the user via one or more of the output devices, and can receive instructions and new context information from the user via the input devices. In some embodiments, there is a theme associated with the user explicitly modifying the current context information, and the user interface of the Context Chooser component is implemented via one of more theme layouts associated with that theme.

The memory also includes an executing Theme Modeler component 1040 that repeatedly identifies a current theme set having defined themes that match the current context, selects a current theme, and then selects an appropriate type of response based on the current theme. In the illustrated embodiment that focuses on presentation of appropriate information and functionality, the selection of an appropriate type of response includes selecting a current theme layout to be used in presenting appropriate information and functionality to the user. Those skilled in the art will appreciate that in some embodiments the Theme Modeler component could be implemented as a CC.

The Theme Modeler component includes sub-components that includes a Current Theme Set Determiner 1045, a Current Theme Identifier 1043, and a Current Theme Layout Selector 1041. The Current Theme Set Determiner component receives information about the current context from the context model 1033 and about the defined themes 1023, and determines a current theme set by identifying the themes that match the current context. In some embodiments, the Current Theme Set Determiner component creates or updates a current theme set data structure (not illustrated) in memory or on the storage.

The Current Theme Identifier component then receives information about the themes in the current theme set, and selects a current theme that is intended to reflect the current or new focus of the user's attention. In some embodiments, the Current Theme Identifier component will use user preference data and/or platform data in order to assist in the selection of the current theme. In some embodiments, the Current Theme Identifier component will create or modify a current theme data structure (not illustrated) in memory or on the storage.

The Current Theme Layout Selector component next receives information about the current theme and about one or more theme layouts that are associated with the current theme, and selects one of the theme layouts to be used to present information to the user. In some embodiments, the Current Theme Layout Selector will use user preference data and/or platform data in order to select the current theme layout. In addition, in some embodiments the Current Theme Layout Selector component will create or maintain a current theme layout data structure (not illustrated) in memory or on the storage.

A Theme Layout Presenter component 1035 is also executing in memory, and it is responsible for the presentation of appropriate information and functionality to the user. As with the Theme Modeler component, the Theme Layout Presenter component could be implemented in some embodiments as a CC. The Theme Layout Presenter component receives information about the current theme layout, and processes that theme layout to generate an appropriate presentation for the user. In particular, the Theme Layout Presenter component will gather various content that is specified by the current theme layout, whether it is stored as part of the current theme layout, stored separately as content 1021 on the computing device, or stored externally as various content 1070. The Theme Layout Presenter component can also receive and use user preference and/or customization data, such as to adjust the presentation for user preferences (e.g., to use a specified a appearance scheme, or to use specific types of user interaction controls) or to customize a default theme layout in various ways. In a similar manner, the Theme Layout Presenter component can also receive and use platform data to adjust the presentation, such as to determine available and/or optimal output devices, or to optimize the information and interactions to be presented based on the output devices to be used. While not shown in the illustrated embodiment, the Theme Layout Presenter component could also in some embodiments receive and use various context information from the context model.

After gathering the appropriate information and processing it as needed, the Theme Layout Presenter component then presents the appropriate information and interaction controls on the appropriate output devices. In some embodiments, the Theme Layout Presenter component will also selectively control various input devices, such as to enable or disable such devices depending on the available interaction controls and functionality of the current presentation. In addition, in some embodiments information received from the user via the input devices can be provided to and used by Theme Layout Presenter component in order to modify the current theme layout presentation, or could similarly be provided to and used by the Context Modeler component, Context Chooser component, and/or Theme Modeler component. Those skilled in the art will appreciate that in other embodiments that focus on providing appropriate responses based on the current theme that involve responses other than presenting appropriate information, the Theme Layout Presenter component could be replaced by or supplemented with a more general Theme Response Generator component.

In the illustrated embodiment, the Thematic Response computing device is also communicating with other computing devices 1050 via a network 1080. Those skilled in the art will appreciate that in other embodiments the Thematic Response computing device may execute as a self-contained stand-alone device. Conversely, in other embodiments some or all of the stored data or executing components may be located on one or more of the other computing devices, with the data or execution results provided to the Thematic Response computing device as needed. For example, in some embodiments the Thematic Response computing device could be a thin client that had little or no computing or storage capabilities, instead acting merely as a input device and/or an output presentation device for other computing devices. In addition, those skilled in the art will appreciate that the Thematic Response computing device can obtain content and context information from a variety of external sources, including one or more of the computing devices 1050 and other external data sources (not shown).

Those skilled in the art will appreciate that computing devices 1000 and 1050 are merely illustrative and are not intended to limit the scope of the present invention. Computer system 1000 may be connected to other devices that are not illustrated, including through one or more networks such as the Internet or via the World Wide Web (WWW). In addition, the functionality provided by the illustrated components may in some embodiments be combined in fewer components or distributed in additional components. Similarly, in some embodiments the functionality of some of the illustrated components may not be provided and/or other additional functionality may be available. For example, in some embodiments automated context modeling functionality may not be provided, while in other embodiments additional functionality may be available to allow a user to create, modify, customize, distribute, retrieve, purchase, sell, and otherwise use themes and theme-related information.

Those skilled in the art will also appreciate that, while various components and the context model are illustrated as being stored in memory while being used, these items or portions of them can be transferred between memory and other storage devices for purposes of memory management and data integrity. Similarly, data illustrated as being present on storage while being used can instead be present in memory and transferred between storage and memory. Alternately, in other embodiments some or all of the software modules may execute in memory on another device and communicate with the computing device 1000 via inter-computer communication. Some or all of the components or data structures may also be stored (e.g., as instructions or structured data) on a computer-readable medium, such as a hard disk, a memory, a network, or a portable article to be read by an appropriate drive. The components and data structures can also be transmitted as generated data signals (e.g., as part of a carrier wave) on a variety of computer-readable transmission mediums, including wireless-based and wired/cable-based mediums.

In addition, a computing device or computer may comprise any combination of hardware or software that can provide storage, provide processing, provide input or output capability, and/or interact with other devices that provide such capabilities, including computers, network devices, internet appliances, PDAs, wireless phones, pagers, electronic organizers, television-based systems and various other consumer products that include inter-communication capabilities. Accordingly, the present invention may be practiced with other computer system configurations.

Figure 11A:
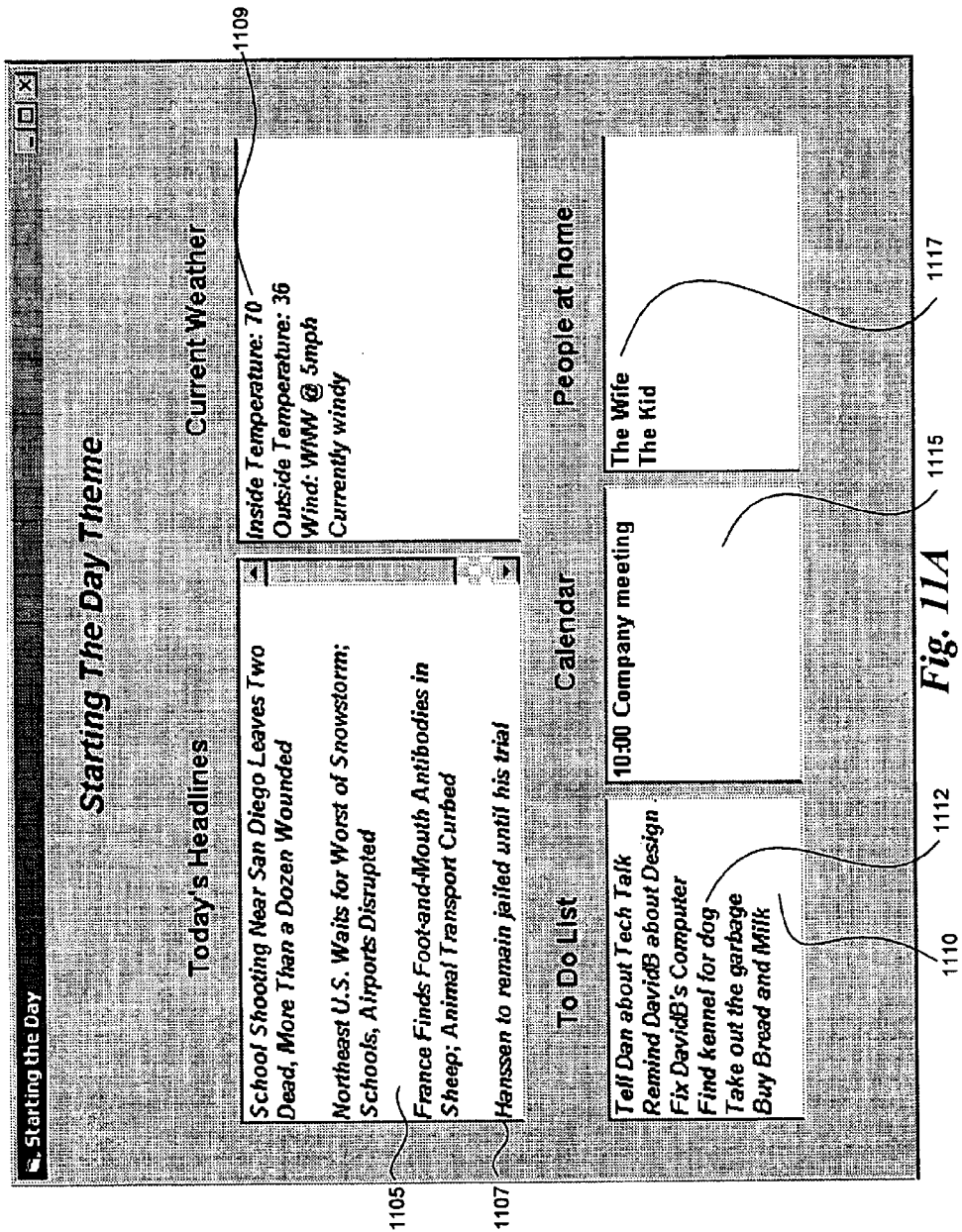
FIGS. 11A–11L provide various examples of changing theme layout presentations based on changes to a current context.
Figure 11B:
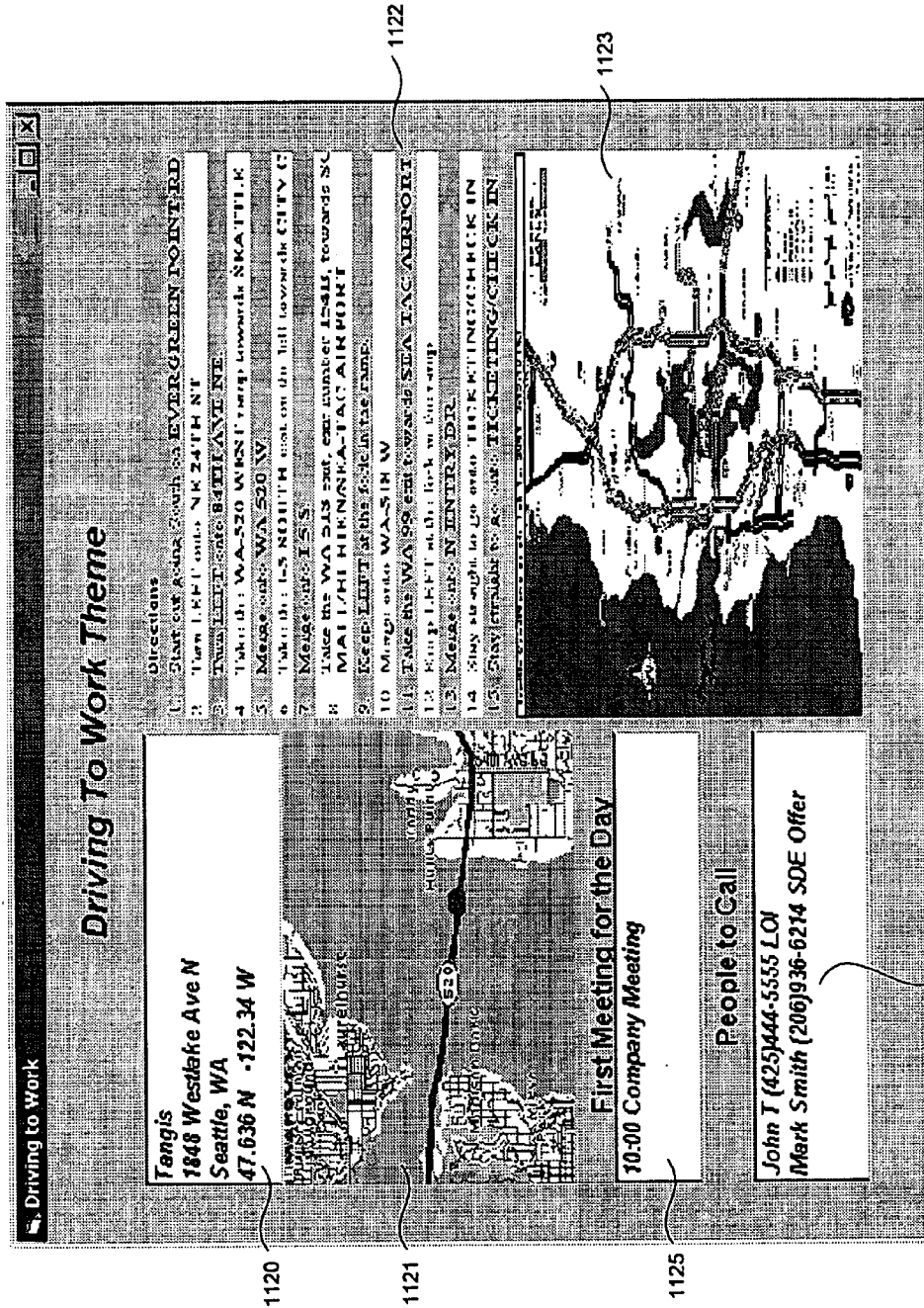
Figure 11C:
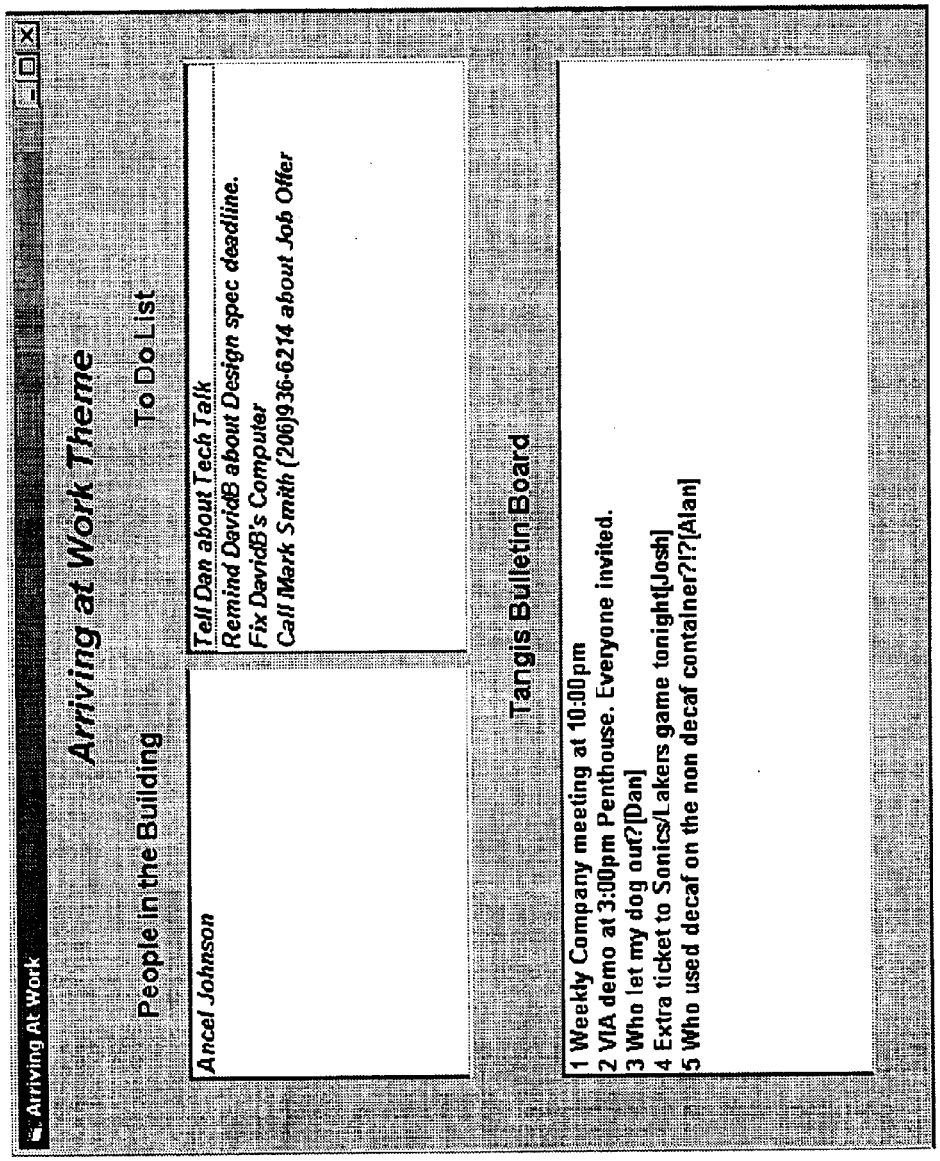
Figure 11D:
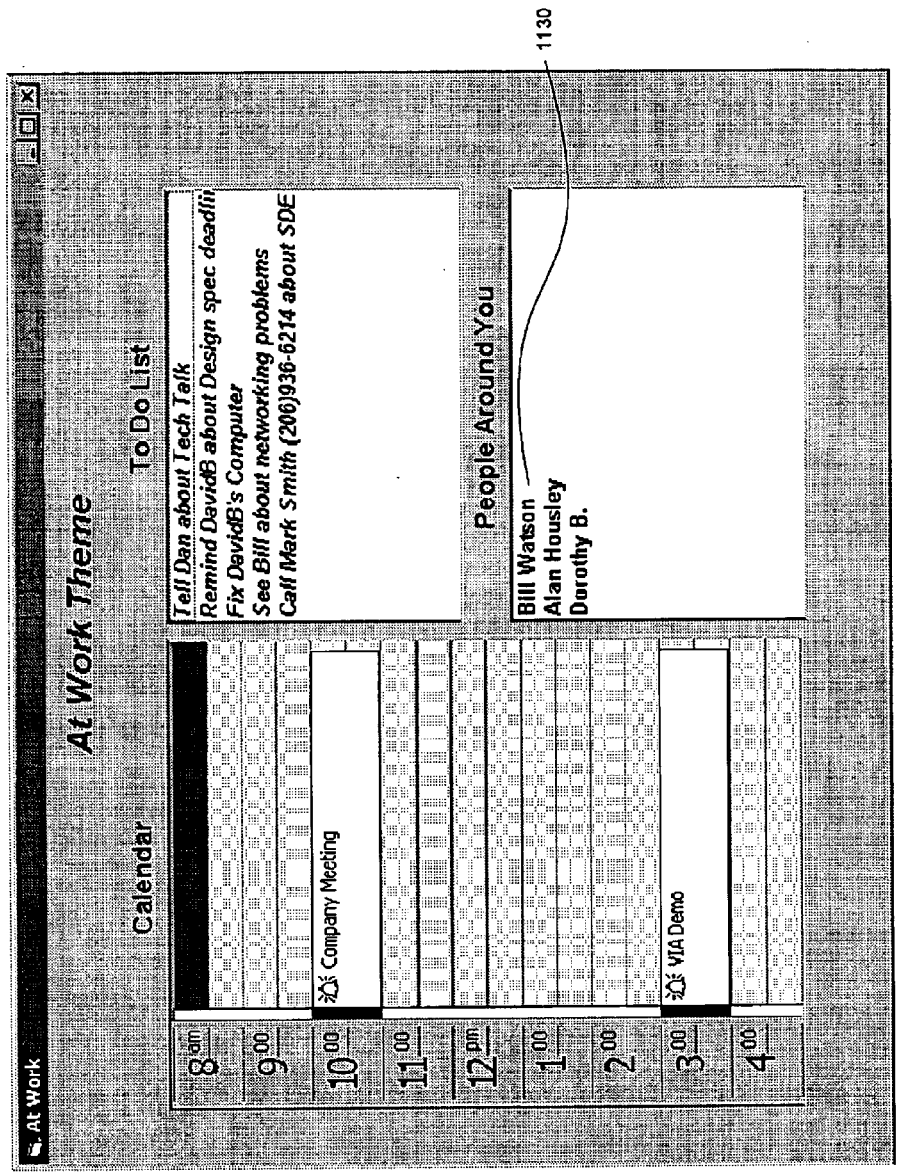
Figure 11E:
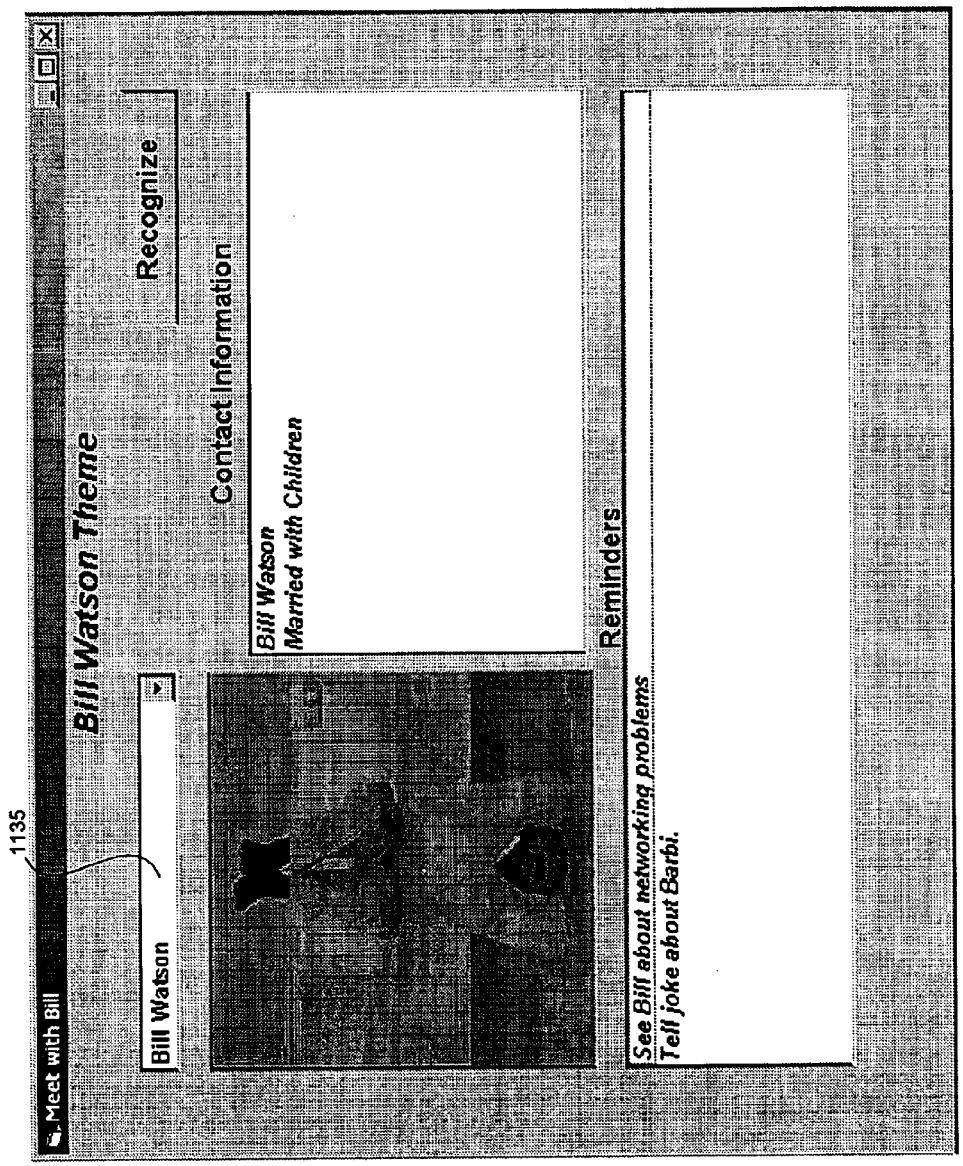
Figure 11F:
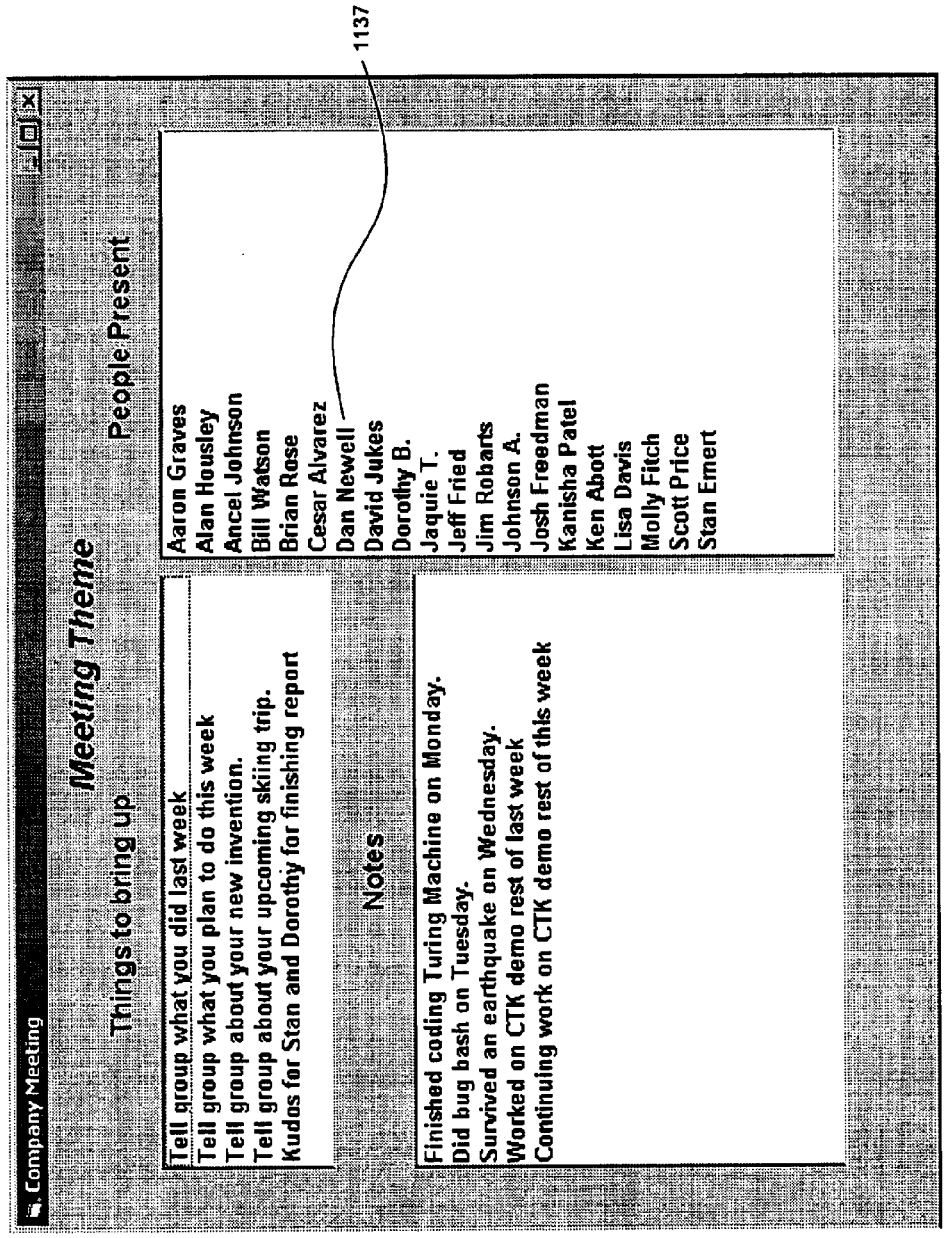
Figure 11G:
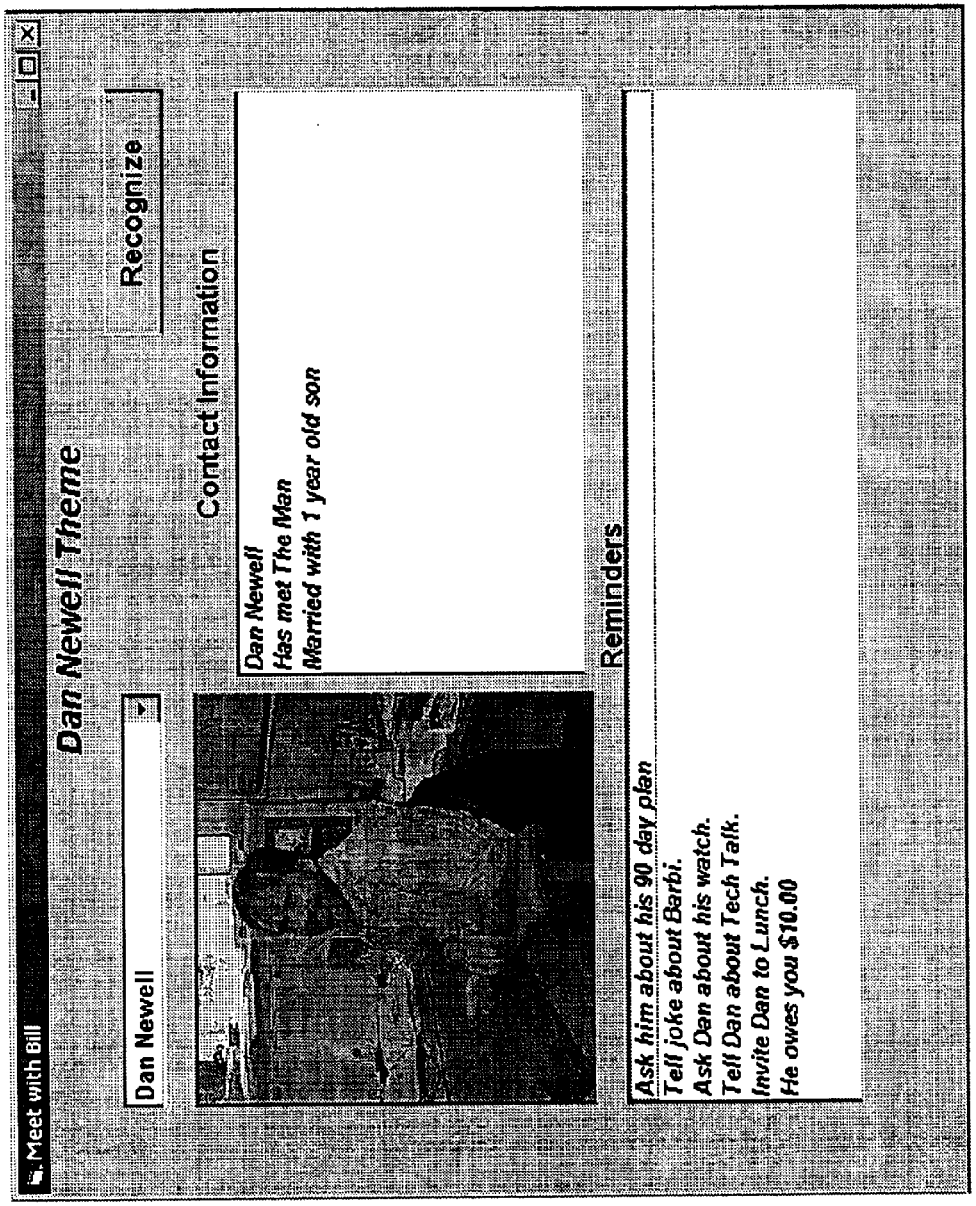
Figure 11H:
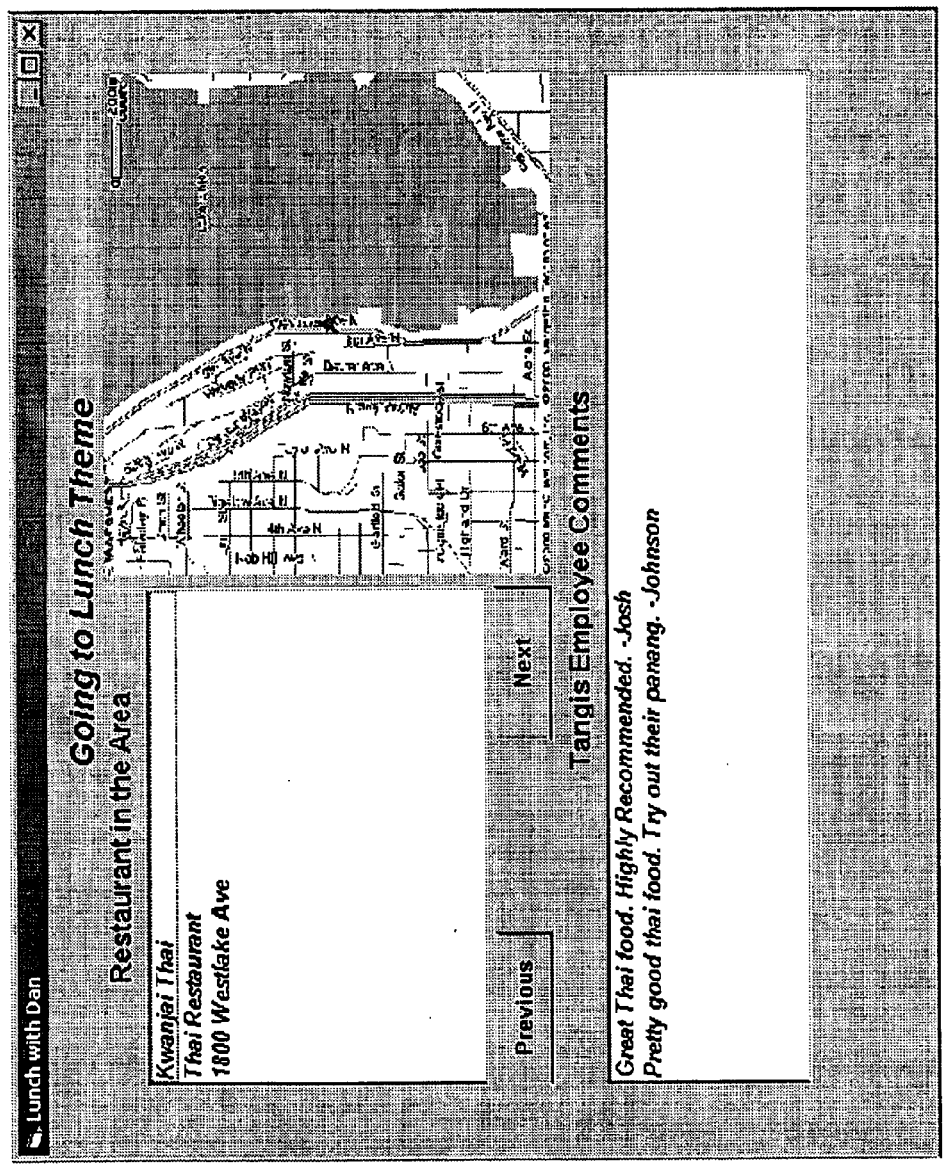
Figure 11I:
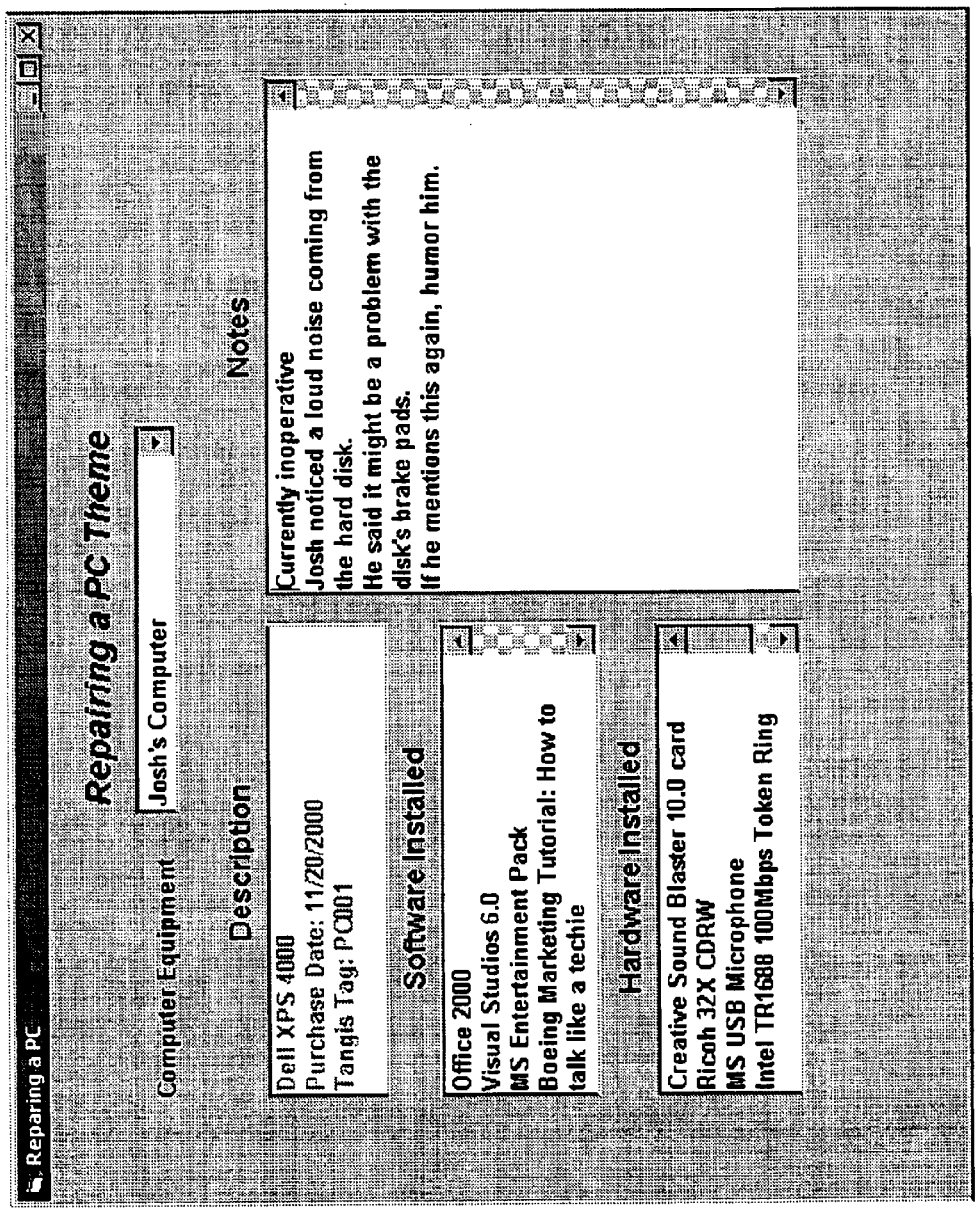
Figure 11J:
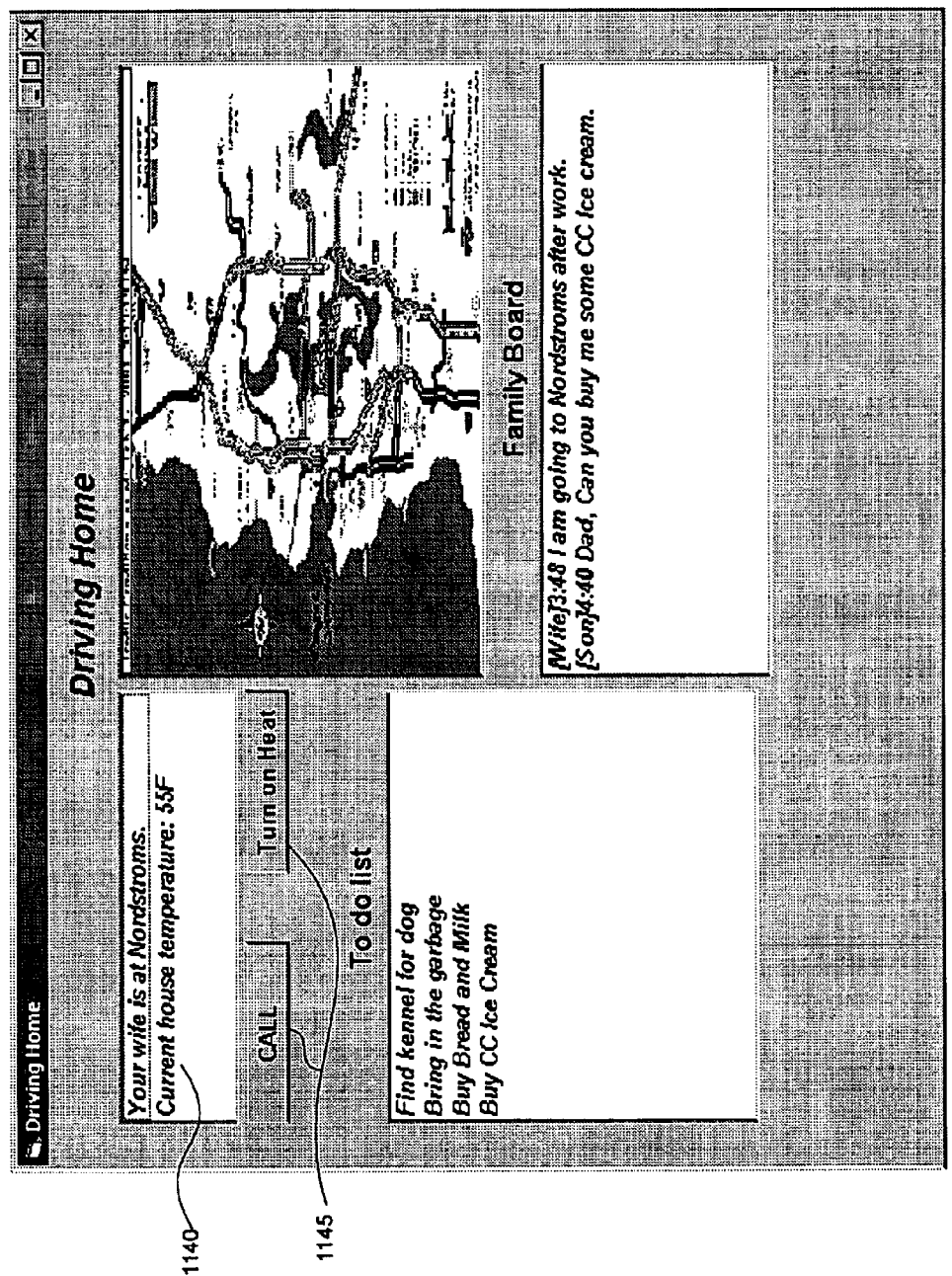
Figure 11K:
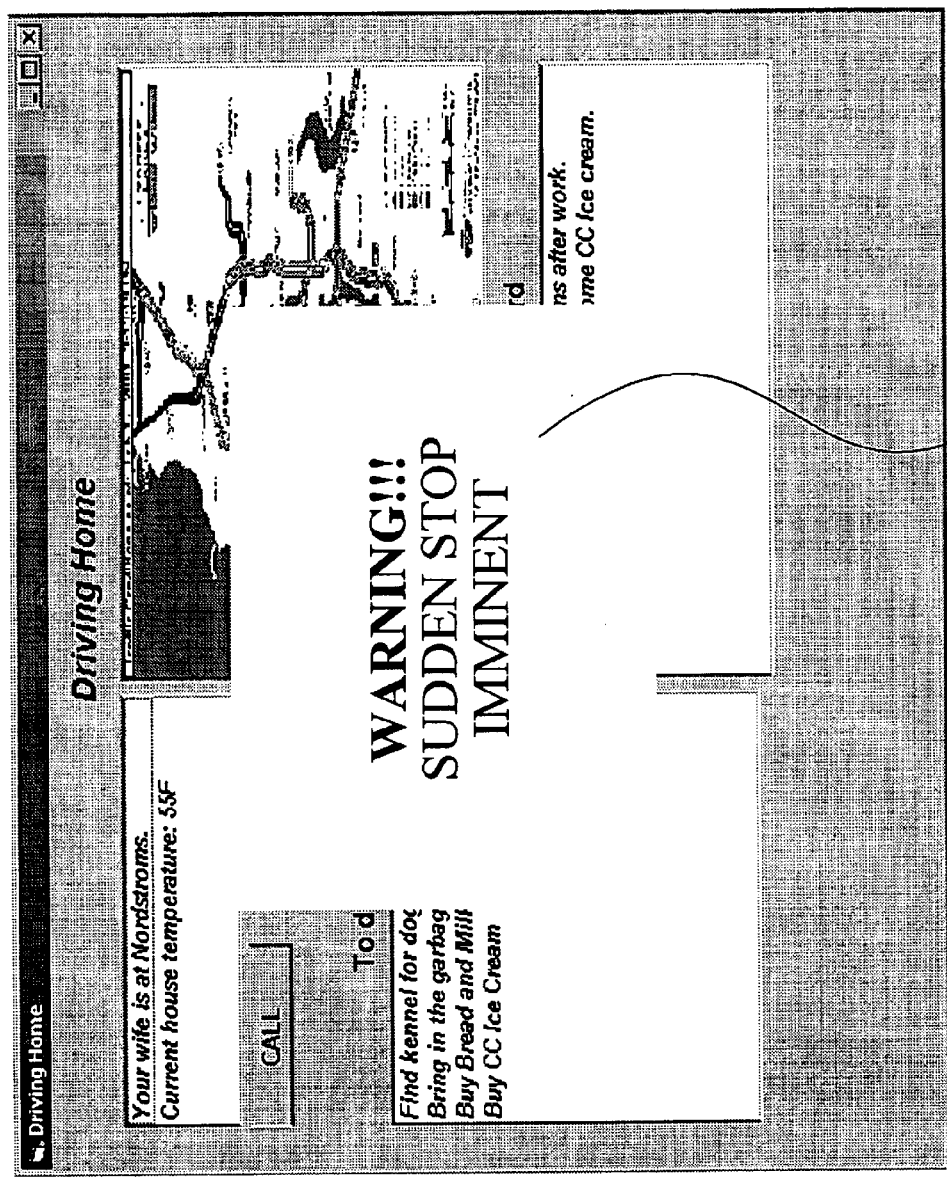
Figure 11L:
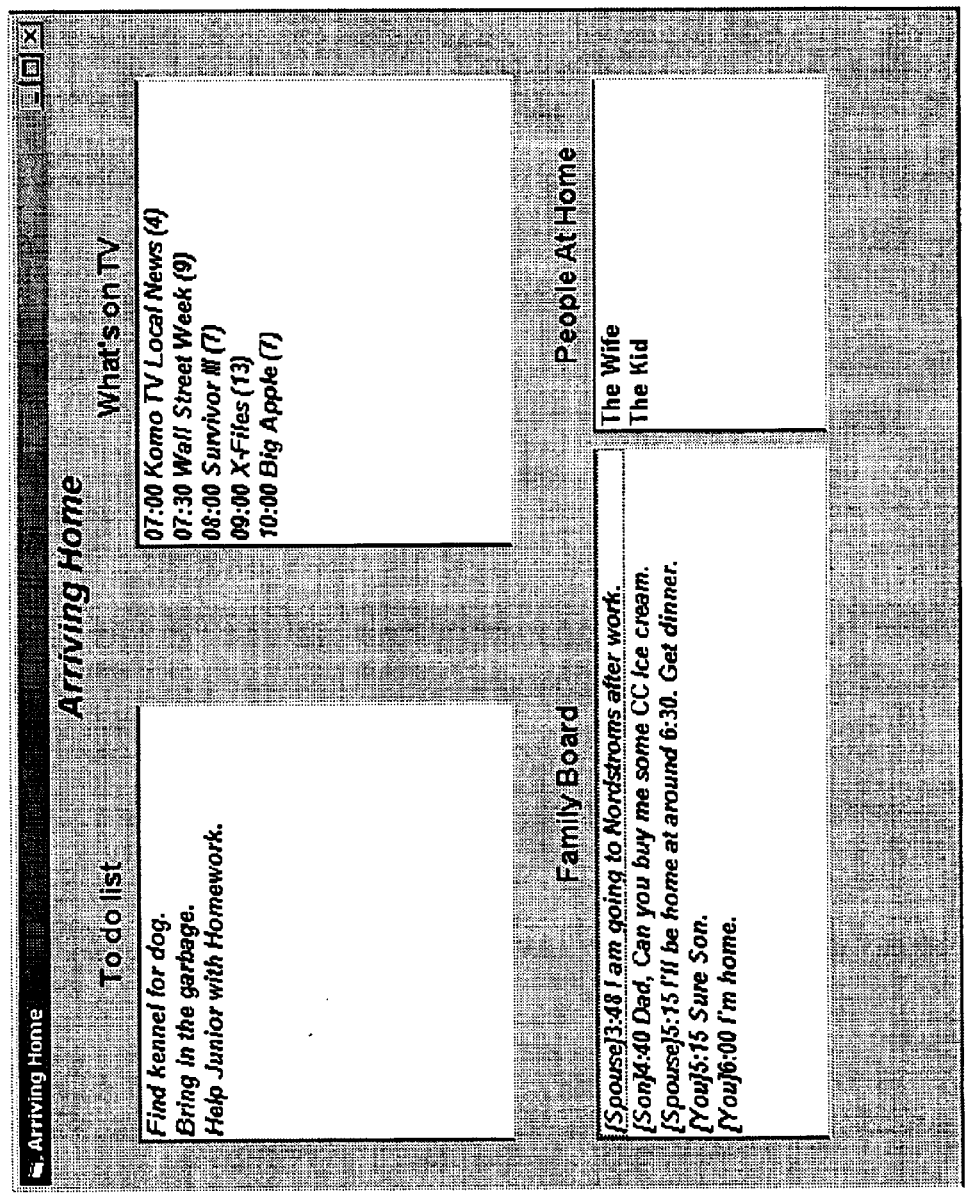
Figure 11M:
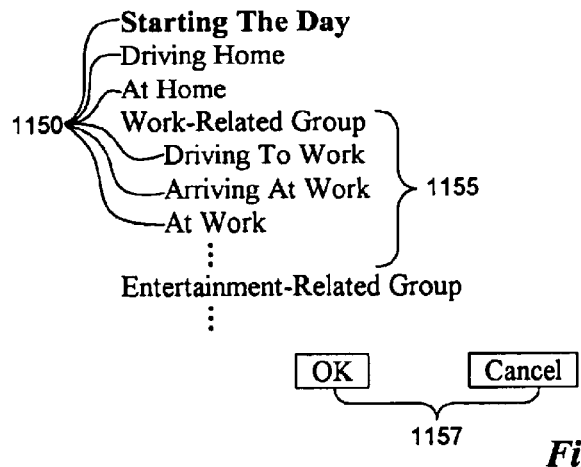
FIGS. 11M–11O provide examples of a user interface for a user to explicitly control various theme-related information.
Figure 11N:
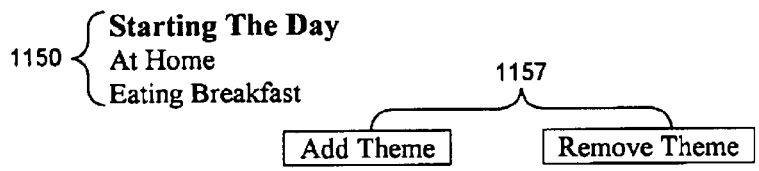
Figure 11O:
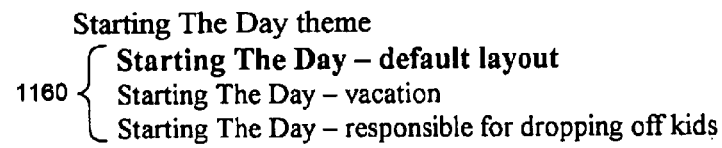

FIGS. 11A–11L provide various examples of changing theme layout presentations based on changes to a current context, and FIGS. 11M–11O provide examples of explicit user control of various theme-related information. In the theme layout presentations illustrated, only the visual aspects of the theme layout presentation are illustrated—those skilled in the art will appreciate that other types of output devices and user senses could be used either concurrently or alternatively. In addition, in the illustrated embodiment the theme layout presentation is performed by a wearable personal computer that remains with the user throughout a day. In most situations the illustrated theme layout presentation will fill a display screen available on the wearable computer, although those skilled in the art will appreciate that the wearable personal computer could also opportunistically use other display devices as they become available and that other information could additionally be displayed.

With respect to FIG. 11A, a wearable computing device user has recently risen, and the wearable determines that the most appropriate current theme layout is one related to a current "Starting The Day" theme. As is shown, the theme layout presentation includes a variety of different types of content sets, such as news headlines 1105, a current to-do list 1110, and a schedule/calendar 1115. Such content sets can be gathered from a variety of sources, such as the news headlines being retrieved from an external source (e.g., a news organization's web site or subscription service), the to-do list and calendar being retrieved from the user's personal or work data store, or context attribute information such as the inside temperature 1109 or indications of people at home being retrieved from an appropriate context model or context information supplier. Those skilled in the art will appreciate that the theme layout can specify the manner in which to gather the information in a variety of ways, such as a URL, a database query, executable logic such as a script, etc.

In addition to presenting various information, various functionality and interaction controls are also presented to the user. For example, as is shown in the news headline section of the theme layout presentation, a scroll bar interaction control is available, and other non-visible interaction controls (e.g., a pop-up menu based on a user indication or cursor position) may also be available. In addition, some or all of the presented information may itself be selectable by the user, such as to select a new theme and present corresponding information. For example, each of the headlines may be selectable by the user, and if the user selects a headline such as headline 1107 the current theme could switch to a "Reading News" theme whose associated theme layout presentation would include the corresponding news story. Similarly, the user could select an item on the to-do list such as task 1112 in order to be presented with more detailed information about the task or to modify the task (e.g., to change its priority or indicate that it is completed). Similarly, the user could select a person indication such as "The Wife" 1117 to obtain information about that person (e.g., their current status with respect to getting ready).

The current theme layout presentation also illustrates that presented information can be specific to the user (e.g., the to-do list), specific to a group or other category to which the user belongs (e.g., the calendar information if it is retrieved from a company-wide work calendar rather than the user's personal calendar), or independent of the user (e.g., current world headlines). In most embodiments, if the "Staring The Day" theme and its associated theme layout were distributed to another user, user-specific or group-specific data will not accompany the theme and theme layout. For example, the presentation of this same theme layout for a different user may have the same types of presented information and may include the same current worldwide headlines, but the actual data presented in the other sections of the presentation would be modified to reflect the new user (e.g., retrieving a value for the inside temperature attribute 1109 from a context model for the new user, and retrieving to-do list and calendar information for that new user). While not illustrated in the current theme layout presentation, those skilled in the art will also appreciate that some theme layout presentations can include static information stored with the theme or theme layout, such as a smiley face logo to be displayed or a indication of lateness that is displayed if the current time exceeds some defined deadline information.

After the user gets ready, they begin to drive to work, and the wearable personal computer accordingly modifies the current theme layout presentation to that illustrated in FIG. 11B. As is shown, a variety of types of information can be displayed, such as a text description of the destination 1120, a local map 1121, text driving directions 1122, an updated traffic congestion map 1123, schedule information 1125, and task-related information 1127. As with other theme layout presentations, the data to be presented can be retrieved in various ways, such as interactively from external data stores or instead from a local data store. In addition, those skilled in the art will appreciate that different theme layout presentations can share information with other theme layout presentations, such as schedule information being available in this and the previously illustrated theme layout presentation.

FIG. 11C illustrates that as the user arrives at work a new theme layout presentation will be used that includes information more relevant to the workplace than to driving, such as an indication of people in the building. This theme layout presentation also illustrates that data for presentation can be gathered by interacting with other context models, such as determining the people that are currently in the building or retrieving work bulletin board information by querying a context model or other data store for the workplace. When retrieving such information, those skilled in the art will appreciate that access controls or security measures can be used as appropriate in order to protect private or sensitive information. After the user enters the workplace, the current theme layout presentation switches to a generic "At Work" theme layout that is illustrated in FIG. 11D. This theme layout presentation includes calendar information, task list information, and indications of nearby people.

FIG. 11E illustrates a different type of theme layout presentation that is specific to a particular person. In particular, the user's wearable computing device may have determined that the user has begun to talk to one of the nearby people, Bill Watson. Alternately, the system may have an important reminder related to Bill, and thus modified the display to provide that information to the user. Alternately, the user may have interactively selected the displayed indication 1130 of Bill Watson in FIG. 11D. Regardless of the manner in which this Person theme was selected, the corresponding theme layout presentation can include various relevant information such as a picture of the person, contact information about them, and reminders related to the person. In the current situation, a generic person theme layout is currently being used, with Bill Watson being selected as the current topic or focus. As illustrated by interaction control 1135, the user could interactively select a different user, and if so the sections of the theme layout presentation would remain the same but the specific information displayed would change to correspond to the newly selected person. For other people or in other embodiments, more specific theme layout presentations could be used. For example, if the topic of the person theme was instead the user's boss or the CEO of the company, the user may have a theme layout that is specific to that person and that includes other types of relevant information or functionality. Similarly, if the topic of the person theme was a member of the user's work group, a theme layout specific to that group could be used. If the system determines that it is no longer appropriate to display the Person theme layout (whether automatically or via an explicit user indication), the system could then return to the general At Work theme layout presentation previously illustrated in FIG. 11D.

FIG. 11F illustrates a more specific work theme layout presentation that is relevant when the user is attending a meeting. In addition to indicating people present in the meeting, the theme layout presentation can include a section for previously recorded notes and/or new notes to be generated during the meeting. In addition, the illustrated meeting theme layout presentation includes information about things to mention at the meeting, some of which may be standard for each status meeting and others may be specific to the current meeting. FIG. 11G illustrates another person theme that has Dan Newell as the topic. Information about a person can be displayed in various situations, such as if the system automatically detects that the person is speaking in the meeting or that the person has become the focus of the user's attention (e.g., by the user looking at them for a sustained period or by the user explicitly indicating that person). FIGS. 11H and 11I illustrate other theme layout presentations that may be used throughout the day, such as a theme layout presentation related to going to lunch or to a specific task such as repairing a computer. As with the previously discussed Person theme, the computer repair theme layout presentation illustrated in FIG. 11I is an object-specific theme in which a particular object (e.g., "Josh's Computer") is currently selected as the topic of the theme and the theme layout correspondingly displays information related to that object.

FIG. 11J illustrates a theme layout presentation for a "Driving Home" theme that is similar to the "Driving To Work" theme previously discussed. In some embodiments, a generic Driving To Location theme could be used in which a specific location was the topic of the theme. However, in the illustrated embodiment it is appropriate to present different types of information and controls to the user when they are driving home than were appropriate when the user was driving to work. For example, the illustrated Driving Home theme layout presentation includes current information about the status of specific people such as the user's wife and objects such as the user's house. In addition, the illustrated theme layout presentation includes interaction controls 1145 to provide currently appropriate functionality, such as to turn on the heat at home or to call the user's wife.

FIG. 11K illustrates the presentation of information related to a safety theme layout. In particular, a "Safety" theme has been executing in the background throughout the day (e.g., by being designed to always match any context and thus be part of every current theme set), and logic associated with the Safety theme (e.g., a rule) has detected a sudden safety danger. In the illustrated embodiment, the wearable computing device has received information that traffic will abruptly slow or stop. Since the Safety theme has precedence over the Driving Home theme (e.g., has a higher priority), the Safety theme takes over the display and issues a warning message 1190. In the illustrated embodiment, the Safety theme layout presentation does not completely replace the previous theme layout presentation, but instead simultaneously presents information. Those skilled in the art will appreciate that in other embodiments the Safety theme layout presentation would completely replace the previously presented theme layout. In addition, the visual aspect of the Safety theme layout presentation may also be accompanied by other non-visible presentation, such as an auditory alert and/or a haptic notification.

FIG. 11L illustrates a theme layout presentation related to the "Arriving Home" theme. Those skilled in the art will appreciate that the theme layout presentations illustrated in FIGS. 11A–11L are provided for illustrative purposes only, and are not intended to limit the scope of the invention.

FIGS. 11M–11O provide examples of user interfaces with which a user can explicitly select or modify theme-related information. In particular, FIG. 11M provides an example user interface with which a user can select a new current theme. In particular, a variety of possible themes 1150 are illustrated, with the current theme visually indicated in this example embodiment in bold. Those skilled in the art will appreciate that in some embodiments any defined themes may be made available for selection (including themes not currently loaded, such as themes accessible from a local or remote storage location), while in other embodiments the themes displayed may be limited in various fashions (e.g., to themes in the current theme set). In addition, the illustrated embodiment demonstrates that displayed themes can also be grouped or categorized in various ways, such as by including a work-related group of themes 1155 that includes multiple themes. If a user selects a new current theme, the system can modify the current display to reflect a theme layout associated with the new current theme, such as after the user indicates a final selection with the "OK" interaction control 1157. Alternately, the user in the illustrated embodiment can use the "Cancel" interaction control 1157 to retain the previously selected current theme.

In a similar manner, FIG. 11N illustrates an example user interface to allow a user to explicitly modify the themes that are part of the current theme set. As with FIG. 11M, the user interface in FIG. 11N illustrates multiple themes 1150, but the illustrated themes are limited to those that are currently members of the current theme set. In addition, interaction controls 1157 allow the user to add or remove a theme from the current theme set. Selecting the "Add Theme" interaction control may, for example, prompt a display such as is shown for FIG. 11M in which one or more themes that are not currently present in the current theme set can be selected. Those skilled in the art will appreciate that other interaction controls could also be present, such as a control to temporarily suspend the execution of a theme that is part of the current theme set without removing it or to resume the execution of a suspended theme. Those skilled in the art will appreciate that the addition of new themes to the current theme set can result in themes that do not match the current context being executed in the background, but processing or other functionality associated with those themes (discussed in greater detail below) may nonetheless be currently useful.

FIG. 11O provides an example user interface with which a user can select a new theme layout to be the current theme layout, thus explicitly modifying the current presentation of information and functionality. As previously discussed, users can also explicitly select new current theme layouts in other manners, such as by selecting information related to a person, place, or object that is presented as part of another theme layout presentation. In the illustrated embodiment, multiple theme layouts for the current theme are displayed for selection by the user, with the current theme layout visually indicated in a bold manner. If the user selects a different theme layout and selects the "OK" interaction control 1157, the system will modify the presentation of information and functionality to the user to reflect the new current theme layout. Those skilled in the art will appreciate that in other embodiments theme layouts associated with multiple different themes could be simultaneously displayed to the user for selection.

FIGS. 12A–12H provide an alternative method for the user to explicitly provide information or instructions. In particular, these Figures provide examples of a user interface for a user to explicitly specify context information about themselves, such as via a Context Chooser module. As the user makes changes to the current modeled context, these changes can propagate through the theme mechanism and cause changes in the current theme set, current theme, and/or current theme layout.

Figure 12A:
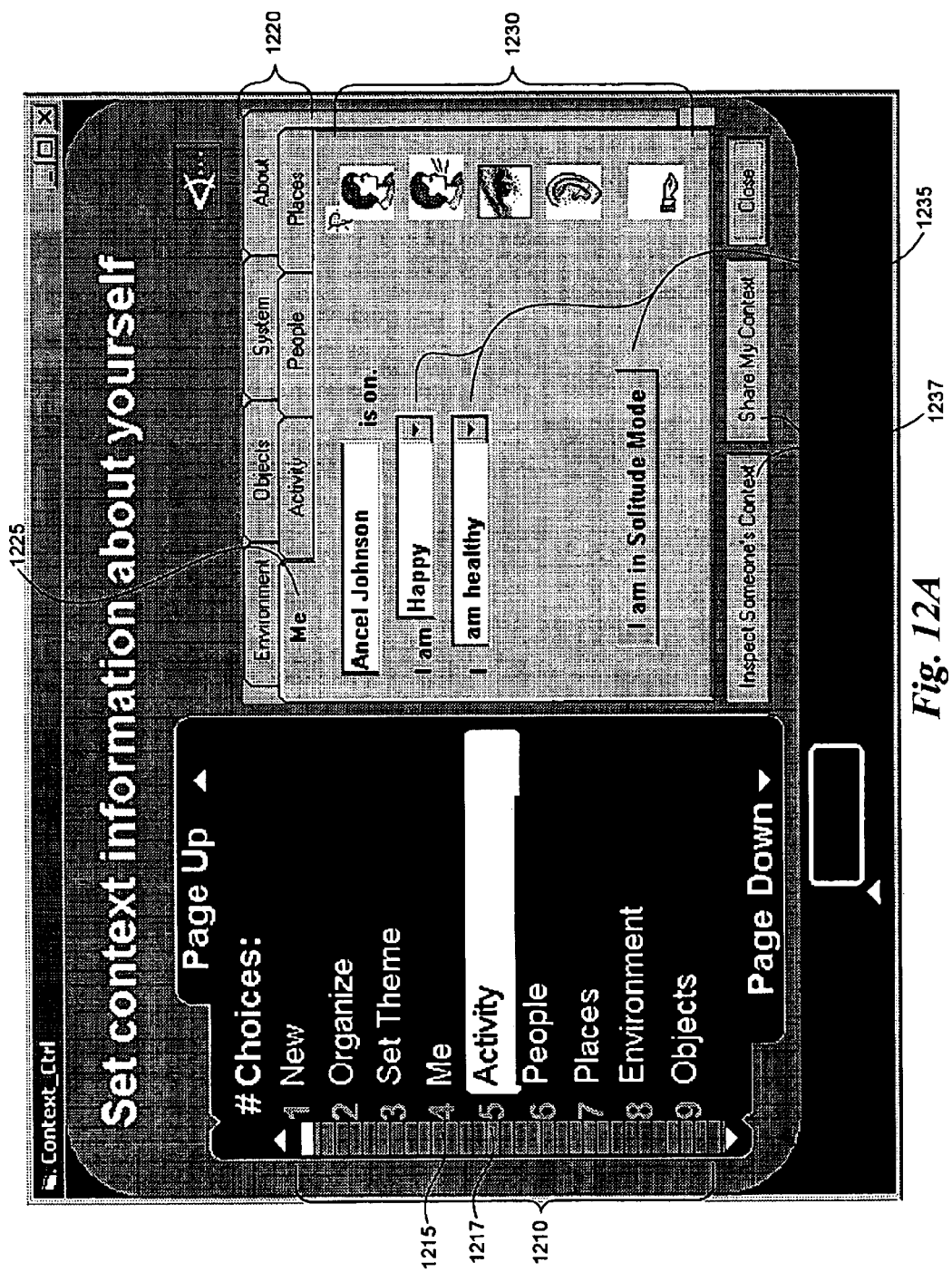
FIGS. 12A–12H provide examples of a user interface for a user to explicitly specify context information.

FIG. 12A illustrates a user interface with which a variety of types of contextual information can be inspected, configured and modified. The user interface includes a variety of choices 1210 that the user can select, such as choice 1 to create a new theme, choice 2 to organize existing themes, and choice 3 to set the current theme. Other displayed choices, including choices 4–9, correspond to categories of contextual information, and multiple tabs 1220 are also displayed that each correspond to one of the categories. In some embodiments, users can change the categories of contextual information that are displayed either by selecting an appropriate one of the choices 1210 or by selecting the appropriate tab 1220.

In the illustrated embodiment, a Me choice 1215 that corresponds to information about the user has been selected, with the tab 1225 correspondingly being the visible tab. As a result, a variety of user-related information is displayed in the right portion of the user interface. As is shown, the user interface allows the user to specify a variety of types of information about themselves, such as the user's mood or health status using interaction controls 1235. Similarly, the user can have one or more defined modes that may affect multiple context attributes, user preferences, and/or computer devices. In the illustrated embodiment, the user can specify a "Solitude" mode using an interaction control 1235. In addition, various user sense indicators 1230 are indicated, such as to provide status information to the user about senses to which the computer may currently present information and/or to allow the user to control which input/output devices are currently in use. The user interface also includes controls 1237 that affect interaction between the user and other users, such as to allow the user to specify whether some or all of their context information is available to others or to view context information for another user. In the illustrated embodiment, after the user has finished inspecting and/or modifying context information about themselves, the user can select a different category of contextual information, such as by highlighting the Activity choice 1217.

Figure 12B:
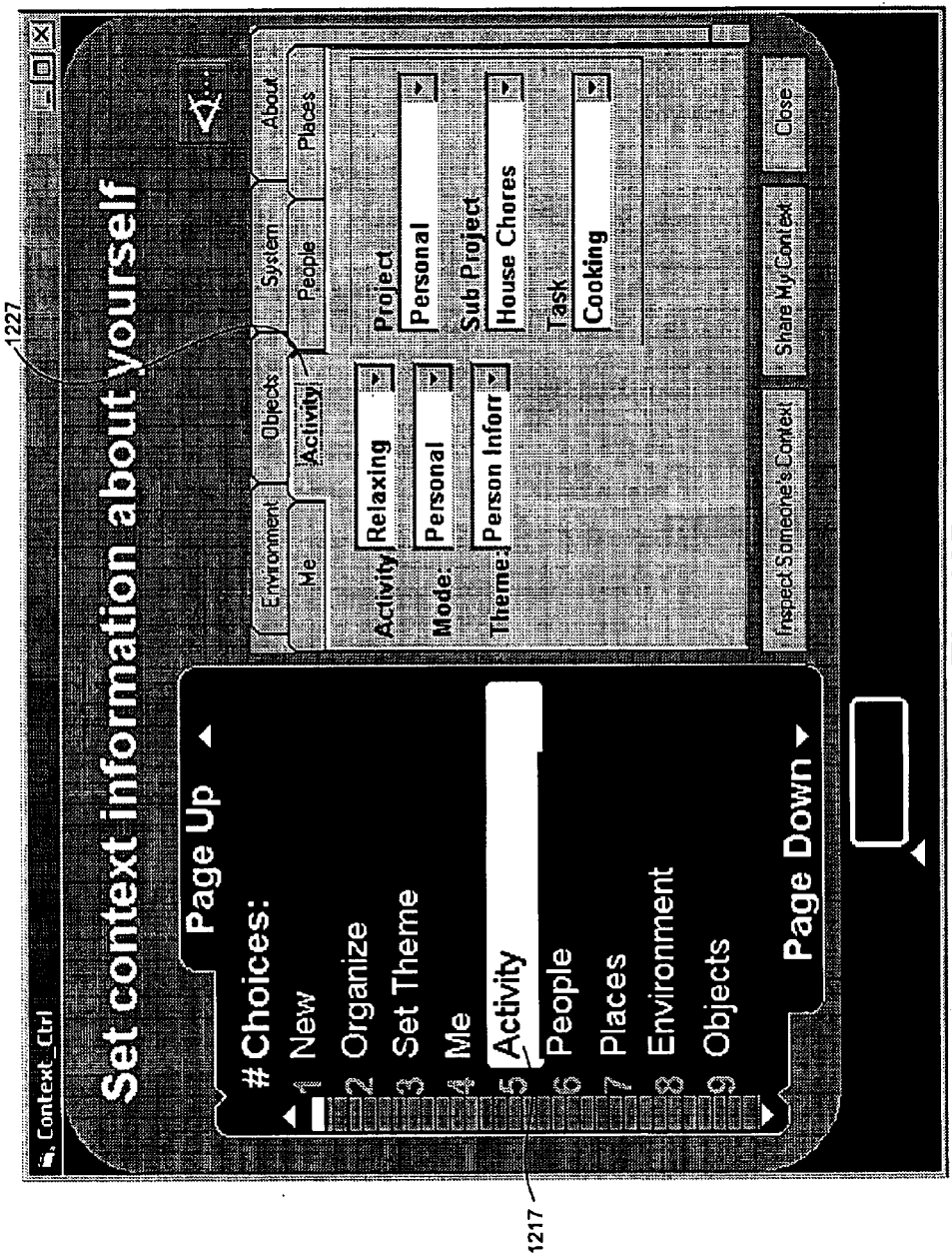

FIG. 12B illustrates the user interface after the user has selected the Activity choice to display Activity-related contextual information. As would be expected, the Activity-related tab 1227 is now the currently visible tab, and a variety of types of Activity-related contextual information is displayed. In the illustrated embodiment, the user can specify information related to a current activity, a current mode, a current theme, and various project-specific information.

Figure 12C:
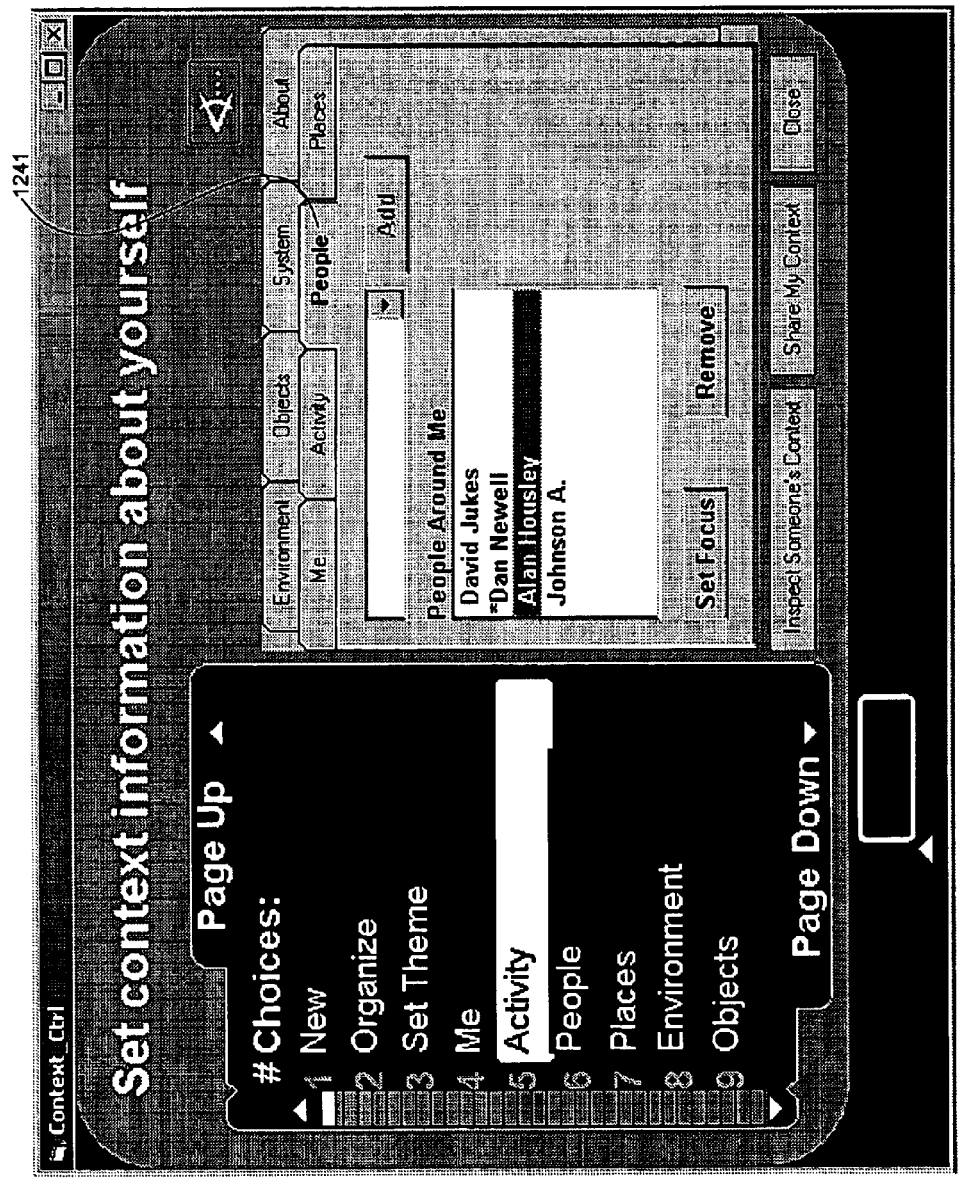

FIG. 12C illustrates the user interface displaying a variety of context information related to the "People" category, as is reflected by the selection of the People tab 1241. As is shown, in the illustrated embodiment information is presented only about people that are currently around the user—those skilled in the art will appreciate, however, that in other embodiments information about other types of people could also be indicated (e.g., people of particular interest, such as a spouse, or people of current interest, such as other people with whom the user is conversing over a remote communications mechanism). In the illustrated user interface embodiment, the user can use interaction controls to add or remove people that are considered to be around the user, as well as to specify one or more of the listed people as a current focus of a user's attention (e.g., to be used as the topic of the Person theme if a Person theme layout is presented).

Figure 12D:
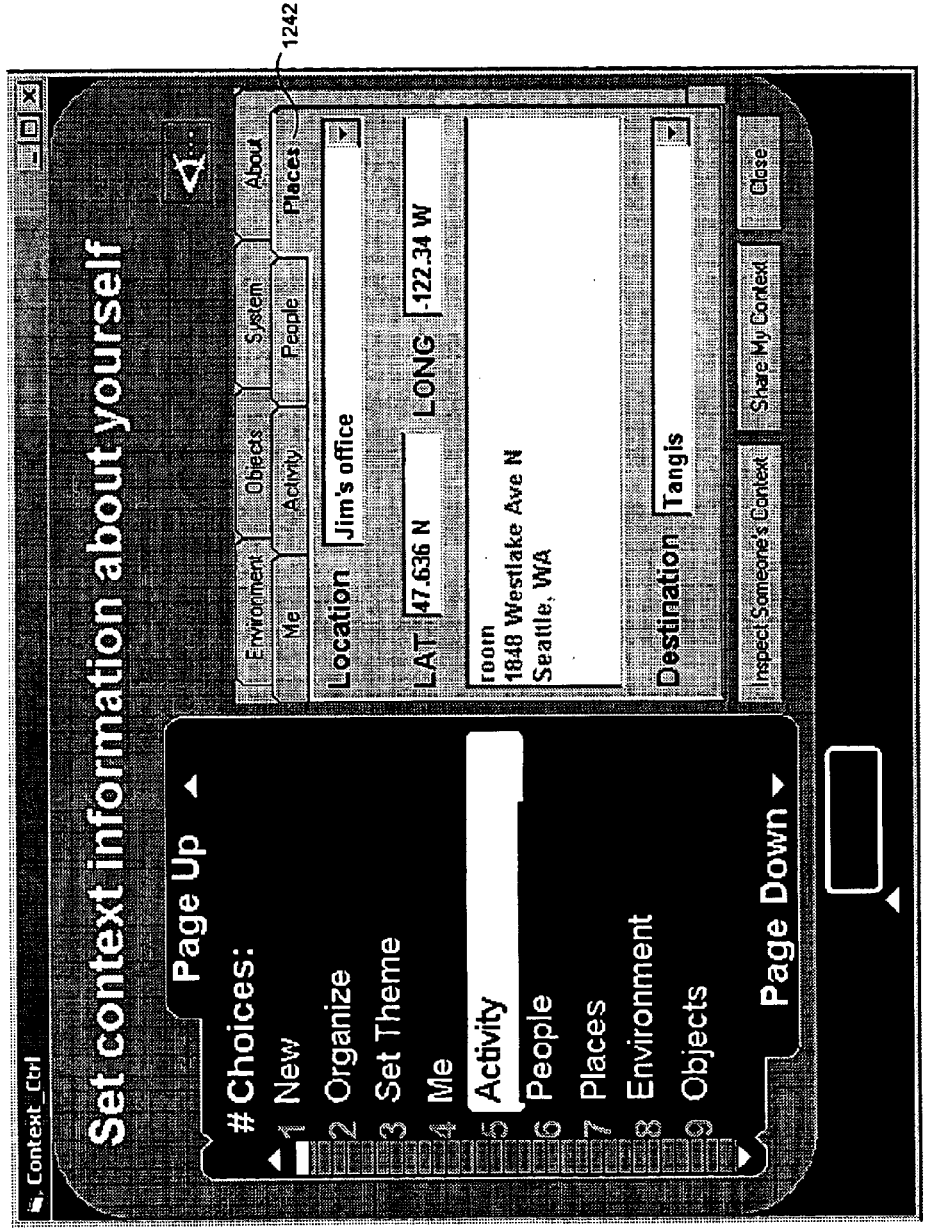
Figure 12E:
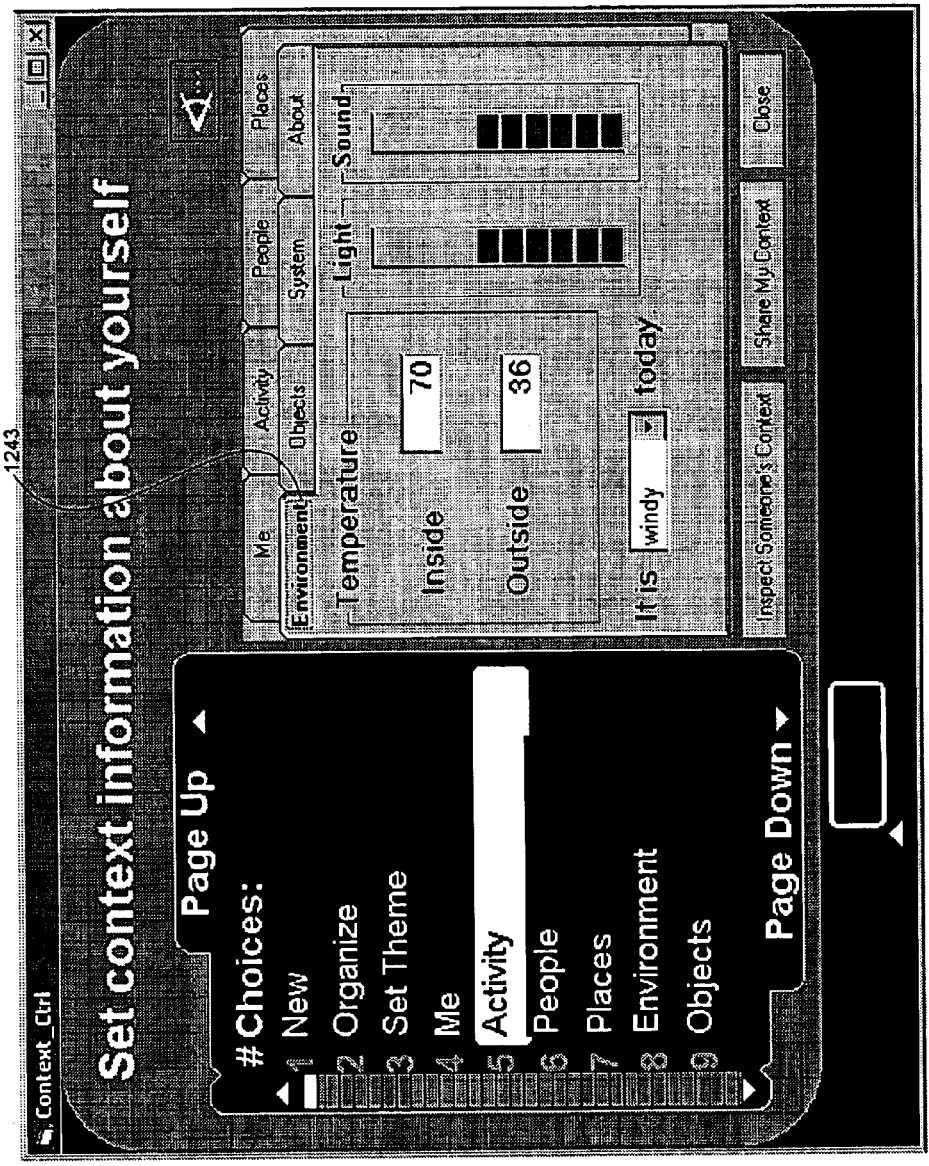
Figure 12F:
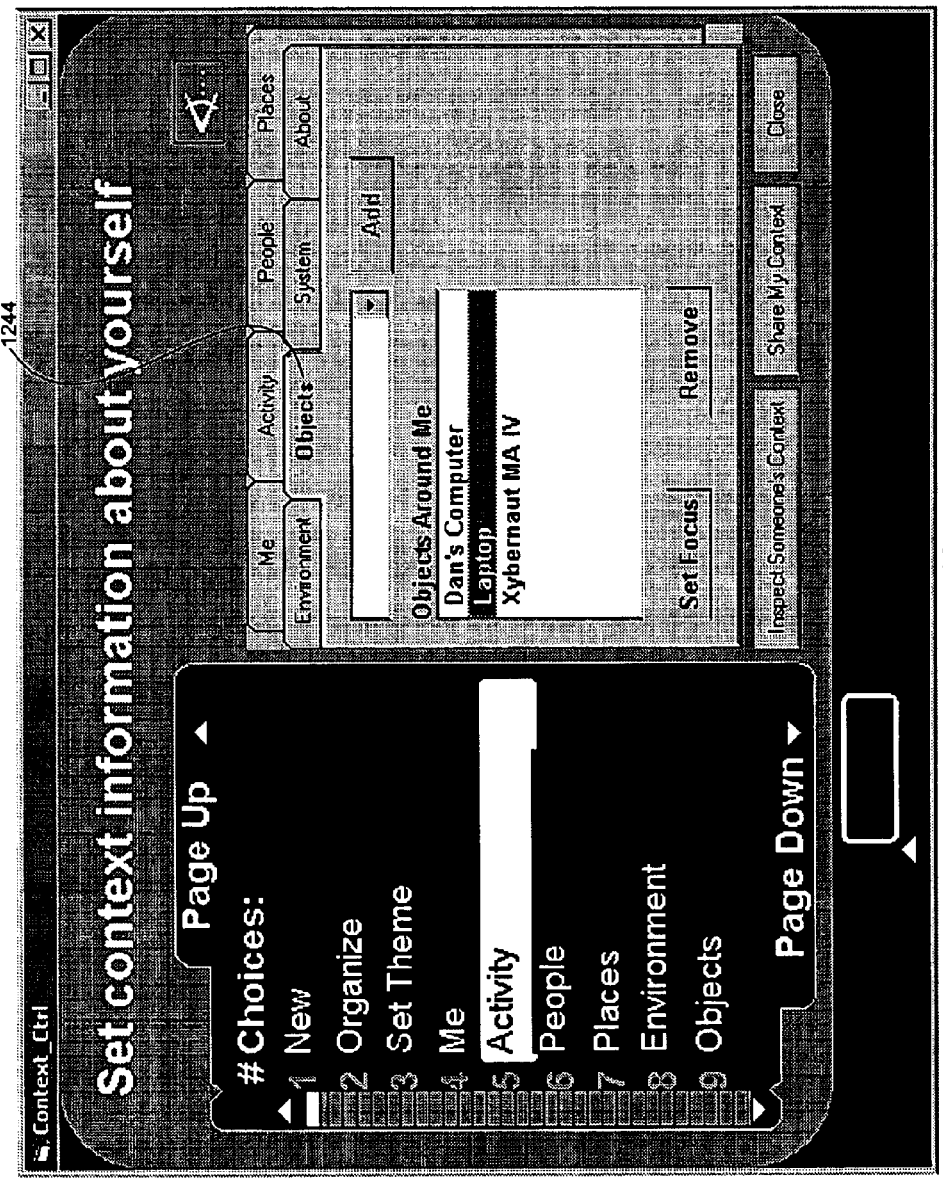
Figure 12G:
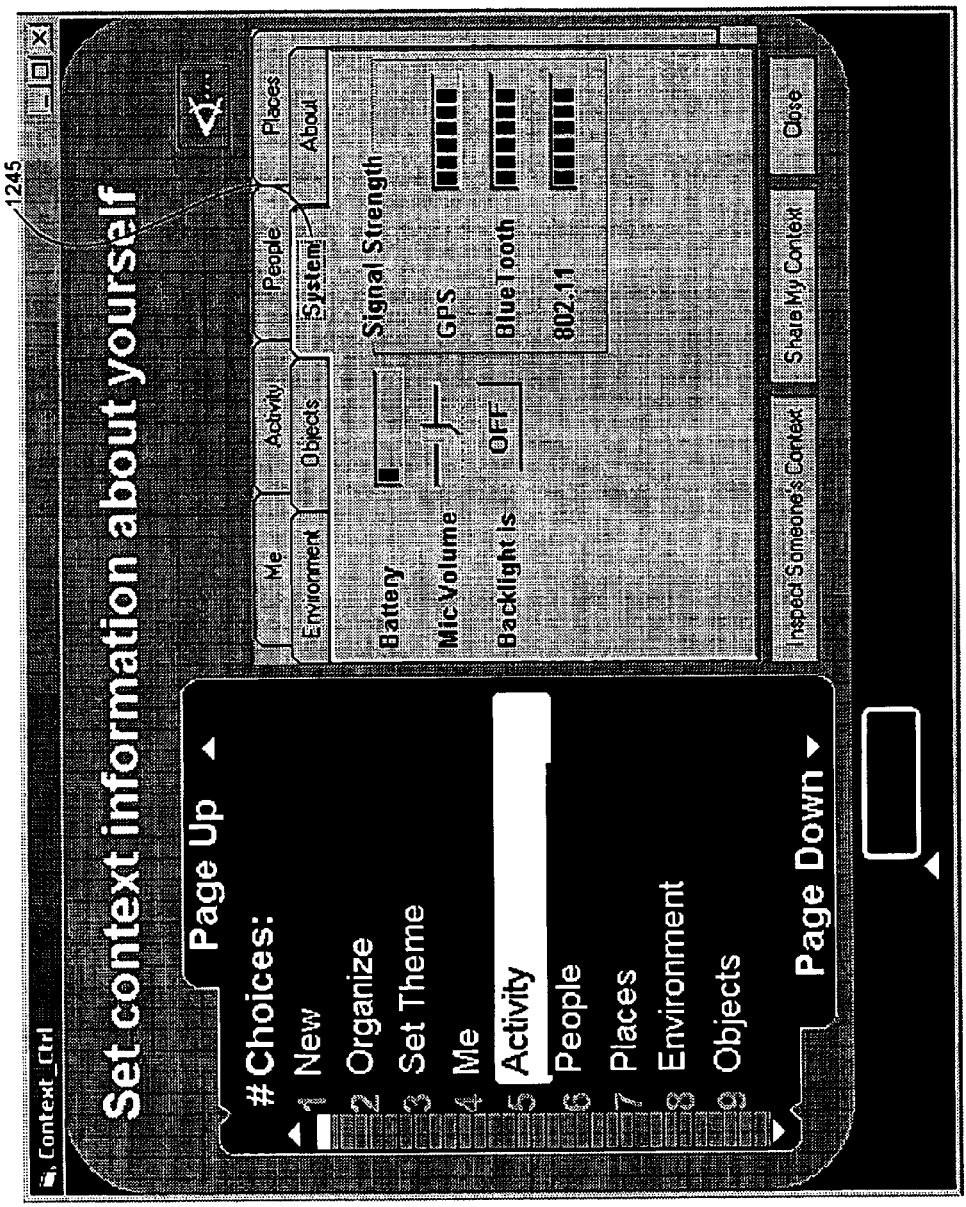
Figure 12H:
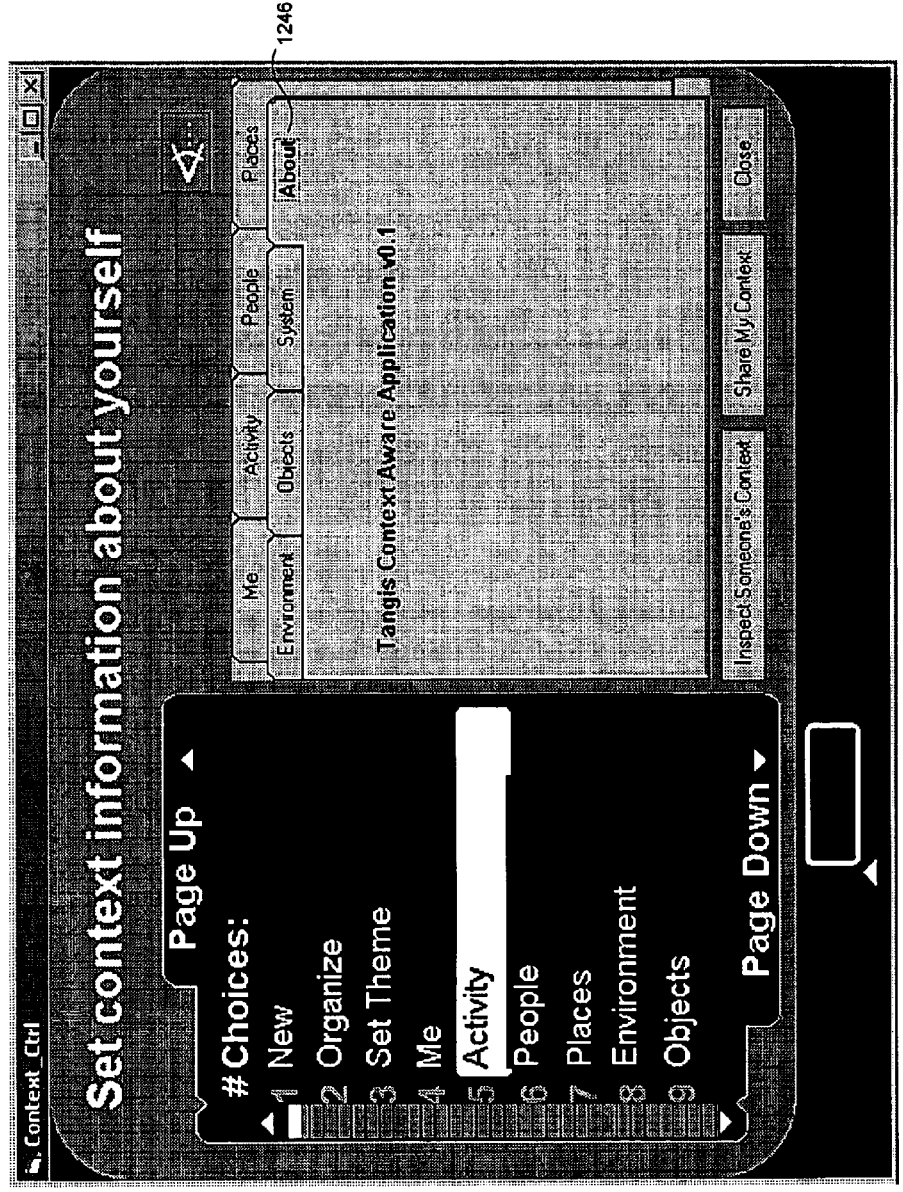

In a similar manner, FIGS. 12D–12H provide examples of the user interface displaying other categories of information. FIG. 12D displays various location information about the user, including their current location and intended destination. While not illustrated in the current embodiment, other embodiments could include an interaction control to allow the user to specify whether to share this particular type of context information (or other types of context information) with others, and if so with whom. FIG. 12E displays environment-related contextual information, such as information about the temperature, light, and sound. FIG. 12F displays contextual information related to objects or conceptual things that are around the user, such as computing devices. As with the previously discussed People-related contextual information, the user can specify a current focus of attention among those displayed objects, and those skilled in the art will appreciate that in another embodiments information about objects other than those near the user could also be displayed. FIG. 12G displays contextual information related to the computing system itself, such as information about the battery, I/O devices, installed software or networking mechanisms, etc. FIG. 12H provides "About" information related to the software executing the user interface. Those skilled in the art will appreciate that a variety of other types of contextual information could similarly be displayed and modified via such an interface, and that a variety of other types of user interfaces could similarly be used to display and/or modify contextual information.

Figure 13:
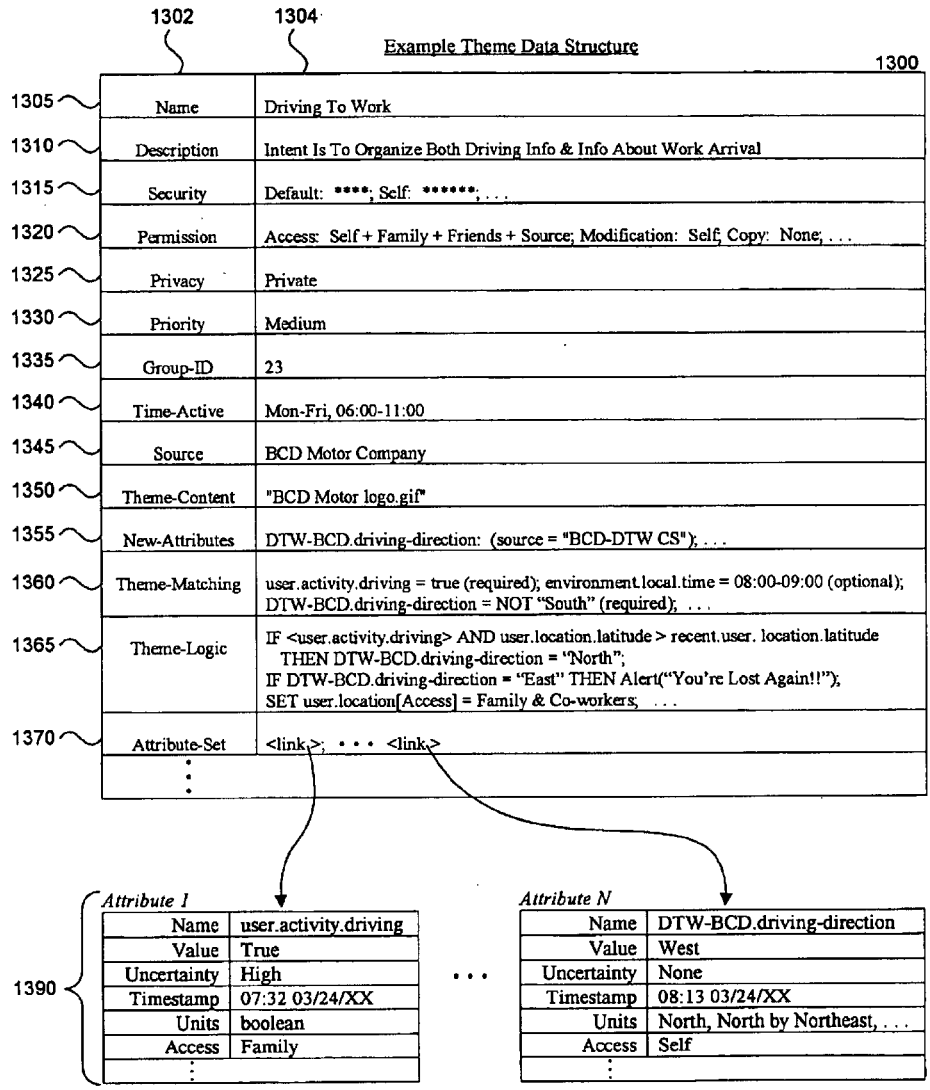
FIG. 13 provides an example of a theme data structure.

FIG. 13 provides an example of a theme data structure 1300. The data structure includes a variety of properties 1302 and corresponding values 1304. Those skilled in the art will appreciate that the details of the illustrated data structures are for illustrative purposes only, and are not intended to limit the scope of the invention.

In the illustrative example, the theme data structure includes properties as follows: Name, Description, Security, Permission, Privacy, Priority, Group-ID, Time-Active, Source, Theme-Content, New-Attributes, Theme-Matching, Theme-Logic, Attribute-Set, etc. In the illustrative embodiment, a data structure for the "Driving To Work" theme is shown. The theme includes a textual description, such as for use when displaying the theme to the user for modification, a theme priority that can be used for selecting a current theme from multiple themes in the current theme set, and a categorization of the theme as belonging to a group of themes with an ID of 23. The illustrated theme also includes an indication of when the theme is active such that it is allowed to match the current context, with this theme active on weekdays from 6 a.m. to 11 a.m. The theme also includes an indication of the source that supplied the theme, such as a third-party source from whom the theme was purchased. The theme includes an indication of theme-specific content that is stored locally, which in the illustrated embodiment is a logo of the company that sold the theme. The theme also includes an indication of new theme-specific attributes that are used as part of this theme, along with an indication of a source from whom values for the attribute can be received. In some embodiments, instructions on how to locate and/or load the theme-specific attribute or theme-specific CS could also be included.

The theme-matching property of the theme provides one or more sets of attributes and corresponding values to allow the system to determine whether the theme matches the current context. In the illustrated embodiment, each attribute-value pair also includes an indication of whether that attribute-value pair is required to match the current context. Theme logic is also associated with the theme data structure, including an instruction to modify the access that is allowed to an attribute (i.e., the user.location attribute) while the theme is the current theme and/or in the current theme set. Other theme logic includes checking the values of standard attributes or theme-specific attributes in order to perform various types of actions. As previously noted, in some embodiments theme logic can also be used to determine whether the theme matches the current context. Those skilled in the art will appreciate that in other embodiments theme logic information (or other information) may not be directed stored in the data structure, such as the theme data structure instead including a link to one or more executable programs that implement the theme logic. The theme data structure also includes links to each of the attributes in the attribute set for the theme, with attribute data structures 1390 illustrated.

The illustrated theme data structure also includes Privacy, Security, and Permission information. In the illustrated embodiment, the Privacy information can affect capabilities such as where data generated while the theme is active is stored and who has access to it. In this manner, work-related themes can ensure that data generated while that theme is current will be stored in an accessible work location, and non-work themes can ensure that generated data will remain private. Typically, individual themes share the same context modeling data store. However, groups of themes may have distinct databases. Themes that share the same preferred privacy indication would tend to access the same database. Examples of different privacy values/schemes include the following: Private, Public, Work, Family, Friends, Acquaintances, People in immediate vicinity, and Everyone in my contact list. These schemes are not necessarily mutually exclusive (e.g., Family+Friends), though they can be (e.g., private vs. public). They can be combined in some embodiments with Boolean or other logic. Example themes which a user might specify as private include Driving Home, At Home, Talking on My Personal Mobile Phone, Receiving Medical Treatment, etc.

The illustrated theme data structure also includes Security and Permission information. In the illustrated embodiment, Permission information is used to specify what types of activities different users can engage in with respect to the theme, and Security information can be specified to control the various types of access. In the illustrated embodiment, similar groups as those mentioned above can be used when specifying permission or security information. In the illustrated embodiment, access to information about the scheme (including whether the theme is executing or is the current theme) is available to the current user, to other users that are part of the current user's Family or Friends groups of users, and to the Source of the theme. Access by the Source allows them to monitor usage of the theme. In Permission information also specifies that only the current user can modify the theme, and that no one is allowed to copy the theme. A variety of other types of permission controls could similarly be specified. In addition, controls such as access or modifiability could be limited to a subset of the theme in other embodiments. Similarly, various restrictions on such access could be specified, such as "Show my current location to co-workers only when I am in route to the office or located within 100 yards of it."

The user does not necessarily determine some or all of the active permission scheme. For example, an employer may distribute a theme to employees that it does not want modifiable (e.g., a safety theme). Alternately, in other institutional applications (e.g., a hospital or the military), the control of the content, how the context is being modeled, how the context information is being shared, and any other system controlled activity can be controlled by a remote and/or centralized authority. Remote control does not require continuous communication—the theme (or a theme-specific CS) could have a "dead air" rule such that it ceases to work if the system does not receive continuous authorization for use. Permission information could also include information related to distribution of the theme, such as a mechanism for charging a user and supplying the payment to a specified source when the theme is distributed.

In the illustrated theme data structure, the theme logic indicates an ability to specify access to a context attribute, such as to provide or limit access to information to other users. Similarly, themes can also specify other types of information, such as a data store from which data can be retrieved or to which data can be stored. Themes can also set attribute values, such as to ensure that a privacy attribute has an appropriate value. In some situations the values will be set only temporarily while the theme is current (or is in the current theme set), and will return to their previous value or to a default value when the theme is no longer current (or is not in the current theme set). Alternately, in other situations a theme can permanently set an attribute value such that the value remains even when the theme is no longer current.

In addition to setting context information, themes can also specify other types of information, such as whether some or all of the information about the theme is available to other themes. In some situations a theme may specify that even the existence of the theme or the fact that the theme is in the current theme set or is the current theme is not available to other themes, although such a specification may also be overridden by the system if necessary (e.g., making such information available to a safety theme that needs to override the display to present an important message). When information about other themes is available, a theme (e.g., the current theme) or theme layout can use such information as part of the theme logic to modify the presentation of the current theme layout. In other embodiments themes could included various functionality to allow them to interact, such as for all of the themes in the current theme set to cooperatively select one of the themes as the current theme rather than having this performed by a separate executable module.

While the illustrated theme indicates that it is a member of a group, a variety of other types of group and hierarchical information could be specified in other embodiments. In some embodiments themes can be specified in a hierarchical arrangement such that themes at lower levels of the hierarchy could inherit default attributes or functionality from higher-level themes. For example, a "Talking To Spouse" theme could be specified as being a descendant or child of a "Talking To Person" theme, with the child theme including only the information or logic that is different than the parent theme. In addition to inheriting information and functionality, such hierarchical arrangements can be used in some situations to prioritize themes. Moreover, in some situations themes and/or theme layouts could be constructed in a hierarchical manner by using other themes or theme layouts. For example, with a theme layout such as is illustrated in FIG. 11B, the theme layout may be constructed by combining other theme layouts for text map directions and traffic condition information with other information specific to the Driving To Work theme.

In addition, groups of themes can be specified in various ways and used for various purposes (e.g., as an organizational scheme when presenting a list of themes to a user). As previously noted, group membership could be used to specify various common properties, like Privacy, Security, Permission, Priority, Time-Active, Theme-Content and/or other properties. In this way, a user could know what other themes could be selected that would not change the current settings for such properties. Alternately, an institutional organization could use group membership to control access to and functionality associated with different groups—for example, a retailer can maintain distinct groups of themes for employees, vendors, contractors, identified or anonymous shoppers.

Themes can also be categorized in various ways, and themes in some embodiments could store related categorical information. For example, in some embodiments themes could be categorized as "Situational Themes" that describe the intent of the user specific to that person's activity (e.g., driving), "Person Themes" containing information related to people, "Object Themes" containing object-related information, or "Place Themes" containing place-related information. In other embodiments, themes could be categorized into high-level categories such as "Intent/Content," "Ability," "Platform," and "Personal Preference." Intent/Content themes could include sub-categories such as "Work," "Chores," "Entertainment," etc. Each of these could include various sub-categories. Ability themes could include sub-categories for themes such as "Bodily Activity," "Available Attention," etc. An important benefit of modeling a user's body activity is to determine how well they can receive or generate information. For example, if the user is walking, the system can modify the UI such that the fine motor control required for two-dimensional cursor control (e.g., with a mouse or trackball) is not required, and could instead use UI elements that present choices with one-dimensional cursor control (e.g., with a scroll wheel or voice commands). Example types of relevant activities could be Walking, Sitting With A Horizontal Work Surface, Driving, etc. Attention could include an indication of a user's preferred data complexity level and their current cognitive load. Platform themes could be used to provide information about what to do when system capability changes configuration. For example, if the device battery is being consumed at a rate higher than can be sustained until historical battery charging resources are available (accounting for route and rate of travel), theme logic could initiate power saving rules. Alternately, if a preferred output device is not available, theme logic could determine and suggest the best alternatives. Personal Preference themes can include sub-categories related to the device UI, Privacy, Solitude, Safety, Convenience, etc. UI-related themes could provide functionality such as increasing the audio volume when the ambient noise increases, or increasing contrast when the ambient light increases. A Privacy theme could include detailed information that is shared with other themes. The Privacy theme could have an associated theme layout that would present settings for various privacy types, and/or it could present a summary of privacy (e.g., a single word like "private" or "public") to other themes or on a displayed system status tool bar. Information that is explicitly set in such a Privacy theme could also override a default setting contained in a specific theme without modifying the default (so that the default setting could later be used if the explicit Privacy theme setting were removed). A Solitude theme could indicate not to interrupt the user unless it is an emergency. A Safety theme could begin recording all sensors and attributes at high data rates if the system infers that I am having a health crises (e.g., car is skidding at high speed or my pulse is erratic). The system could then indicate to the user that a safety issue has been determined, and alert emergency personnel and family if attempts to get acknowledgement or correction from the user is not received. Convenience themes could provide functionality such as collecting suggestions from family members for errands to perform before coming home from work. Such an errand list could be shared by other family members, and an indication provided if an errand is accepted by family member.

Those skilled in the art will appreciate that themes can be grouped, categorized and hierarchically structured in a variety of other ways, some of which are described above.

Figure 14:
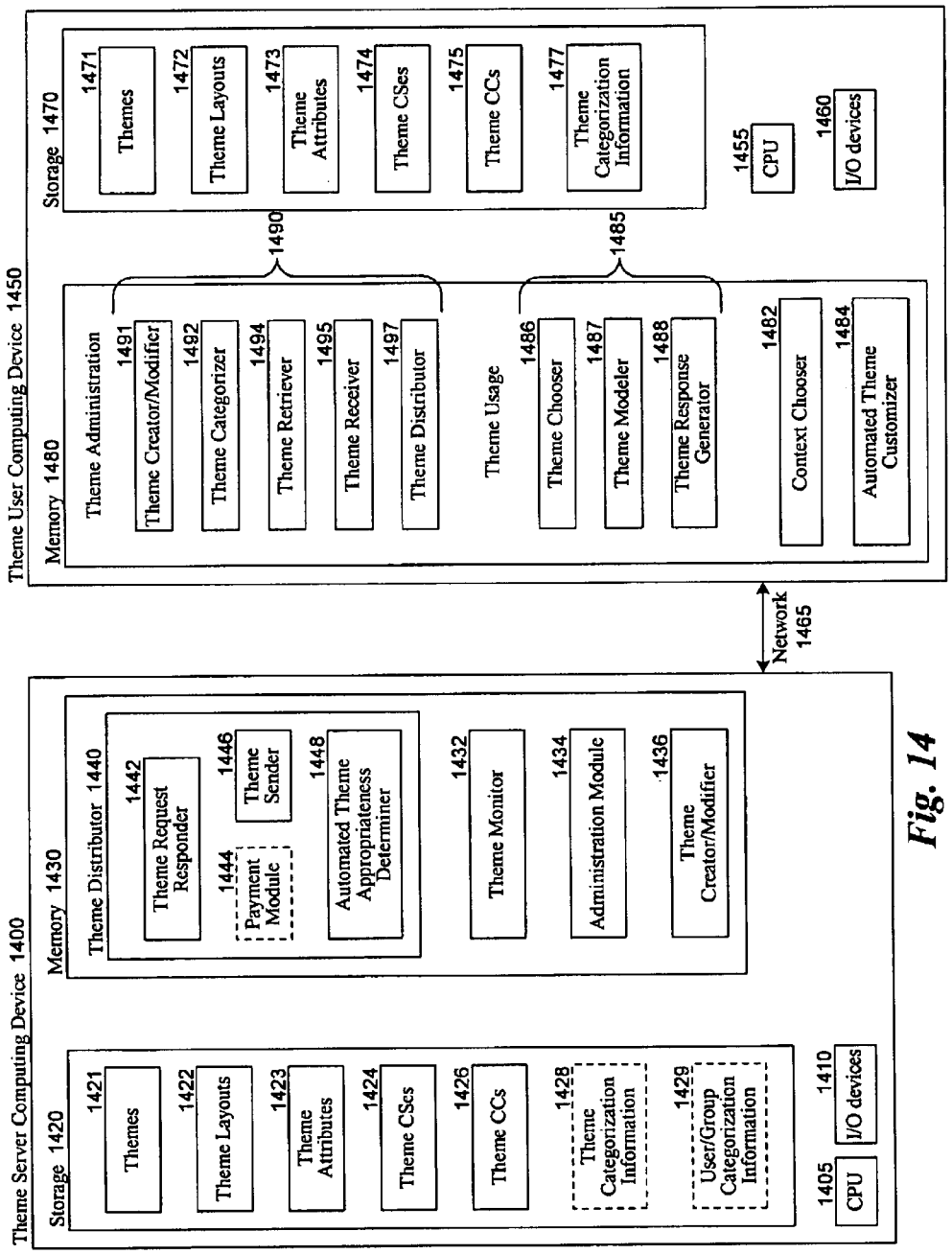
FIG. 14 is a block diagram illustrating an embodiment of a computing device suitable for distributing themes and theme-related information to various user computing devices.

FIG. 14 is a block diagram illustrating an embodiment of a Theme Server computing device suitable for distributing themes and theme-related information to various Theme User computing devices that will modify and use those and other themes. In particular, a Theme Server computing device 1400 is illustrated that includes a CPU 1405, a storage 1420, memory 1430, and various I/O devices 1410.

The storage includes various themes and theme-related information for distribution to user computing devices, including multiple themes 1421. Depending on the themes for distribution, the storage can also include multiple theme layouts 1422 that are each associated with one of the themes, various theme-specific attributes 1423 that are part of the set of thematic attributes for at least one of the themes (e.g., by being used in theme-matching or theme-logic), various theme CSes 1424 able to generate values for one or more of the theme attributes, and various theme CCs 1426 able to use information from at least one of the themes (e.g., theme attribute values) to generate appropriate responses for a user that is part of that theme. The storage can also optionally include theme categorization or grouping information 1428, such as for determining associated themes that may be distributed together, and can optionally include user or group categorization information 1429, such as for categorizing users and groups of users in order to determine what themes are appropriate for those users.

Various modules are executing in the memory in order to create, distribute, and monitor the use of distributed themes and theme-related information. In particular, a Theme Creator/Modifier component 1436 is executing in memory so that a user can use the component to create or modify themes and/or theme-related information, such as the themes and theme-related information on the storage. Those skilled in the art will appreciate that the Theme Creator/Modifier component can be used to create themes and theme-related information in various way, such as those discussed above or those known in the art for creating or modifying software components, data structures or visual interfaces. For example, the component may provide a Graphical User Interface ("GUI") with which the user can visually create theme-related data structures, theme layout presentation, or components in an interactive manner. In some embodiments, the component can present various categories of context information and allow the user to select information from one or more of the categories (e.g., Me, Location, Activity/Task/Project, People (such as in immediate vicinity), Objects (such as in immediate vicinity), Environment, etc.).

A Theme Distributor component 1440 is also executing in memory to distribute themes and theme-related information to users as appropriate, such as in response to requests or automatically if a user is determined to meet appropriate criteria. The Theme Distributor component includes a Theme Request Responder sub-component 1442, an Automated Theme Appropriateness Determiner sub-component 1448, a Theme Sender sub-component 1446, and optionally a Payment Module sub-component 1444. The Theme Request Responder receives requests from users for themes and/or theme-related information, determines if the users are authorized to receive the requested information, and if so notifies the Theme Sender to provide the requested information. When a theme is being provided, the Theme Sender will typically retrieve any other theme-related information that is associated with the theme, such as theme layouts, theme attributes, theme CSes and/or theme CCs. After the necessary information is gathered, the Theme Sender will provide the information to the user in an appropriate manner (e.g., in an encrypted form).

In some embodiments, the Theme Server may provide themes and theme-related information as a service to users, such as by charging a subscription service or by charging on a per-theme basis. If there is a fee associated with the requested information, the Theme Sender will interact with the Payment Module to ensure that appropriate compensation has been received before the information is provided.

The Automated Theme Appropriateness Determiner sub-component also provides themes and theme-related information to users, but does so not in response to user requests but instead to determinations that a user meets specified criteria (e.g., is a member of a specified group, is in a specified geographic location, is engaged in a specified activity, etc.). In particular, the sub-component receives notifications or other context information related to users, and uses the stored user/group categorization information and/or theme categorization information to determine whether any of the themes or other theme-related information should be provided to those users. In addition, in some embodiments the sub-component could engage in an automated negotiation with a module on a user computing device to make the appropriateness determination. When the Automated Theme Appropriateness Determiner determines to provide information to a user, it notifies the Theme Sender to provide the requested information in a similar manner to that described above. Those skilled in the art will appreciate that in some embodiments only one of the Theme Request Responder and Automated Theme Appropriateness Determiner may be employed as part of the Theme Distributor.

The stored user/group categorization information and theme categorization information that is used by the Automated Theme Appropriateness Determiner can be generated in a variety of ways, such as by being received from users or from theme sources. The information can also be generated and modified by a user using an Administration module 1434 that is executing in memory. For example, via a GUI provided by the module, a user could specify conditions or executable logic to determine when to provide themes to users. Those skilled in the art will appreciate that such information can be specified in a variety of formats and used in a variety of ways.

In addition to the illustrated Theme Server computing device, FIG. 14 also illustrates a Theme User computing device 1450 suitable for receiving themes and theme-related information, as well as using these and other themes in order to provide appropriate responses to the user (not shown) of the Theme User computing device. The Theme User computing device and Theme Server computing device communicate via network 1465.

The Theme User computing device includes a CPU 1455, a storage 1470, memory 1480, and various I/O devices 1460, with the storage including various themes and theme-related information in a manner similar to the storage 1420 of the Theme Server computing device. In particular, the storage 1470 stores themes 1471, and can also include theme layouts 1472 that are each associated with one of the themes, theme-specific attributes 1473 that are part of the set of thematic attributes for at least one of the themes, theme CSes 1474 able to generate values for one or more of the theme attributes, theme CCs 1475 able to use information from at least one of the themes to generate appropriate responses for the user, and theme categorization or grouping information 1477 that identifies relationships among the themes.

The memory 1480 similarly includes a group of executing Theme Usage components 1485 that can use the various theme information in a manner similar to those of the Thematic Response computing device previously described. For example, the memory includes an executing Theme Modeler component 1487 that repeatedly identifies a current theme set having defined themes that match the current context, selects a current theme, and then selects an appropriate type of response (e.g., an associated theme layout for presentation or other appropriate actions) based on the current theme. When the Theme Modeler selects an appropriate type of response for a current theme, the Theme Modeler component notifies the executing Theme Response Generator component 1488 that provides the appropriate response (e.g., by presenting an appropriate theme layout). Rather than having the Theme Modeler component select the current theme in an automated fashion, the user can alternately explicitly specify the current theme using the executing Theme Chooser component 1486 or specify various context information using the executing Context Chooser component 1482. Those skilled in the art will appreciate that execution and use of the various themes can also include the loading and/or execution of various theme-related information such as theme attributes, theme CSes, and/or theme CCs.

In addition to the Theme Usage components, the memory 1480 also includes various executing Theme Administration components 1490. Using these components, a user can create, modify, categorize, and retrieve themes and theme-related information. In addition, in some embodiments Theme Administration components such as the Theme Receiver component 1495 will automatically receive theme information (e.g., from the Automated Theme Appropriateness Determiner component 1448 via the Theme Sender component 1446) and/or distribute theme information to other devices using a Theme Distributor component 1497 that operates in a similar manner to Theme Distributor 1440. The Theme Administration components also include a Theme Creator/Modifier component 1491 with which the user can create or modify themes and/or theme related information in a similar manner to that of Theme Creator/Modifier component 1436. For example, the user can use the component 1491 to explicitly customize themes or theme-related information received from the Theme Server. The memory also includes a Theme Categorizer component 1492 with which a user can specify theme relationship information (e.g., group, category or hierarchy information), such as theme categorization information 1477, for various themes (e.g., themes created by the user). In the illustrated embodiment, a user can also search for and generate requests for themes and theme-related information of interest using the Theme Retriever component 1494. Those skilled in the art will appreciate that the Theme Receiver and Theme Retriever can in some embodiments employ functionality to provide appropriate access information and/or payment for received information. In addition, those skilled in the art will appreciate that in some embodiments only one of the Theme Retriever and Theme Receiver components may be employed as part of the Theme Administration modules.

The memory also optionally includes an executing Automated Theme Customizer component 1484. In the illustrated embodiment, this component employs learning techniques to monitor user actions, detect patterns of use related to the various themes, and automatically customize (or suggest customizations to) received and/or created themes. Those skilled in the art will appreciate that such patterns can be detected in various manners (e.g., by using neural networks, expert systems, genetic algorithms, probabilistic belief networks, etc.), and that a variety of types of customizations can occur (e.g., to any of the theme properties and/or to theme response information such as theme layouts).

Those skilled in the art will appreciate that computing devices 1400 and 1450 are merely illustrative and are not intended to limit the scope of the present invention. The computing devices may be connected to other devices that are not illustrated, including through one or more networks such as the Internet or via the World Wide Web (WWW). In addition, the functionality provided by the illustrated components may in some embodiments be combined in fewer components or distributed in additional components. Similarly, in some embodiments the functionality of some of the illustrated components may not be provided and/or other additional functionality may be available. Those skilled in the art will also appreciate that, while various components and the context model are illustrated as being stored in memory while being used, these items or portions of them can be transferred between memory and other storage devices for purposes of memory management and data integrity. Similarly, data illustrated as being present on storage while being used can instead be present in memory and transferred between storage and memory. Some or all of the components or data structures may also be stored (e.g., as instructions or structured data) on a computer-readable medium, such as a hard disk, a memory, a network, or a portable article to be read by an appropriate drive. The components and data structures can also be transmitted as generated data signals (e.g., as part of a carrier wave) on a variety of computer-readable transmission mediums, including wireless-based and wired/cable-based mediums.

Themes and theme-related information can be distributed in a variety of ways and for a variety of purposes. In some embodiments themes are modeled using object data structures, with such themes being easily distributable. In addition, themes can be distributed by theme servers and/or on a peer-to-peer basis by user computing devices that create and use themes. Themes can also be distributed to various groups, such as by an employer to some or all employees or by a service provider (e.g., of an entertainment experience) to users of the service. Themes can also be distributed to users within a specified geographic location, such as by a store owner to customers that enter the store or by a theme server at a tourist location. For example, a retailer can maintain distinct themes for employees, vendors, contractors, identified or anonymous shoppers. A shopper's wireless computing system could, upon entering the store, begin a dialog where the user's preference for privacy is determined. It may indicate that the shopper is interested in knowing what is on sale, and they are willing to share their personal product preferences, but decline to identify themselves except by a permanent but arbitrary ID that is assigned by the store. Their system can then receive and run a theme that, though it may or may not change the UI presentation or interaction, would deliver relevant data to the system (or to the retailer).

The distribution and use of themes can also support various businesses. For example, some businesses may provide themes and theme-related information as a service, such as on a subscription of pay-per-theme basis. Themes that provide currently relevant information of various types could be distributed, such as local map information or information about nearby businesses (e.g., restaurants or bookstores) of various types. Other businesses can provide services by acting as a clearinghouse or exchange broker for themes, while other businesses could provide search services to locate and provide themes of interest. A user could subscribe to a Theme-Of-The-Month Club (or other time period) in which popular themes are periodically distributed, or a business could provide a "bestsellers" list for themes of various types. As noted above, the distribution and use of themes has applications in the industrial (e.g., for training, to enhance the safety and productivity of employees, etc.), retail (e.g., for companies to communicate with customers, suppliers, and partners, such as to enhance sales and obtain tracking information), and consumer markets (e.g., to provide enhanced entertainment and productivity tools). In addition, themes can be used on a variety of computing devices, such as wearable computers, PDAs, desktop or laptop computers, wireless phones, etc. Themes can also be used to provide new applications, or to enhance/modify the functionality available from existing applications (e.g., a calendar/schedule application).

Figure 15:
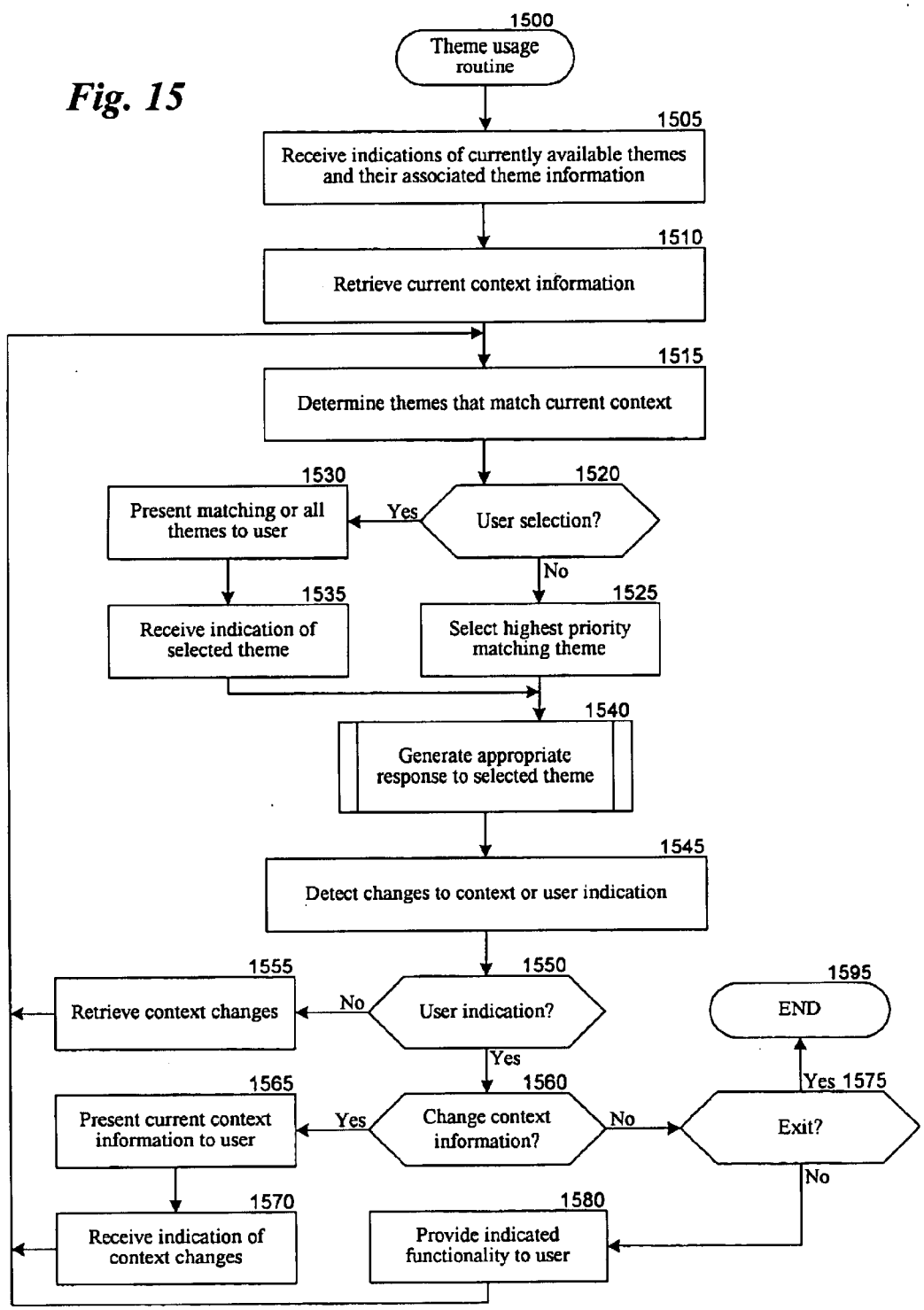
FIG. 15 is a flow diagram of an embodiment of the Theme Usage routine.

FIG. 15 is a flow diagram of an embodiment of the Theme Usage routine 1500. The routine determines a current theme set and current theme and provides an appropriate response based on the current theme, as is illustrated and is described in greater detail above.

Figure 16:
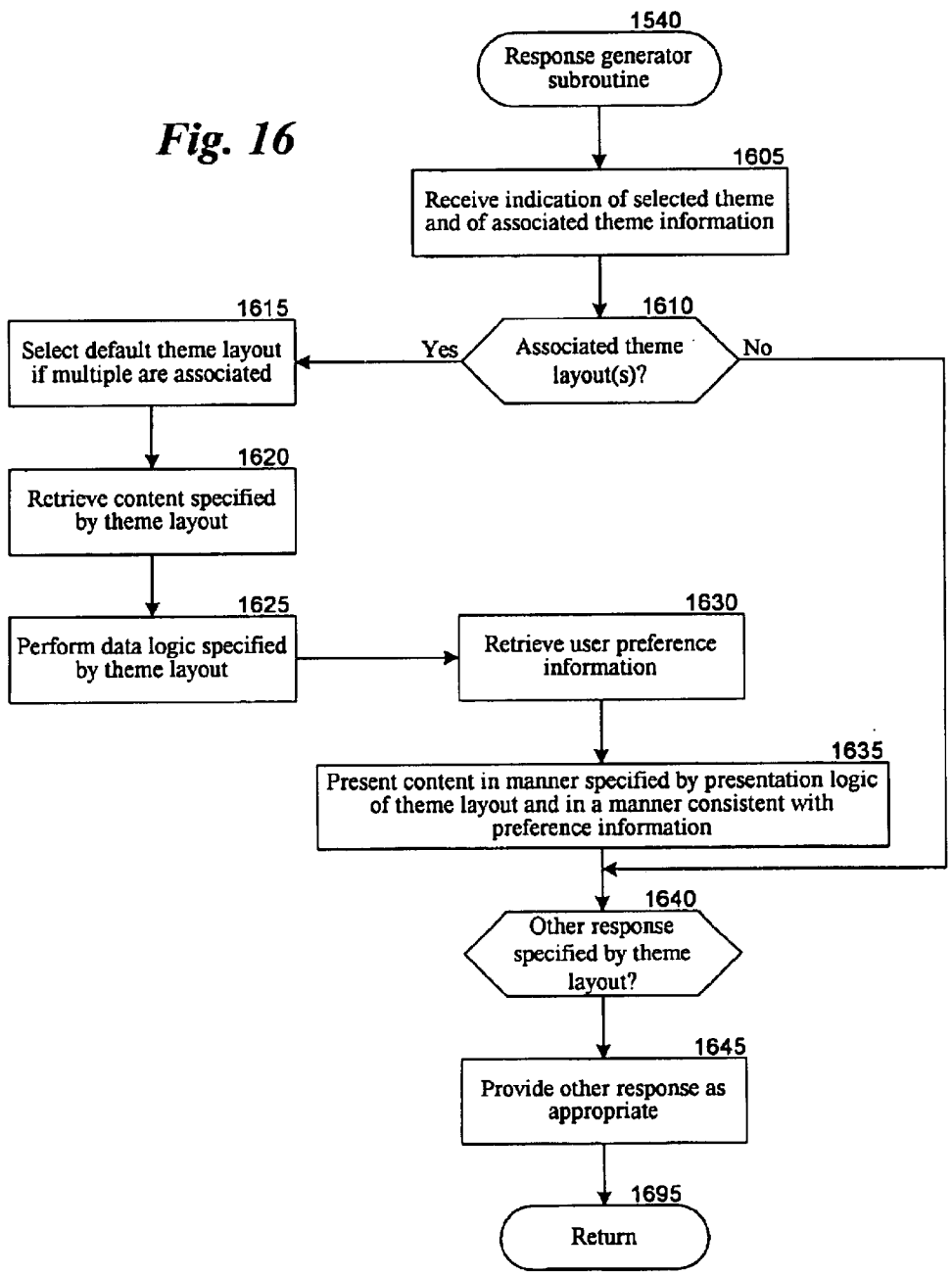
FIG. 16 is a flow diagram of an embodiment of the Response Generator subroutine.

FIG. 16 is a flow diagram of an embodiment of the Response Generator subroutine 1540. The subroutine generates an appropriate response to a current theme, as is illustrated and is described in greater detail above.

Figure 17:
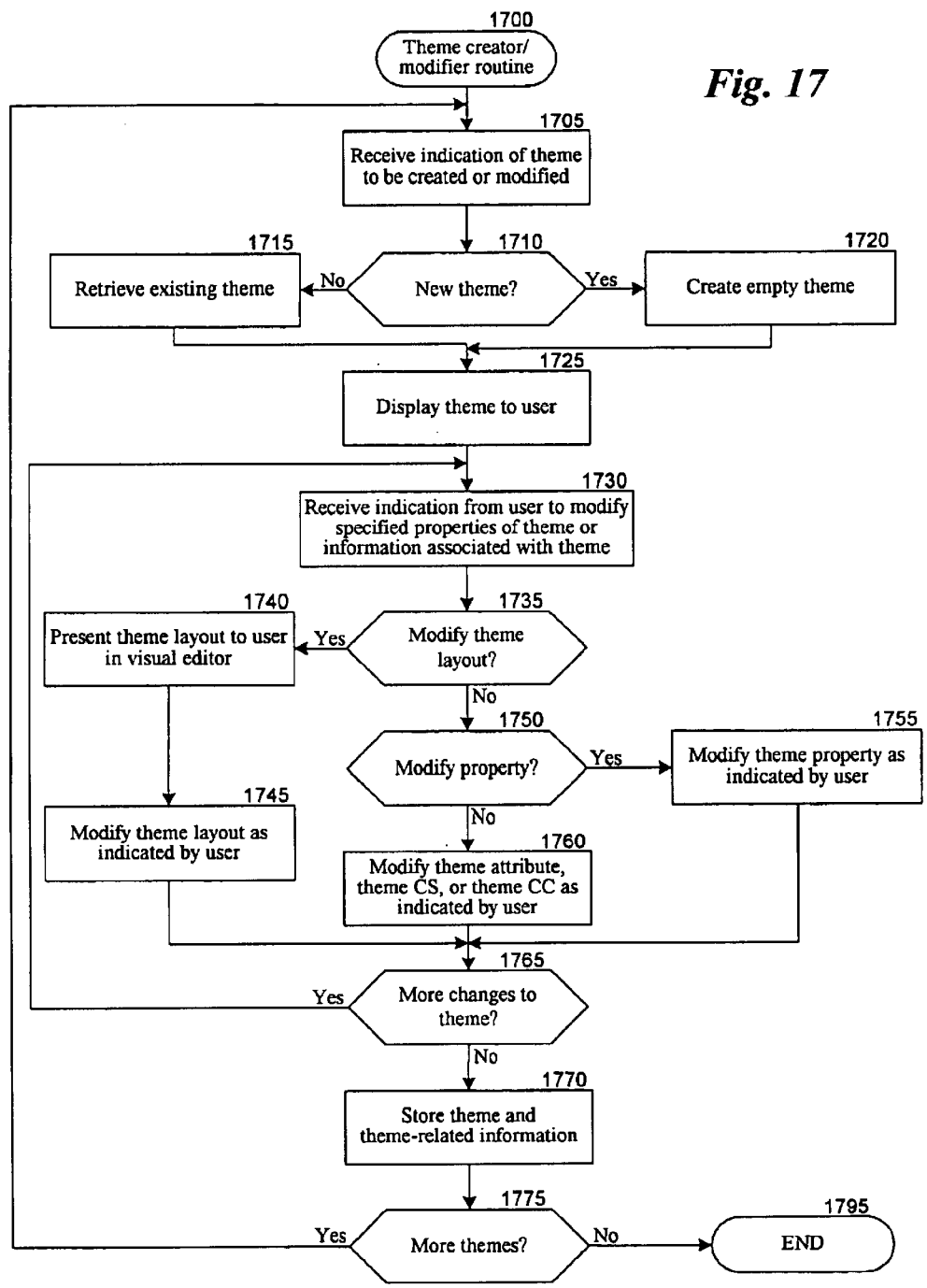
FIG. 17 is a flow diagram of an embodiment of the Theme Creator/Modifier routine.

FIG. 17 is a flow diagram of an embodiment of the Theme Creator/Modifier routine 1700. The routine allows a user to create and/or modify themes and theme-related information, as is illustrated and is described in greater detail above.

Figure 18:
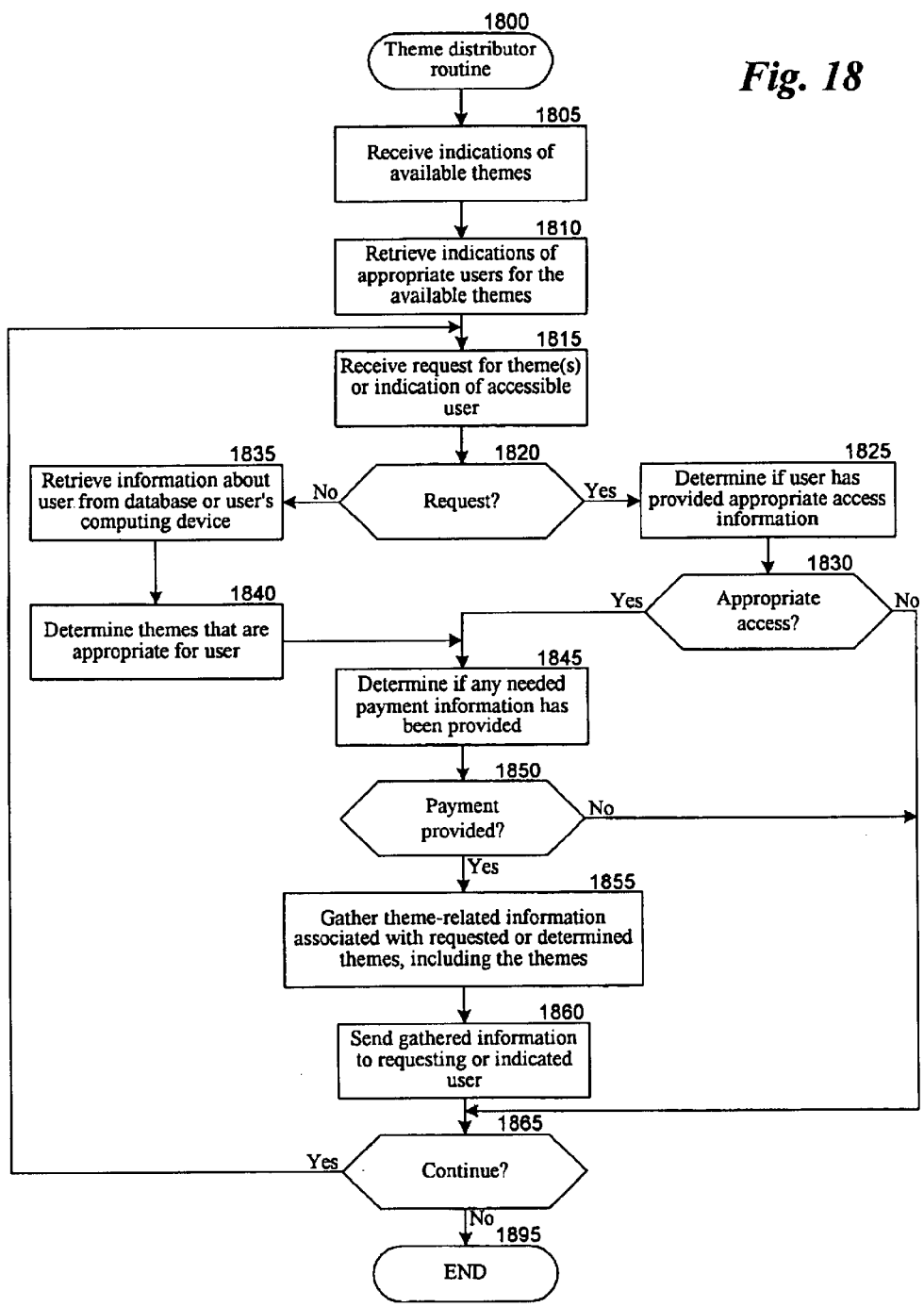
FIG. 18 is a flow diagram of an embodiment of the Theme Distributor routine.

FIG. 18 is a flow diagram of an embodiment of the Theme Distributor routine 1800. The routine distributes themes to users either in response to requests or as is automatically determined to be appropriate, as is illustrated and is described in greater detail above.

Figure 19:
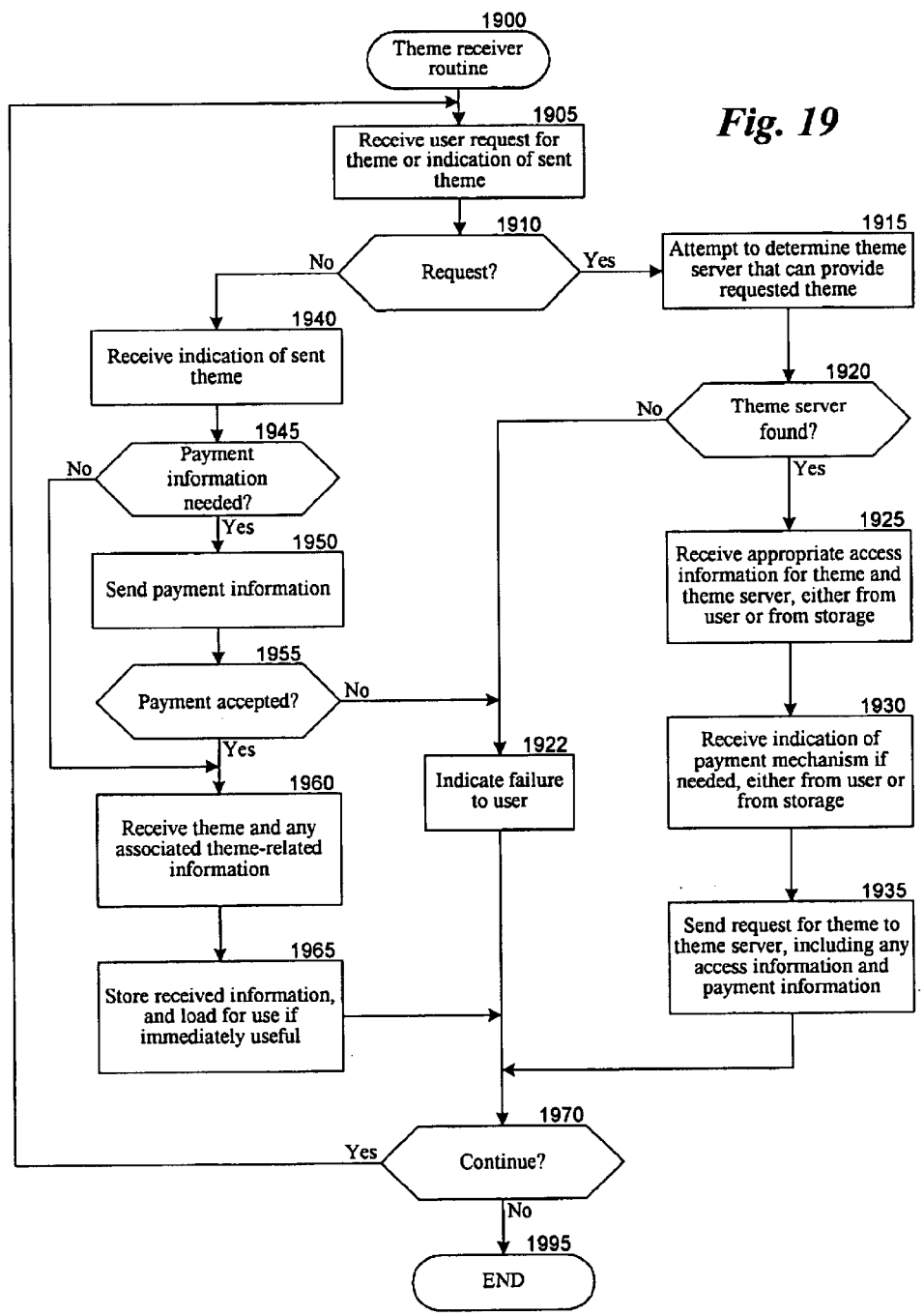
FIG. 19 is a flow diagram of an embodiment of the Theme Receiver routine.

FIG. 19 is a flow diagram of an embodiment of the Theme Receiver routine 1900. The routine receives themes from a theme provider either in response to a request or when the theme provider sends the theme in an unsolicited manner, as is illustrated and is described in greater detail above.

Figure 20:
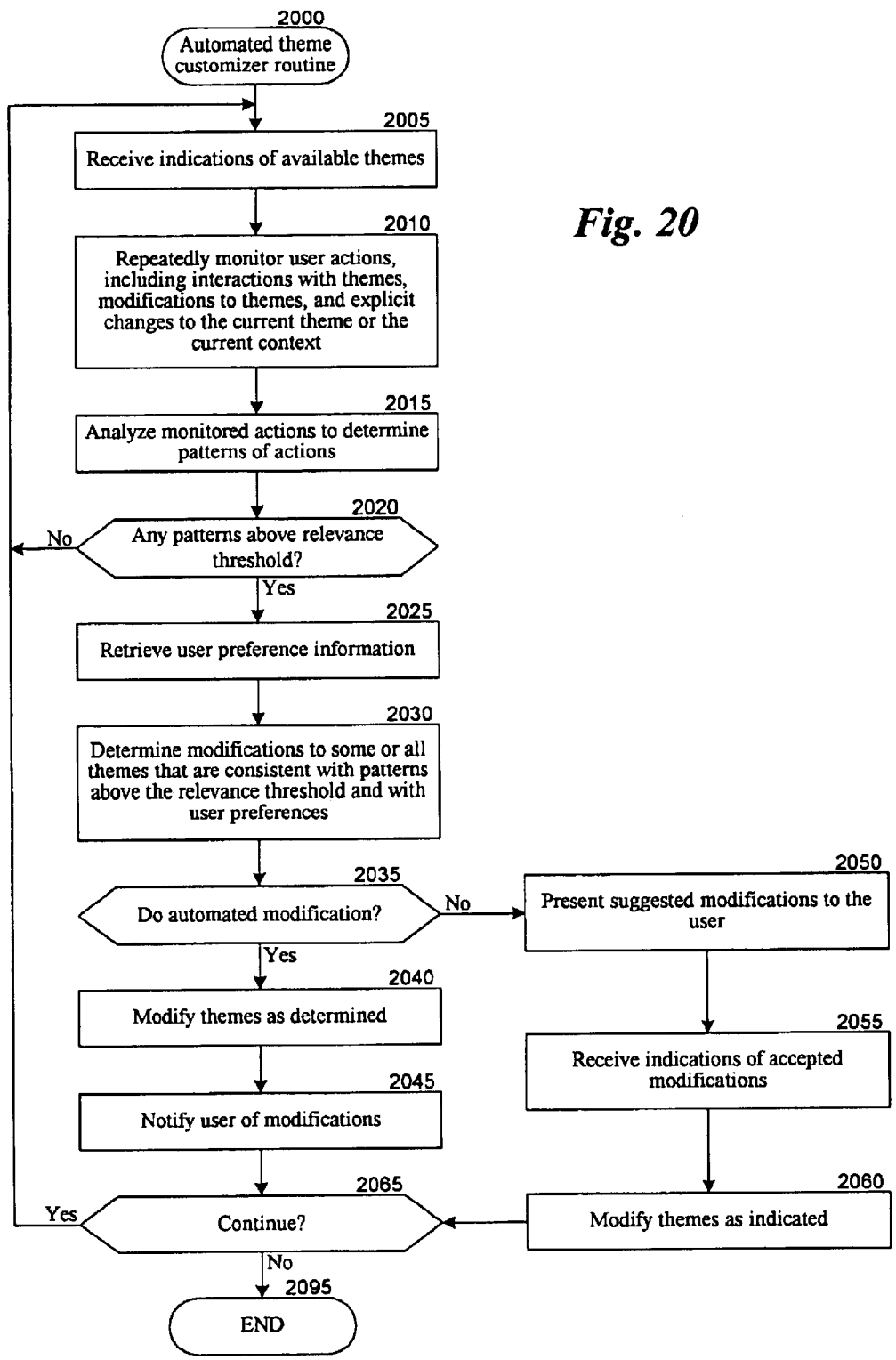
FIG. 20 is a flow diagram of an embodiment of the Automated Theme Customizer routine.

FIG. 20 is a flow diagram of an embodiment of the Automated Theme Customizer routine 2000. The routine determines how to customize themes in an automated manner based on previous user actions and customize the themes as determined when appropriate, as is illustrated and is described in greater detail above.

A variety of example themes and example uses for themes have been discussed. Other examples include the following: a Driving theme that automatically tunes the car radio to a favorite news radio station, or to a news station in the morning and a music station in the evening, or coordinates with context information for car passengers so that a selected radio station is acceptable on everyone; a Fuel Station theme that provides a list of stations that the vehicle can reach (e.g., prioritized by closest or by cost) and that matches the current context with the level of gas in the tank reaches a specified level; a Speech Reminders theme that allows a computing device to act as a self-improvement tool by listening for selected phrases or sounds (e.g., "umm," "probably" instead of "probably," "Feberary" instead of "February," etc.) or for speech at sound levels below or above thresholds (e.g., to detect shouting inside), and unobtrusively notifies the user in real-time when detected (e.g., with a beep in an earpiece speaker); a Personality Improvement theme that could use psychological profile information about the user (e.g., from the Meyers-Briggs test) to assist the user in adapting their personality in a desired way (e.g., if someone is a strong extrovert and has been spending too much time with non-family activities they could be coached to give more prominence to the family, or if the user is a timid person the system can coach the user during a conversation to assert their opinion)—such a theme or a related theme could even automatically gather personality information about the user by monitoring the behavior of the user and suggesting that the user could improve in certain ways; a Person theme that provides information about a specific topic user's affiliation, a previous encounter with the person including the time/date/location and what they discussed, various personal information; etc.; an Object theme that provides information about a specific topic object's owner, location, type/category, tag, etc.; a Place or Location theme that provides information about a location's activities/categories, temperature, people currently there, when the user was last there, etc; a Talking About A Topic theme; a Watching TV theme that provides functionality to control the remote and displays current or future shows; a Watching NBA Basketball game that provides information about the teams and provides functionality to order NBA or team paraphernalia; etc.

As previously noted, in some embodiments automated learning techniques can automatically determine ways in which to enhance themes and theme-related information, such as by customizing received themes and/or theme layouts to a current user or computing device. Such learning techniques can function in a variety of manners, such as by retrieving and using stored user preference information, and monitoring user interactions with and modifications to themes and theme-related information in order to detect patterns and correlations.

More generally, such automated learning techniques can enhance responses provided to current contexts and to changes in context, regardless of whether themes or theme-related information are available or in use. For example, computer users would benefit from a system that assists them with decision-making, and that assists in processing the vast amounts of context data and other information that the system can gather and store. Thus, a system is needed that will perform tasks for the user based on rules and behavior maintained by both the system and user.

Unfortunately, current software is typically unable to conveniently and safely provide automated collection, processing and delivery of information while the user remains "in task" (i.e., able to continue with their current or intended activity), in part because such software was designed for cumbersome fixed-location computers or was optimized for small portable computer platforms that lack significant computing power. Moreover, even if the processing power of a portable computer platform was sufficient, such devices provide different abilities to present information and be controlled by the user than current software is typically designed to use. Thus, users would benefit from a software environment that allow the user to change between the different capabilities of different platforms by presenting an integrated mechanism that scales content, presentation, and control (e.g., interaction mechanisms).

Another problem with typical current software and computing devices is that reliance is placed on the user to explicitly indicate precisely (and typically repetitively) what they want the software and/or device to do. However, this can be undesirable or even dangerous when in the midst of a task or activity that requires attention. Devices and software instead should be aware of, and anticipate changes in, the user's current situation and intent.

Wearable computers can provide enhanced opportunities to provide useful automated functionality, but also provide an increased need for such functionality. As computer hardware continues to become smaller, more powerful, and convenient, there are increasing opportunities to integrate it into our daily lives. Currently, there are many computer hardware components that are comfortable and safe enough to be carried with us as we move from one task and situation to another, and improvements are constantly occurring. Unfortunately, such computer hardware requires appropriate software to be useful, and techniques for dealing with users in task and in motion have generally not yet been addressed.

A particular problem is the current need for a user to give a high degree of attention to a computer and/or software in order to have it operate in a desirable manner. Unless the computer and/or software can respond to needs and changes in the user's situation with minimal user attention, however, it is not practical for such devices to be in constant use.

There are a variety of ways in which automated learning and intelligent software techniques can be used to enhance software and device functionality, including (but not limited to) the following: self-customizing of a model of the user's current context or situation; predicting appropriate content for presentation or retrieval; self-customizing of software user interfaces, simplifying repetitive tasks or situations, and mentoring of the user to promote desired change.

Self-customizing of a model of the user's context or situation can provide various benefits. Personal computer software is designed to be used by large numbers and types of users, and thus cannot account for all the needs and desires of specific individual users. Merely providing greater amounts and types of functionality is not sufficient—not only will some desired functionality inevitably be excluded, but it becomes increasingly difficult for users to locate and select appropriate provided types of functionality. As previously noted, use of themes and theme-related information can provide some assistance in providing appropriate types of functionality, but it may not be sufficient in all situations. The use of such themes is enhanced by systems that model the user's context and employs symbolic (or "explicit") logic based on the model in order to change the computer's content, presentation, and interaction. However, such explicit logic must be augmented over time for the system to refine the model and logic to account for the particular needs and desires of individual users. Therefore, it is beneficial for the computer model to be able to be extended, and the associated logic to be enhanced. While the user or other software programmers can explicitly assist with enhancements and extensions to the model and associated logic, it is beneficial that the computer itself have the ability to propose and execute improvements.

As with self-customizing of a user context model, an automated ability to predict and provide appropriate information for a user can provide various benefits. A user's tasks and situations constantly change, and what constitutes optimal information content in one context is often different than for another. Unfortunately, current systems are unable to identify and predict with sufficient precision and without continual user indication what information would be appropriate for different circumstances.

In a similar manner, an automated ability to optimize software and device user interfaces (e.g., GUIs), such as to predict and provide appropriate functionality, can provide various benefits. As a user's physical, mental, data, and computing resource resources and needs change (e.g., as current tasks and situations change), the optimal control techniques of computer software also change. Unfortunately, current systems are unable to identify and predict with sufficient precision and without continual user indication the appropriate user interaction controls for different circumstances.

Simplifying of repetitive tasks or situations can also provide various benefits. As previously noted, many actions performed by computer users are repetitive or redundant. It would be beneficial if computers could recognize these actions, and offer the opportunity to have the repeated sequence removed.

Mentoring of a user to promote desired change is another type of functionality that can provide various benefits. In particular, it would be beneficial to use a computer's ability to give a user constant attention in order to watch for behavior that matches a rule or profile. By providing feedback to the user when the behavior is detected, the user can become aware of the behavior and thereby effect a change. Though existing systems exist that provide limited feedback for a small number of specific user behaviors, such systems cannot model the full range of human behavior nor allow the user to inspect and conveniently modify the logic used to identify behavior or resulting computer action.

As previously noted, some systems employ an explicit model of the user and their environment in order to provide various functionality. While explicit models can be used with symbolic logic to provide computer actions that are both appropriate and that are executed with very little user interaction, they are restricted to the model attributes and logic supplied by humans. These explicit user context models do have the advantage of providing the designed functionality as soon as a user employs them with a properly configured computer hardware platform. However, without further human interaction (e.g., programming), the system is not extensible or highly personalized.

Some existing systems have also employed implicit models of the user and environment in order to provide various functionality. These models can include predictive and inference mechanisms that allow pattern recognition and predictions of next user states. These systems have a variety of problems, however, including a typically low correlation between suggested computer actions and the actual needs and desires of users. Implicit models by themselves are also insufficient because they often detect patterns that are nonsensical and that do not meaningfully map to the user's perceived reality. For example, an implicit model could discover that there is a recent strong correlation between a user's changing of traffic lanes followed by a changing of the radio station. However, unless these two activities are actually related, having the computer suggest a list of radio stations when the user next changes lanes is not useful.

To summarize, explicit models can be reliable (in specified circumstances based on human tailoring and tuning) and practical (by being controllable and having processing understandable to a user), but require on-going human effort to extend, enhance and customize. Conversely, implicit (or "connectionist") models (e.g., machine-learning algorithms) can provide extensibility and predictive capabilities, but discover patterns that are not meaningful to users (especially during the early periods of pattern detection when the amount of relevant data to analyze is small). They are also inconvenient for users to manage because of the complexity in their user control interfaces and the lack of understanding of the logic.

In order to address the shortcomings of existing systems and to provide various beneficial functionalities, some embodiments of the invention combine explicit and implicit user modeling techniques in the manners described below, and use feedback paths to speed machine learning and assure appropriate computer actions (e.g., suggestions and execution for computer controlled actions that are desirable, useful, convenient, profitable, entertaining, and safe). These embodiments provide continuously improving automatic computer actions, with and without direct user control, including presentation of appropriate content and functionality.

In some embodiments, an explicit model and logic is initially provided that focuses on areas of human behavior whose scope is limited, with the corresponding problem space thus being constrained. By doing so, system performance can be is enhanced in initial stages of operation when there is little personalized information in the system. Once a stable useful system is provided using such an explicit model and logic, it can be incrementally expanded and enhanced by the automated learning techniques as described. In addition, rules for determining appropriateness can be specified in various manners, such as specifying strict/conservative rules in areas related to safety, privacy, or other irreversible actions.

Figure 21:
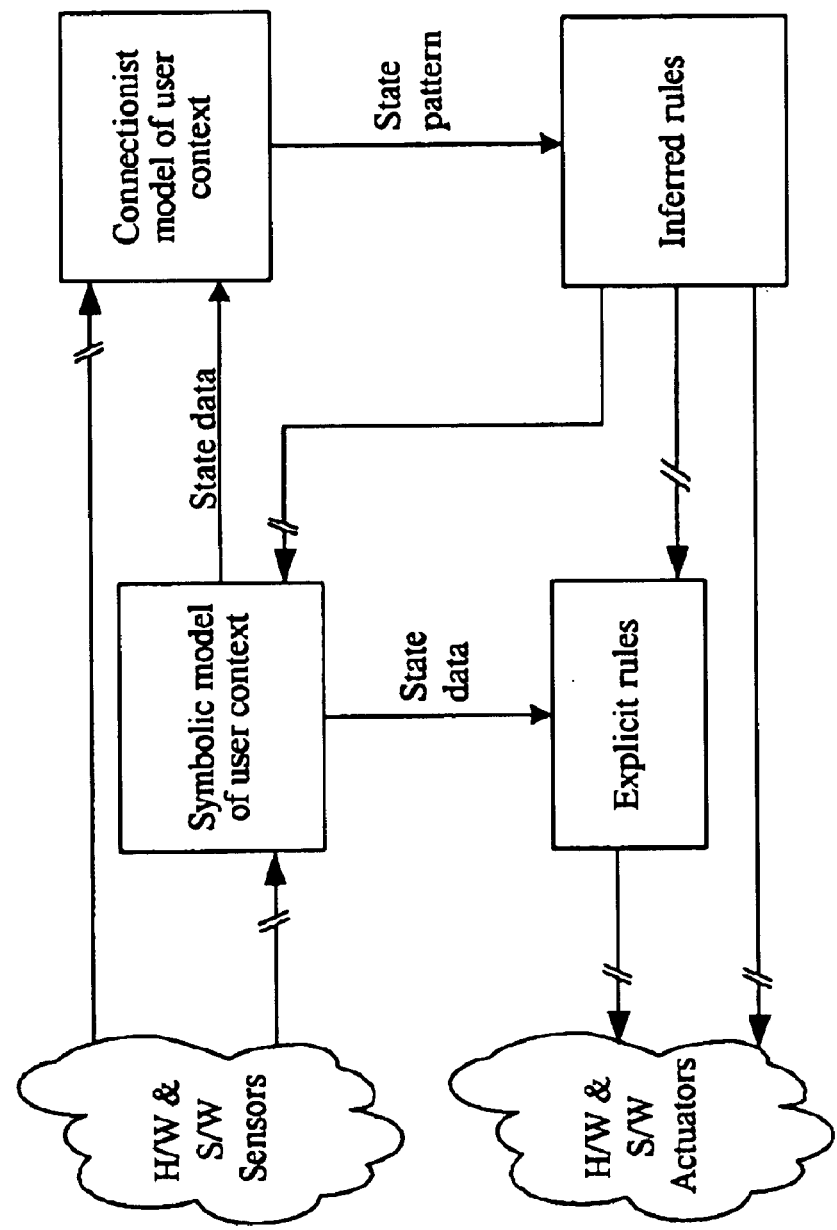
FIG. 21 is a block diagram that conceptually illustrates an embodiment in which explicit and implicit models of user context are integrated.

FIG. 21 is a block diagram that conceptually illustrates an embodiment in which explicit and implicit models of user context are integrated. Various context and other information is provided to both models from various hardware and software sensors, and various output can be provided to hardware and software actuators by either explicit rules (that use information from the explicit model) or by inferred rules (that are produced using the implicit model). Though the implicit "connectionist" model is shown in the illustrated embodiment as receiving data directly from the user's context (e.g., in order to assist the implicit model in detecting when the explicit model incompletely models the user's context), in other embodiments the implicit model will receive information only from the explicit "symbolic" model. As described below, data provided to an implicit model can also be used with an Appropriateness Verifier component (not shown). While in the illustrated embodiment the inferred rules executed by the inference engine also provide information to the explicit model, in other embodiments such information may not be supplied. In addition, in the illustrated embodiment the explicit rules also receive information about the inferred rules in order to verify their appropriateness.

Thus, the described system operates by receiving input data that measures or characterizes the user's context (physical, mental, data, computer platform, etc.), and providing the data to an explicit software model. As previously described, this model can be constructed so that it is meaningful to humans, extensible, and dynamic, and it can have associated logic (e.g., "explicit rules") that allows the computer to initiate activities based on changes in the model. In this way a computer can be made "assistive" by responding appropriately to the current context. In the illustrated embodiment, the explicit model has mechanisms that allow the association of meaningful names and values to different types of context information (e.g., via context attribute data structures), and these name/value pairs are used to model at least portions of the user's reality.

Context attributes and their values are provided to an implicit model that can be used with software to discover patterns in large datasets. Examples of implicit models include neural networks, expert systems, genetic algorithms, probabilistic belief networks, pattern and clustering engines, affinity maps, and other software algorithms that provide machine-learning capabilities. Since such learning algorithms can typically work on arbitrarily organized or complex datasets, they can easily process explicit context models. Discovered patterns, and their associated suggestions of computer activity responses, are preferably verified as useful, safe, and appropriate to the user's current context before use. Mechanisms for providing this step include software logic and/or human feedback.

Thus, the usefulness of computers can be greatly improved by combining a symbolic model of human context with machine-learning algorithms that propose appropriate computer actions, particularly when the proposed action are verified for appropriateness with additional symbolic logic.

Figure 23:
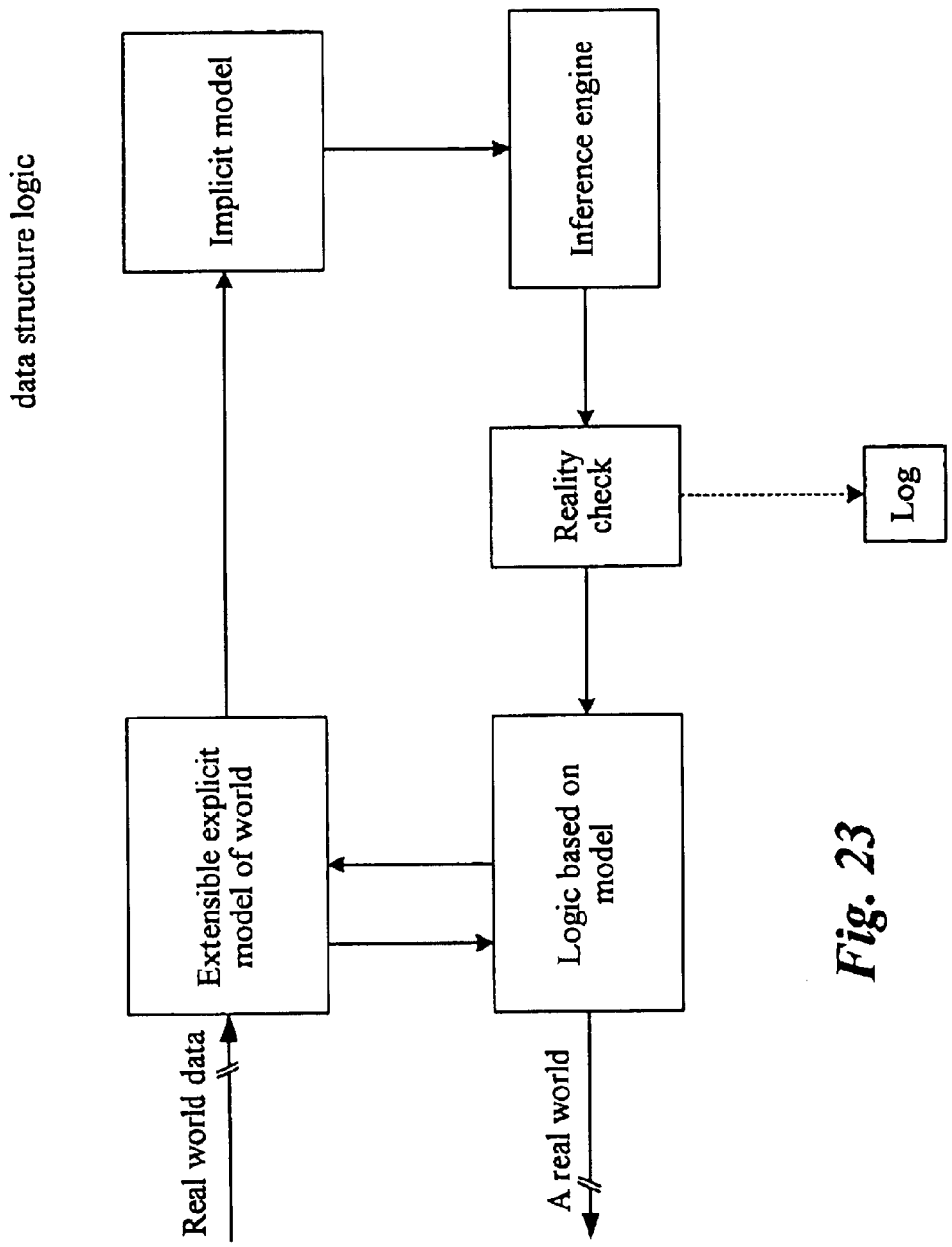
FIG. 23 is a block diagram that illustrates a functional view of an embodiment using explicit and implicit models of user context.

FIG. 23 is a block diagram that illustrates a functional view of an embodiment using explicit and implicit models of user context. Real World Data from multiple sources is shown as input to the Extensible Explicit Model of the World, and information from the explicit model is provided to the Implicit Model. In some embodiments, the explicit and implicit models will be implemented as distinct specialized datastores. The data flowing to the implicit model includes at least the name/value attribute pairs of the explicit model. In other embodiments, the implicit model can also receive a variety of other types of information, such as time information. Alternately, in the illustrated embodiment the implicit model may be able to derive or deduce some such information, such as if the implicit model can infer an accurate association in sequence between inputs. The models can exchange information in a variety of ways, such as by the implicit model sequentially polling the explicit model, controlled by time or other computer-aware or user-indicated events.

In addition to the explicit and implicit models, various executable components are illustrated. In particular, the output of the Implicit Model is provided to inference algorithms in the Inference Engine component. Though it is common to integrate this logic component into the Implicit Model, it is illustrated separately here because different engines/algorithms can be used with the same datastore. When the inference algorithms produce a prediction of a useful computer action, the action is not immediately performed. Instead, a test of appropriateness is provided by a Reality Check component (also referred to as an Appropriateness Verifier). Appropriateness can be determined by the use of symbolic logic, such as with rules that compare the suggested action against a catalog of desirable and undesirable computer actions. Alternately, it can be supplemented or replaced with explicit user indications. When the appropriateness of a suggestion has been verified, the computer can proceed to provide the suggestion and this produce Real World Changes output.

As a summary of some of the benefits and dependencies of the two types of models, a pyramid is illustrated below in Table 1. The bottom three layers can be supported by explicit models, while the top two layers can be supported by implicit models.

TABLE 1

| Patterns | Anticipate | | | |
| --- | --- | --- | --- | --- |
| Rules | Derive | Infer | | |
| Attributes | Interpret | Mediate | Poll | |
| Sensors | Sense | Measure | Indicate | Record |

Figure 22:
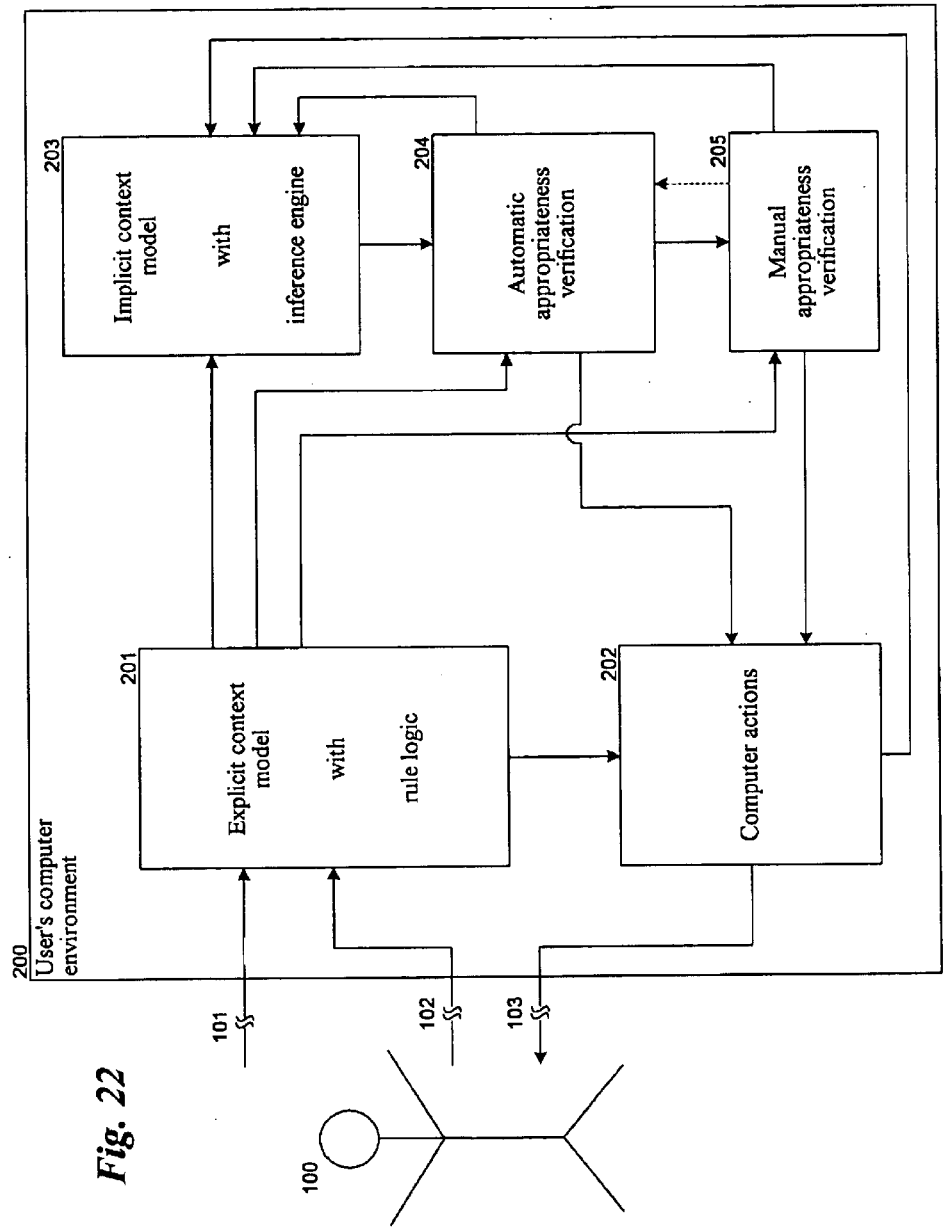
FIG. 22 is a block diagram that provides a more detailed example view of an embodiment using explicit and implicit models of user context.

FIG. 22 is a block diagram that provides a more detailed example view of an embodiment using explicit and implicit models of user context. Those skilled in the art will appreciate that additional details are provided for illustrative purposes only, and are not intended to limit the scope of the invention.

An illustrated User 100 has directly perceivable computer output devices, such as display devices that can be seen and understood by the User. The User also has directly manipulatable computer input devices, such as a text input device that they can control by their own gestures. The User may, within their immediate vicinity, also have physical sensors such as a thermometer. In the illustrated embodiment, all of the I/O devices and sensors are carried by the user. Other parts of the User's Computer Environment may be local to the user or located remotely in arbitrary locations. Input Data from User 102 is provided to the User's Computer Environment 200, and includes the commands intended to control the computer as well as other explicitly offered or passively collected context-modeling data Input from the Environment 101 is also available to the User's Computer Environment, and can include any data from any source that is used to model the user's environment. While Input from Computer is not illustrated in the diagram, the Explicit Context Model 201 of the User's Computer Environment can receive and use information from data sources that include data indicating the state of the computer hardware, software, and content.

The User's Computing Environment can be implemented using a variety of computer configurations. The invention is not limited to any particular system (including local or remote processing, memory, datastores, continuous or intermittent wireless connectivity) as long as the system supports the described software components.

In particular, the User's Computer Environment includes an Explicit Context Model that provides an explicit, extensible, dynamic model of the User's context. The Explicit Context Model also provides symbolic logic inspection, manipulation, and computer-controlled actions, and the logic is expressed in the illustrated embodiment as rules that are internal or external to context-modeling attributes. As described above, this component can receive context information from the User and from the User's physical and computing environment.

A variety of Computer Actions 202 are also provided as part of the User's Computer Environment. The Computer Actions allow the computer to affect the physical world, such as by changing the content presented to the user, changing the format of the content presented, changing the methods by which the user interacts with the computer, and/or any other computer-controlled action that manipulates the physical or electronic world. In the illustrative embodiment, the Computer Actions component includes a Presentation Manager capability that allows the system to not only change the format of computer information is presented but to also reorganize and defer its presentation based on user indication or context modeling.

The Computer Actions component can be implemented in a variety of ways, and is not dependent on any particular computer architecture, operating system, or programming paradigm as long as the computer's actions can be programmatically controlled. The Presentation Manager capability uses previously described techniques, and it can be used, for example, to determine if a computer-initiated action should be performed immediately, deferred, or presented to the user for confirmation. This determination can be accomplished by logic/rule mechanisms embedded in the Explicit Context Model or in a separate module. When the system determines that the user is busy and does not want to be disturbed by the outside information or contacted by others, output information can be deferred, and can be presented later if still appropriate when the user is more available. The Computer Actions component receives data (e.g., instructions to initiate actions) from two sources: the Automatic Appropriateness Verification module and the Manual Appropriateness Verification module.

An Implicit Context Model 203 is also present in the User's Computer Environment, and it makes suggestions for computer actions based on current and previous user context. In some embodiments, the Implicit Context Model makes suggestions by noting patterns in user behavior, and when a specific user input to the computer can be inferred to be about to occur the computer can suggest that it performs the action on the user's behalf Various algorithmic techniques can be used to provide this type of functionality. One example is a pure neural network—with the data from an explicit model feeding directly into the neural network, such a system can produce a projected user action based upon the inputs. Either the Automatic Appropriateness Verification, Manual Appropriateness Verification or Explicit Context Model modules can positively reinforce such a system when it correctly predicts an action, and negatively when it incorrectly infers. Another example is a pure genetic computation technique. In this case, the explicit model feeds context data into a genetic computation engine, which feeds the data into a set of code generators that each can generate rules as code fragments. Each rule is provided to the Automatic Appropriateness Verification module, which weights the appropriateness of the generator. If a given system drops below a minimum level of appropriateness, it is destroyed and replaced by a new generator created from the existing set of valid generators. An example of an implementation of the Implicit Context Model is a combination of these two techniques. In this case the genetic code generators create a net of neural networks that compete in computer action rule generation.

Note that while a separate model for automatic appropriateness verification is shown (i.e., one that relies on an explicit model of user context), there are also typically appropriateness feedback mechanisms embedded in implicit models. For instance, training can occur with the Implicit Context Model by invoking logic that requires a minimum data set (e.g., measured by a variety of characteristics, including size of datastore of a particular attribute or length of time the data was collected) or confidence rating (e.g., determined by a minimum number of times that the pattern must have been repeated, or how similar the occurrences of the pattern were). Users can also be allowed to train the system explicitly by repetitively providing context values (e.g., "I am in the car", "I am in the office", "I am cold", etc.).

In an alternative optimized embodiment, sets of generic/ representational context data are provided from the explicit model to train the explicit model. As disclosed elsewhere, such training information and the resulting appropriate computer action suggestions can benefit from thematic organization.

An example of use of the system involves the system detecting a high correlation between the user telephoning people who provide similar services to the user (e.g., lawyers) from a specific location (e.g., work), and the system can perform a task to display a customized phone number list to the user when they are at work. A stronger correlation could be detected related to the time of day or the type of document the user is writing, thus increasing the ability of the system to meet a confidence threshold that allows presentation of the task to the user. In such situations, an optimized list of phone numbers can be presented to the user depending on the type of work the user is performing.

An Automatic Appropriateness Verification component 204 is also present in the User's Computer Environment to allow the system to check the inferences/suggestions for computer-controlled actions from the Implicit Model for appropriateness to the current user context. The component also provides the Implicit Model feedback on the appropriateness determination, so as to increase the speed and accuracy of the Inference Engine's ability to propose use suggestions.

The component can be implement in a variety of ways as long as tests are provided for appropriateness for suggestions. They may also make use of directly, or maintain separately, an explicit model of the user's context. For the Implicit Context Model to benefit from the learning opportunities presented when this module identifies the appropriateness or fitness of a suggestion, a feedback path to the Implicit Context Model is provided. However, because of the potential danger or inconvenience of computer controlled actions that have not be verified by humans, there preferably are dedicated mechanisms to minimize these risks. Such mechanisms include logic targeted toward actions that are potentially unsafe (e.g., presenting information while the user is driving in congested traffic at high speed) or irreversible (e.g., deleting information). In addition, even if deemed appropriate by this module, the suggestion can additionally be provided to the Manual Appropriateness Verification module to allow the user the opportunity to manually determine appropriateness. However, it is also possible for suggestions that have been determined to be appropriate by this module to be automatically executed without further user interaction.

The rules used in the module can be arbitrarily complex. For example, attributes can be examined and considered for the user's attention, potential of hazard, current task purpose or destination, user's mood, etc. The module can also maintain or share a set of attributes specifically designed to determine appropriateness of computer suggestions based on a thematic organization of attributes. For example, if the theme=skiing, then do not show any news content, unless it is a government issued warning or an emergency.

Because inference engines and implicit models can be slow, in some embodiments much or all of the attribute processing is performed when the system is under-utilized. As an example, when the user is asleep and not using the system, the system can be exploring new tasks to present to the user for appropriateness. In one embodiment, the system can test ideas against this module. When doing so, the module could temporarily stop 'dead path traversal', and could also allow for questions to be cached for later presentation to the user.

This module can also maintain not only the logic used, but also what has been previously determined to be appropriate. This can provide efficiencies for future determinations, and for feedback to the Implicit Model. As some context attributes may be dedicated to the task of determining appropriateness, the system can also flag attributes in the Explicit Context Model as being related to this function. This can provide algorithmic efficiencies and increased privacy and security methods if desirable. If critical privacy and security measures are needed (e.g., if the appropriateness verification logic needs to be provided without the user's awareness), all of the attributes used for the determination of appropriateness can be duplicated or created separately in a datastore managed by this module. This module can also characterize a suggestion as pending, by which it defers its progress through the system until a context change. In addition, this module is not limited to binary characterizations of appropriateness.

A Manual Appropriateness Verification module 205 is also present in the User's Computer Environment to provide the user (or an authorized human agent) the opportunity to determine the appropriateness of the computer generated suggestions for computer action.

This manual feedback mechanism can be implemented in a variety of ways. For example, if the system presents a suggested rule to the user for verification, different responses are possible. Whatever the user's answer or rating of appropriateness, it can be feed back to the inference engine, providing critical feedback necessary for machine learning. Types of responses include the following:

"Yes, that is a good suggestion/rule, so perform it. In the future, when the system decides the rule is appropriate, the system should always perform the suggestion without manual verification.";

"Yes, that is a good suggestion, so perform it. In the future, when the system decides the rule is appropriate, the system should ask for confirmation (because it may not be, or because the user is not ready for the system to always perform the action automatically).";

"No, do not perform the suggestion. In the future, the system should ask the user for confirmation (because the suggestion was good, just not entirely appropriate). In this case, the user could specify more information to the system to improve the appropriateness of the request."; and "No, do not perform the suggestion. In the future, the system should not this suggestion (the suggestion was totally inappropriate)."

A variety of other type of answer could also be used, such as "why do you ask this?". In this manner, users can ask for an explanation of the proposed suggestion/task. This allows the user to understand why the system presented the task, and provides the user an opportunity to improve the Implicit Model. An example of such an explanation facility follows.

Example situation:

System: Recommended that user takes anti-viral cold medication.

User: Explain.

System: Appears that you are becoming ill.

User: Explain.

System: Your body temperature has recently increased.

In the example, the system always monitors body temperature, and has determined that an uncharacteristic sustained rise in body temperature has occurred. This suggestion could have been the result of symbolic logic that looked for this pattern, or perhaps the system inferred this since the last time(s) this occurred illness shortly followed. However, the user knows he has just arrived in an uncharacteristically hot location. Thus, the user can direct the system to propose the action in the future, but next time to consider the surrounding temperature related to the rise in body temperature.

Such explanation can be difficult to provide using implicit models because of the nature of the algorithms. One problem is the dataset grows significantly when it needs to keep track of what led up to its inference. However, there are still many indications that can be provided to the user of why the system came up with its recommendation that make use of the explicit model. For example, the data source (the name/value pairs from the explicit model) can be weighted for likely involvement by using the following techniques:

Have any attributes (name/value) just changed value? Especially ones that are highly derived or user set. Though the indication could be wrong, as long as it has better than random (i.e., causative and predictive) results it can be useful in human understanding.

Does this result/suggestion have similarity to previous ones? There may have been a previous attempt at explanation. Therefore, there may information useful from previous analysis, or it may be illuminating to the user that the similarity exists.

Are there one or more attributes that the user would like to have this rule associated with? This is an attempt to make progress toward providing the user with useful context/action rules. Say the system suggests that I may want to call home. When asked why, it includes a stacked attributes listing of what has changed; Time, Location, and Radio. It may not be able to provide a description of a pattern such as "on Tues I call home if I can't be there by 7 pm." However, it knows that those are the attributes that have just changed (there are also a hundred other fluctuations in attributes, like car fuel, body temperature, etc., but unlike time and location, that have been given high priority in the "what attributes are related to this suggestion" algorithm. One way to implement this is with another neural net).

The user can then indicate that the suggestion is correct, that they do want to call home now, and indicates that the Time and Location were relevant. This provides positive reinforcement to both the suggestion-analysis net, and the original follow-the-user-context net. The user can also indicate that the Radio attribute was not significant, and so provide negative feedback.

These examples are not meant to imply that feedback is limited to binary choices. For example, the user can also add that Day of Week is a significant attribute. This analysis can also be associated with the pattern, which can be named. Also, the user can then request that the inferred rule, given the indications by the user of what the significant explicit model attributes are, and the desired computer action, save, enhance, modify the rule, including having it incorporated with symbolic logic into the explicit model.

Various examples of using the disclosed techniques now follow.

Appropriate Content

By reviewing logged user choices, patterns showing user information preferences can be deduced without direct user participation. The system can therefore cache, and if desired/useful present, information appropriate to their context.

By tracking the types of content the user chooses, appropriate content can be gathered on their behalf.

By reviewing logged user choices, patterns showing user information preferences can be deduced without direct user participation. The system can therefore cache, and if desired present, information appropriate to their context.

Self-optimizing UIs

By reviewing user choices over time, patterns showing user UI preferences can be deduced without direct user participation. The system can therefore provide optimal presentation and interaction techniques appropriate to the user's context.

Machine learning algorithms that allow GUIs to self-modify based on the history of a user's actions. These mechanisms, which would include a combination of learning algorithms searching for patterns in a journal file, would propose and execute tasks to speed and simply a user's computer interaction.

By observing how and under what conditions a user changes their computers presentation and interaction, the settings can be changed on their behave.

Task Simplification

By tracking how user does repetitious tasks, the computer can notice which steps are always the same, and offer to do them automatically Mentoring Computer matches observed/modeled behavior to established profiles, and offers behavior modification reminders. Have health, entertainment, social and self-improvement applications.

A simple example is having an audio feedback provided when undesirable vocalizations occur ("Like" "Umm") or when the volume of the user's voice exceeds a threshold.

Other alternatives include the following:

User trains by repetitively telling the system context values ("I am in the car", "I am in the office", "I am cold", etc.). Also, the system is pre-trained (e.g., by the system supplier).

Weighting of computer proposed attributes using context mappings: That might be Bob since that guy's bald. Might be kitchen if I see sink & fridge.

Linear combination of context states: There are n attributes. There is an n-dimensional space. Pick n+1 wildly different (preferably orthogonal) context states. For example, one such state might be "mood=happy, location=work, time=10:00 am . . . " while another might be "mood=sad, location=store, time=3:00 am . . . ". Given a good enough selection of these points, you can express any other likely context state as a linear combination of them. For instance, you might be 0.3 of the first state, 0.05 of the second, etc. through all states.

A specific example of the use of automated learning techniques follows in which GUIs are modified based on a history of a user's actions. In general, problems occur because GUIs are too complex and complicated for typical users. In the illustrated embodiment, a mechanism is incorporated into GUIs that allow them to self-modify based on the history of a user's actions. This mechanism, which includes one or more learning algorithms searching for patterns in such actions (e.g., in a journal or history file), would propose and execute tasks to speed and simply a user's computer interaction.

Examples of problems that typically occur with GUIs include users repeatedly performing many of the same actions (e.g., opening the same dialog boxes to open a file, send it to someone, look up someone's phone number, or find that new or bookmarked web page). In addition, the specific actions required for a task are often not conceptually related in the mind of the user to the objective that the user is trying to accomplish. Users of such GUIs often desire that, once they demonstrate what they want once and/or how to do a task, that the computer should learn to skip most of those steps the next time. Moreover, the computer should recognize that the user performs the same actions at a particular time or place, and should anticipate those actions in the future.

Existing GUIs include rudimentary functionality to allow a user to manually modify the GUI, but such functionality has many problems. For example, some operating systems allow a user to explicitly create shortcuts that include a link to data or functionality not present in the current location. While they provide some use in the hands of skilled computer operators, they are rarely used by more typical users. Similarly, some applications allow users to explicitly define macros that gather multiple actions or operations together, but such macros suffer from the same (or even greater) deficiencies. Some graphical operating systems (e.g., Windows 98) provide various ways for a user to navigate information and functionality (e.g., pop-ups and fly-over menus, shortcuts and links), but having such a myriad of choices presents its own difficulties, and the Windows shell appears to be near its limit for adding additional such functionality.

In this illustrated embodiment, Windows (or another operating system) is customized automatically by using an inference engine hooked up to a clustering and preference engine. In some situations, useful customization can be as simple as sorting a list of actions by frequency of use. In other situations, more sophisticated techniques provide more complicated customizations. In addition, in the illustrated embodiment the techniques do not make changes without explicit user approval and/or an "undo" functionality.

Figure 24:
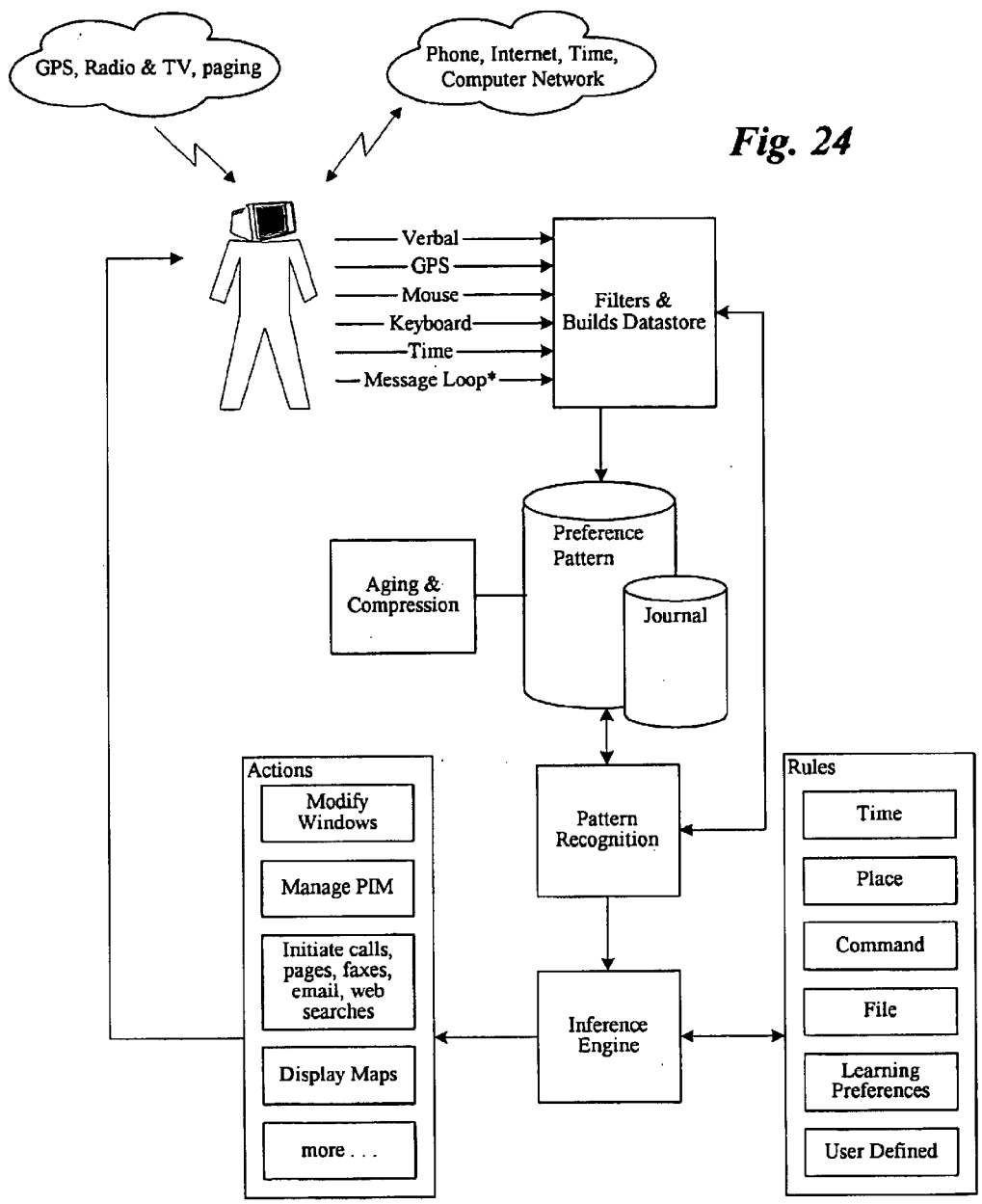
FIG. 24 illustrates a loop including a well-connected user's actions.

FIG. 24 illustrates a loop including a well-connected user's actions. Data from the computing environment is sampled, filtered, and stored as a pattern of explicit variable values (e.g., context attribute values) and weighted vectors. The filtering has its selectivity varied so that only sometimes is a precise snapshot of a computer context recorded, such as when a task being performed has already been identified by the pattern recognizer as one with a high likelihood of being repeated. The illustrated datastore is managed for compactness and quick parsing. Aging the data, such as by discarding low frequency state information, may be applied to any variable or vector.

The Preference Pattern module provides a characterization of what tasks the user may prefer to perform in the near future. The module is continuously searched for strong correlations between previous computer states and the current one. Rules can be used to define what matches are of interest, and/or to rank matches. When a strong match is made, the illustrated inference engine initiates actions that may be suggested or executed on the user's behalf The likelihood of a pattern becoming a rule increases with its repetition, user emphasis (e.g., user could emphasize "yes, do this now" or "Yes, but not right now"—a "No, not ever" provides a strong de-emphasis), or weighting from a separate heuristic such as a learning style. Preferably, the inference engine is replaceable (e.g., to upgrade to a new engine)

Example types of actions that the inference engine could initiate include actions to modify the operating system GUI (e.g., the Windows GUI), such as by providing a shortcut list sorted by frequency of use, auto-finishing directory searches that have begun to be specified, or implementing learning preferences. In addition, a PIM (e.g., Microsoft Outlook) could be managed, such as to create, modify and/or provide information related to contacts, appointments, tasks. Communications could also be initiated, such as prompting or preparing a phone call home during the commute after work. Maps could also be displayed, such as to indicate a user's current location and locations where the user's tasks occur. Web pages of nearby businesses could also be cached and or analyzed, such as to assist in locating an appropriate business in the future.

The learned actions are intended to propose to the user tasks that they may want to do (e.g., when my location begins moving from my house, show me the traffic map). The suggestions are developed by watching for patterns in the user's previous actions. The guess is offered when there is a high likelihood that the user is interested.

Various commercial preference engines and clustering engines are available, including from sources such as www.cs.umn.edu/Research/GroupLens/, www.inference.com, www.likeminds.com, www.hyperlogic.com/hl, www.dkaweb.com, www.likes.com, etc. Thus, in some embodiments one or more of these engines may be used, while in other embodiments other engines (e.g., custom-designed engines) may instead be used.

Figure 25:
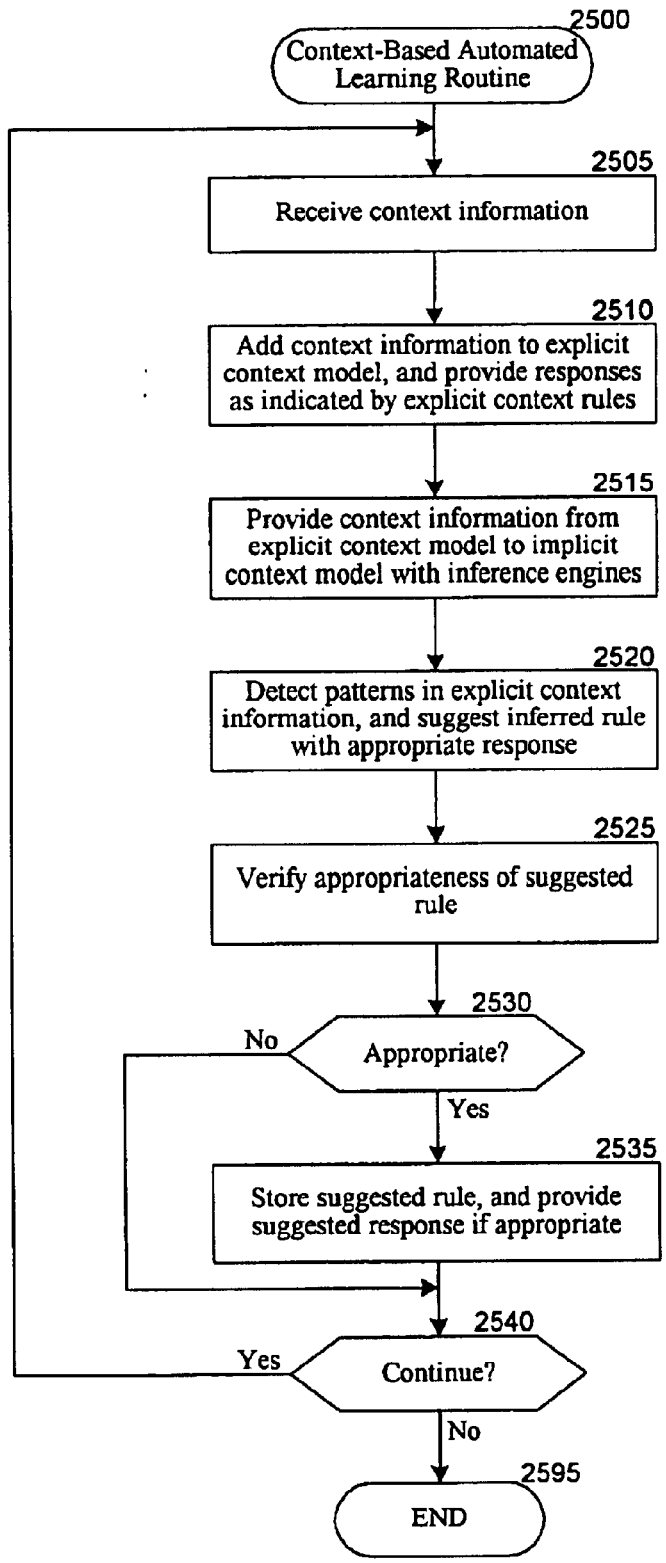
FIG. 25 is a flow diagram of an embodiment of the Context-Based Automated Learning routine.

FIG. 25 is a flow diagram of an embodiment of the Context-Based Automated Learning routine. The routine combines explicit and implicit user modeling techniques and uses feedback paths to speed machine learning and assure appropriate computer actions, as is illustrated and is described above.

Figure 26:
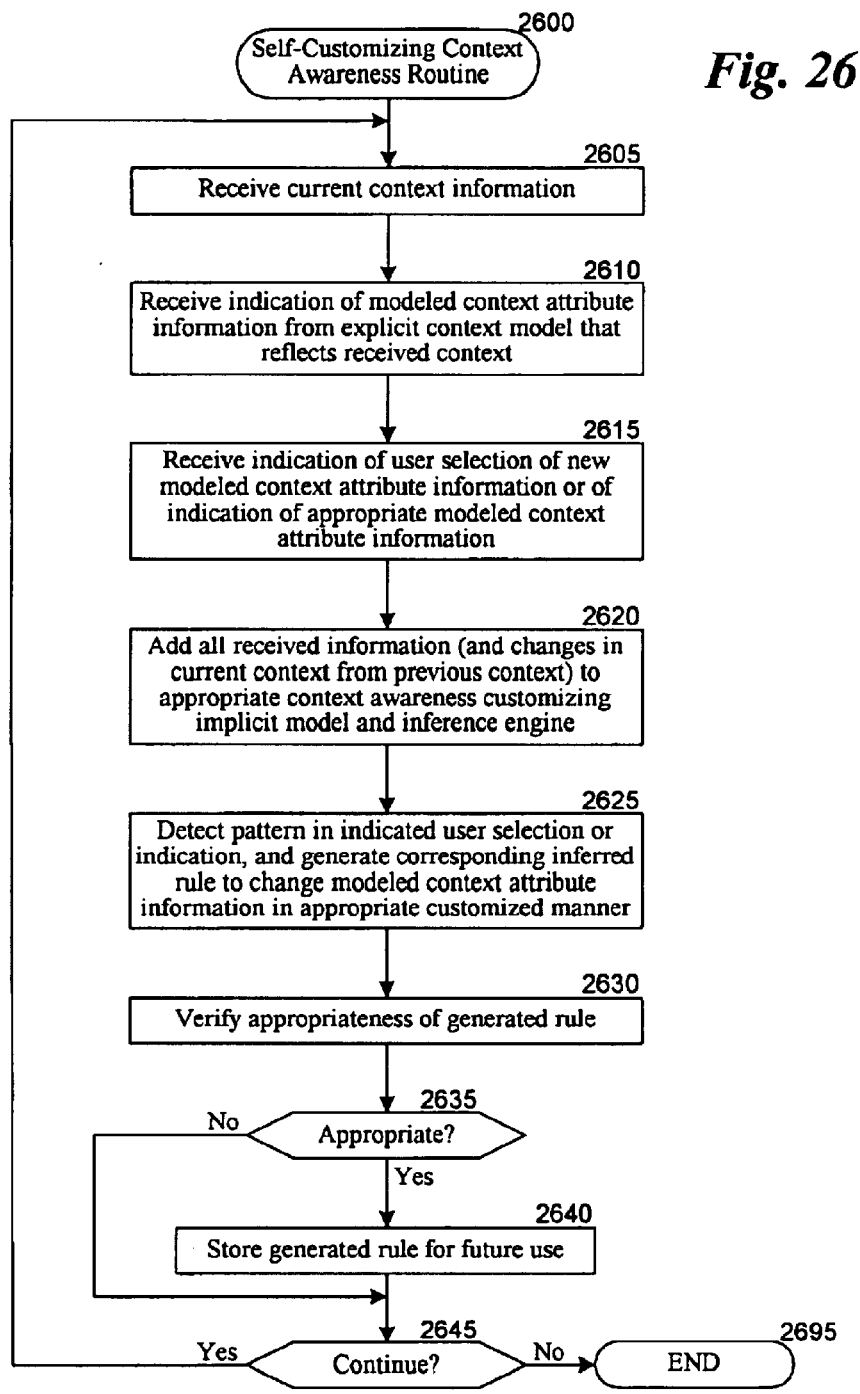
FIG. 26 is a flow diagram of an embodiment of the Self-Customizing Context Awareness routine.

FIG. 26 is a flow diagram of an embodiment of the Self-Customizing Context Awareness routine. The routine provides self-customizing of a model of the user's current context or situation, as is illustrated and is described above.

Figure 27:
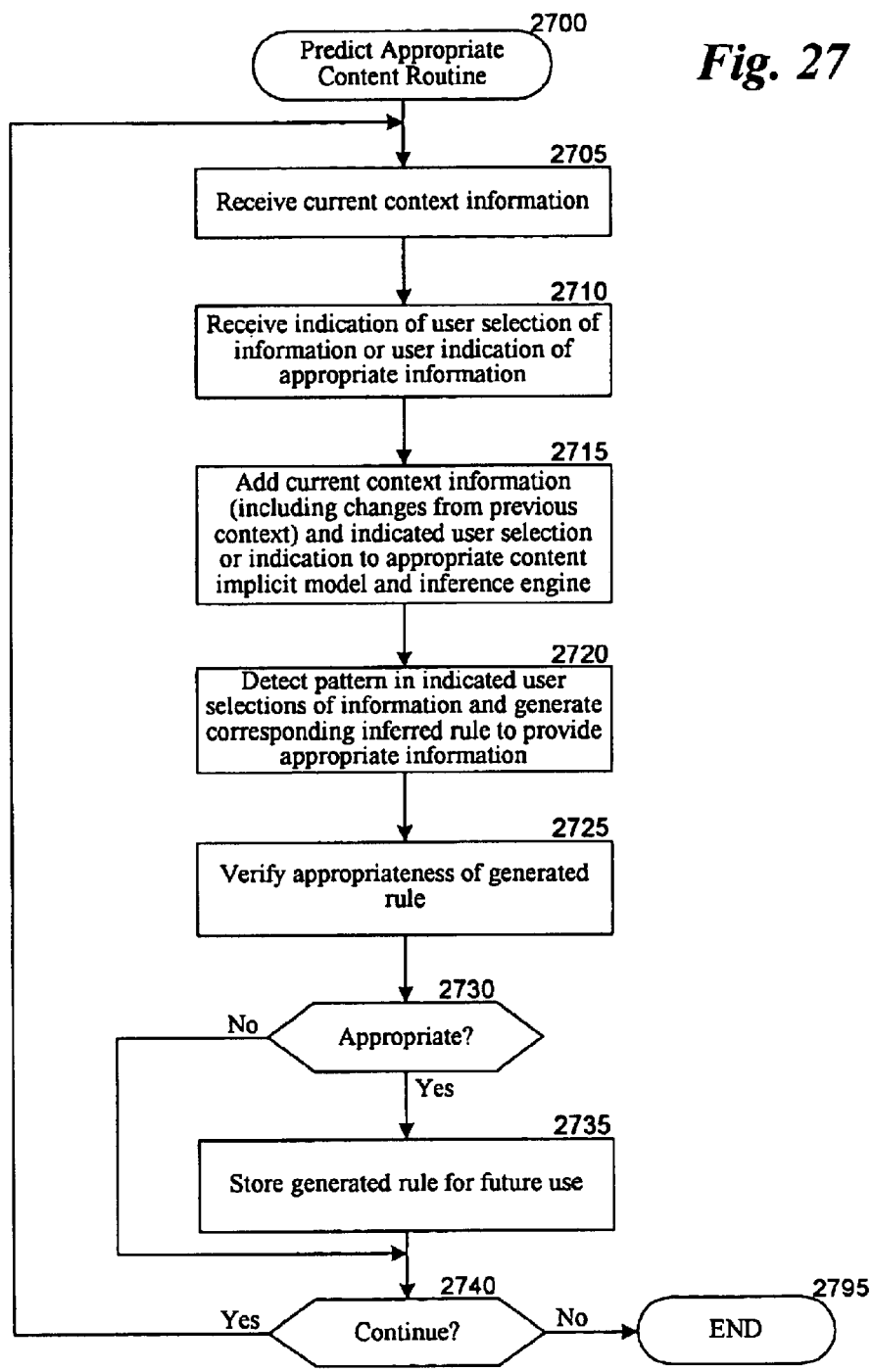
FIG. 27 is a flow diagram of an embodiment of the Predict Appropriate Content routine.

FIG. 27 is a flow diagram of an embodiment of the Predict Appropriate Content routine. The routine predicts appropriate content for presentation or retrieval, as is illustrated and is described above.

Figure 28:
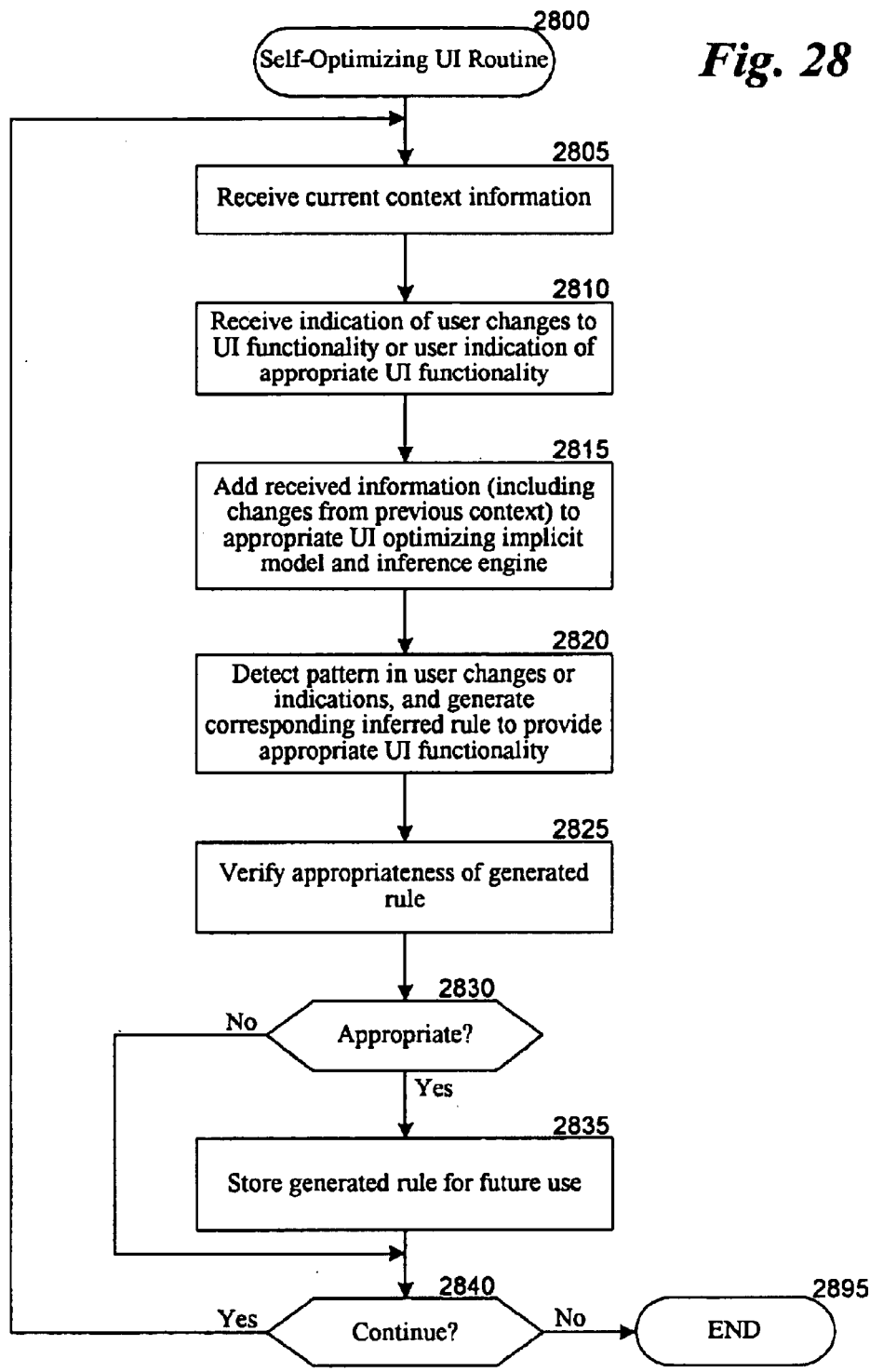
FIG. 28 is a flow diagram of an embodiment of the Self-Optimizing UI routine.

FIG. 28 is a flow diagram of an embodiment of the Self-Optimizing UI routine. The routine provides self-customizing of software user interfaces, as is illustrated and is described above.

Figure 29:
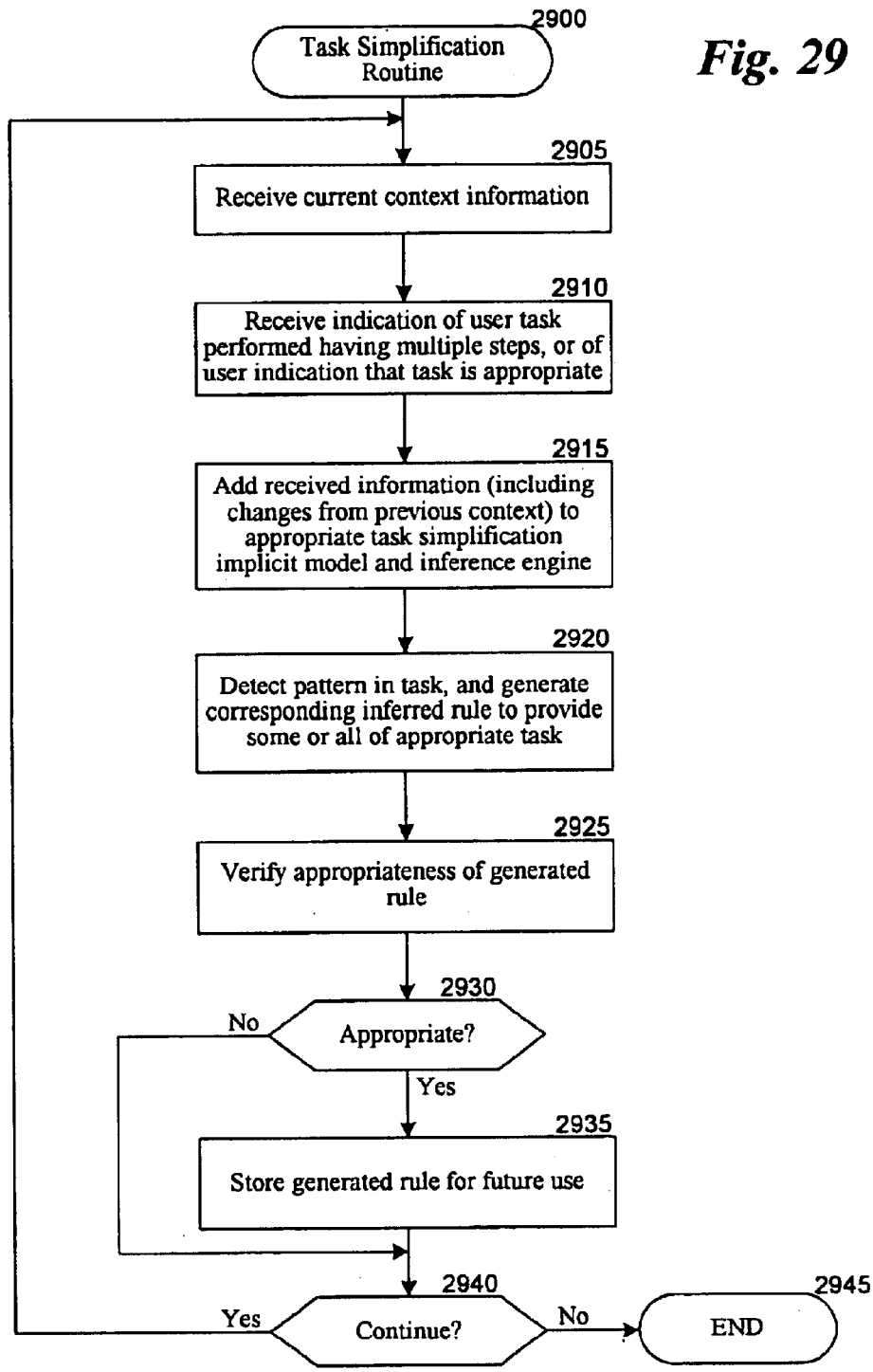
FIG. 29 is a flow diagram of an embodiment of the Task Simplification routine.

FIG. 29 is a flow diagram of an embodiment of the Task Simplification routine. The routine simplifies repetitive tasks or situations, as is illustrated and is described above.

FIG. 30 is a flow diagram of an embodiment of the Mentoring routine. The routine provides mentoring of a user to promote desired change, as is illustrated and is described above.

The above description of the illustrated embodiments is not intended to be exhaustive or to limit the invention to the precise form disclosed. While specific embodiments of, and examples for, the invention are described for illustrative purposes, various equivalent modifications are possible within the scope of the invention, as those skilled in the relevant art will recognize. In addition, the various embodiments described above can be combined to provide further embodiments. All of the above mentioned U.S. patents and applications are hereby incorporated by reference. Aspects of the invention can be modified, if necessary, to employ the systems, methods and concepts of the various patents and applications described above to provide yet further embodiments of the invention.

Those skilled in the art will also appreciate that in some embodiments the functionality provided by the routines discussed above may be provided in alternate ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

We claim:

1. A method in a wearable computing device for improving automated responses to a current context of a user of the wearable computing device based on automated learning techniques, the current context of the user being represented by a plurality of context attributes that each model an aspect of the context, multiple defined contextual situations each specifying values for at least one of the context attributes, multiple automated responses being associated with the defined contextual situations, the method comprising:
repeatedly,
receiving an indication of current context information about the user that includes current values for each of the plurality of context attributes;
determining one of the defined contextual situations that matches the indicated current context information in such a manner that the included current values of the indicated current context information include the values for the context attributes specified by the one defined contextual situation;
automatically providing to the user one of the automated responses that is associated with the one defined contextual situation;
receiving an indication from the user of an alternate automated response to be provided; and
storing an indication of a possible relationship between the indicated current context information and the alternate automated response;
automatically detecting a relationship between an identified contextual situation and one of the alternate automated response based on analysis of repeated patterns in the stored indications in which that alternate automated response is indicated by the user; and
creating an association between the identified contextual situation and the one alternate automated response, so that when the identified contextual situation is determined in the future to match current context information, the one alternate automated response can be provided to the user.

2. The method of claim 1 including, before the creating of the association between the identified contextual situation and the one alternate automated response, verifying appropriateness of the association.

3. The method of claim 2 wherein the verifying of the appropriateness of the association includes receiving explicit authorization from the user to create the association.

4. The method of claim 3 wherein the receiving of the explicit authorization from the user includes:
suggesting the association between the identified contextual situation and the one alternate automated response to the user;
receiving from the user a request to explain the suggested association;
automatically explaining the suggested association by generating a response based on the analyzed repeated patterns; and
receiving from the user the explicit authorization.

5. The method of claim 2 wherein the verifying of the appropriateness of the association is performed automatically without user intervention.

6. The method of claim 2 wherein the verifying of the appropriateness of the association includes determining that providing the one alternate automated response when the user is in the identified contextual situation is safe.

7. The method of claim 1 including, after the creating of the association:
receiving an indication of current context information about the user that includes current values for each of the plurality of context attributes;
determining that the identified contextual situation matches the indicated current context information in such a manner that the included current values of the indicated current context information include the values for the context attributes specified by the one identified contextual situation; and automatically providing to the user the alternate automated response that is associated with the identified contextual situation.

8. The method of claim 1 including, after each of the received indications from the user to provide an alternate automated response, providing that alternate automated response to the user.

9. The method of claim 1 wherein at least some of the automated responses include presenting information to the user that is appropriate based on the one defined contextual situation determined to match the current context information.

10. The method of claim 1 including, after one of the automatic providings to the user of one of the automated responses associated with one of the defined contextual situations:
receiving from the user a request to explain the providing of the automated response; and
explaining the provided response based on the association between that one automated response and that one defined contextual situation.

11. The method of claim 1 wherein the analysis of the repeated patterns in the stored indications is based on an automated learning algorithm.

12. The method of claim 1 wherein the identified contextual situation is not a defined contextual situation, and wherein the creating of the association includes defining the identified contextual situation.

13. The method of claim 1 wherein before the creating of the association the identified contextual situation is a defined contextual situation having an existing association with an automated response distinct from the one alternate automated response, and wherein the creating of the association includes modifying the existing association.

14. The method of claim 1 wherein the identified contextual situation represents an explicit context rules that matches current context information, and wherein the alternate automated response includes processing the matching current context information in order to provide additional context information about the user.

15. The method of claim 1 wherein the alternate automated response includes presenting information to the user that is appropriate to the identified contextual situation.

16. The method of claim 1 wherein the alternate automated response includes presenting functionality to the user that is appropriate to the identified contextual situation.

17. The method of claim 1 wherein the alternate automated response includes presenting a graphical user interface control to the user that is appropriate to the identified contextual situation.

18. The method of claim 1 wherein the alternate automated response includes automatically performing at least some of the steps in a multi-step task.

19. The method of claim 1 wherein the alternate automated response includes prompting the user to take an indicated change.

20. The method of claim 1 wherein the alternate automated response includes notifying the user of a pre-defined occurrence.

21. The method of claim 1 wherein at least one of the context attributes represents information about a user of the wearable computing device.

22. The method of claim 21 wherein the represented information reflects a modeled mental state of the user.

23. The method of claim 1 wherein at least one of the context attributes represents information about the wearable computing device.

24. The method of claim 1 wherein at least one of the context attributes represents information about a physical environment.

25. The method of claim 1 wherein at least one of the context attributes represents information about a cyber-environment of a user of the wearable computing device.

26. A computer-readable medium whose contents cause a wearable computing device to improve automated responses to a current context for a user of the wearable computing device based on automated learning, the current context being represented by a plurality of context attributes that each model an aspect of the context, multiple defined contextual situations each specifying values for at least one of the context attributes, multiple automated responses being associated with the defined contextual situations, by performing a method comprising:
repeatedly,
receiving an indication of current context information that includes current values for each of at least some of the plurality of context attributes;
determining one of the defined contextual situations that matches the indicated current context information;
automatically providing one of the automated response that is associated with the one defined contextual situation;
receiving an indication from the user of an alternate automated response to be provided; and
storing an indication of the indicated current context information and the alternate automated response;
automatically detecting a relationship between an identified contextual situation and one of the alternate automated responses based on analysis of patterns of that alternate automated response being indicated by the user; and
creating an association between the identified contextual situation and the one alternate automated response so that the one alternate automated response can in the future be provided to the user for that contextual situation.

27. The computer-readable medium of claim 26 including, before the creating of the association between the identified contextual situation and the one alternate automated response, verifying appropriateness of the association.

28. The computer-readable medium of claim 26 including, after the creating of the association, detecting the identified contextual situation and in response providing the alternate automated response that is associated with the identified contextual situation.

29. The computer-readable medium of claim 26 wherein at least some of the automated responses each include presenting information to the user that is appropriate based on a current contextual situation.

30. The computer-readable medium of claim 26 including, after one of the automatic providings to the user of one of the automated responses associated with one of the defined contextual situations, explaining to the user the provided response based on the association between that one automated response and that one defined contextual situation.

31. The computer-readable medium of claim 26 wherein the analysis of the patterns is based on an automated learning algorithm.

32. The computer-readable medium of claim 26 wherein the identified contextual situation is not a defined contextual situation, and wherein the creating of the association includes defining the identified contextual situation.

33. The computer-readable medium of claim 26 wherein at least one of the context attributes represents information about a user of the wearable computing device.

34. The computer-readable medium of claim 33 wherein the represented information reflects a modeled mental state of the user.

35. The computer-readable medium of claim 26 wherein at least one of the context attributes represents information about the wearable computing device.

36. The computer-readable medium of claim 26 wherein at least one of the context attributes represents information about a physical environment.

37. The computer-readable medium of claim 26 wherein at least one of the context attributes represents information about a cyber-environment of a user of the wearable computing device.

38. The computer-readable medium of claim 26 wherein the computer-readable medium is a memory of a computing device.

39. The computer-readable medium of claim 26 wherein the computer-readable medium is a data transmission medium transmitting a generated data signal containing the contents.

40. The computer-readable medium of claim 26 wherein the contents are instructions that when executed cause the computing device to perform the method.

41. A wearable computing system configured to improve automated responses to a current context for a user, the current context being represented by a plurality of context attributes that each model an aspect of the context, multiple defined contextual situations each specifying values for at least one of the context attributes, multiple automated responses being associated with the defined contextual situations, comprising:

a first component that is configured to repeatedly, receive an indication of current context information that includes current values for each of at least some of the plurality of context attributes, determine one of the defined contextual situations that matches the indicated current context information, determine one of the automated responses that is associated with the one defined contextual situation, receive an indication from the user of an alternate automated response, and store an indication of the indicated current context information and the alternate automated response; and a second component that is configured to automatically detect a relationship between an identified contextual situation and one of the alternate automated responses based on that alternate automated response being previously indicated by the user and to create an association between the identified contextual situation and the one alternate automated response so that the one alternate automated response can in the future be provided to the user for that contextual situation.

42. The computing system of claim 41 including, before the creating of the association between the identified contextual situation and the one alternate automated response, verifying appropriateness of the association.

43. The computing system of claim 41 including, after the creating of the association, detecting the identified contextual situation and in response providing the alternate automated response that is associated with the identified contextual situation.

44. The computing system of claim 41 wherein at least some of the automated responses each include presenting information to the user that is appropriate based on a current contextual situation.

45. The computing system of claim 41 including after one of the automatic providings to the user of one of the automated responses associated with one of the defined contextual situations, explaining to the user the provided response based on the association between that one automated response and that one defined contexual situation.

46. The computing system of claim 41 wherein the automatic detecting of the relationship is based on an automated learning algorithm.

47. The computing system of claim 41 wherein the identified contextual situation is not a defined contextual situation, and wherein the creating of the association includes defining the identified contextual situation.

48. The computing system of claim 41 wherein the computing system includes a memory configured to store at least portions of the first and second components and includes a processing unit configured to execute code associated with the first and second components.

49. A wearable computing system configured to improve automated responses to a current context for a user, the current context being represent by a plurality of context attributes that each model an aspect of the context, multiple defined contextual situations each specifying values for at least one of the context attributes, multiple automated responses being associated with the defined contextual situations, comprising:

first means for repeatedly receiving an indication of current context information that includes current values for each of at least some of the plurality of context attributes, determining one of the defined contextual situations that matches the indicated current context information, determining one of the automated responses that is associated with the one defined contextual situation, receiving an indication from the user of an alternate automated response, and storing an indication of the indicated current context information and the alternate automated response;

second means for automatically detecting a relationship between an identified contextual situation and one of the alternate automated responses based on that alternate automated response being previously indicated by the user; and third means for creating an association between the identified contextual situation and the one alternate automated response so that the one alternate automated response can in the future be provided to the user for that contextual situation.

* * * * *